(12) United States Patent
Martin et al.

(10) Patent No.: US 7,814,172 B2
(45) Date of Patent: Oct. 12, 2010

(54) SYNDICATION METHODOLOGY TO DYNAMICALLY PLACE DIGITAL ASSETS ON NON-RELATED WEB SITES

(75) Inventors: Richard D. Martin, Bethlehem, PA (US); John E. Wetzel, Bath, PA (US)

(73) Assignee: Active Data Exchange, Inc., Bethlehem, PA (US)

( * ) Notice: Subject to any disclaimer, the term of this patent is extended or adjusted under 35 U.S.C. 154(b) by 1380 days.

(21) Appl. No.: 09/923,923

(22) Filed: Aug. 7, 2001

(65) Prior Publication Data
US 2002/0087660 A1 Jul. 4, 2002

Related U.S. Application Data

(60) Provisional application No. 60/223,394, filed on Aug. 7, 2000.

(51) Int. Cl.
*G06F 15/16* (2006.01)
(52) U.S. Cl. ............. 709/218; 709/219; 709/203; 709/217; 705/26; 705/27; 705/59; 705/5
(58) Field of Classification Search ............ 709/501, 709/217–219, 203; 705/26, 27, 14, 51, 76, 705/59; 717/100, 115
See application file for complete search history.

(56) References Cited

U.S. PATENT DOCUMENTS 5,640,193 A * 6/1997 Wellner .................. 709/218
5,774,670 A * 6/1998 Montulli .................. 709/227
5,819,271 A 10/1998 Mahoney et al.

(Continued)

FOREIGN PATENT DOCUMENTS

CA 2404014 A1 10/2001

(Continued)

OTHER PUBLICATIONS

Component framework for Web-based learning environments by Lindquist, T.E. Gary, K.A. Koehnemann, H.E. Naccache, H; This paper appears in: Frontiers in Education Conference, 1999. FIE '99. 29th Annual;Publication Date: 1999 vol. 2, on pp: 12C3/23-12C3/28 vol. 2;Meeting Date: Nov. 10, 1999-Nov. 13, 1999 ; (all pages).*

(Continued)

*Primary Examiner*—Nathan Flynn
*Assistant Examiner*—Mohammad A Siddiqi
(74) *Attorney, Agent, or Firm*—Panitch Schwarze Belisario & Nadel LLP

(57) ABSTRACT

Digital assets are syndicated by constructing a web page and inserting into the web page JavaScript associated with a digital asset that is desired to be part of a fully rendered web page. The content of the digital asset is not initially part of the web page. The script, when executed by a browser, requests the content of the digital asset from a remote site. The request includes a uniform resource identifier (URI) of the web page and a unique identifier of the selected content. The remote site receives the request and authenticates whether the URI is authorized to receive the selected content. If so, the remote site locates the selected content and sends the selected content to the web browser. The web browser assembles the initially requested web page using the selected content obtained from the remote site.

12 Claims, 21 Drawing Sheets

U.S. PATENT DOCUMENTS

| | | | |
|---|---|---|---|
| 5,835,712 A | 11/1998 | DuFresne | |
| 5,857,181 A | 1/1999 | Augenbraun et al. | |
| 5,864,871 A | 1/1999 | Kitain et al. | |
| 5,898,835 A | 4/1999 | Truong | |
| 5,987,225 A * | 11/1999 | Okano | 358/1.13 |
| 5,987,525 A * | 11/1999 | Roberts et al. | 709/248 |
| 5,999,941 A | 12/1999 | Andersen | |
| 6,038,598 A | 3/2000 | Danneels | |
| 6,112,242 A | 8/2000 | Jois et al. | |
| 6,118,768 A * | 9/2000 | Bhatia et al. | 370/254 |
| 6,151,599 A * | 11/2000 | Shrader et al. | 707/9 |
| 6,151,609 A * | 11/2000 | Truong | 715/205 |
| 6,157,933 A * | 12/2000 | Celi et al. | 715/501.1 |
| 6,185,567 B1 | 2/2001 | Ratnaraj et al. | |
| 6,314,451 B1 * | 11/2001 | Landsman et al. | 709/217 |
| 6,393,605 B1 * | 5/2002 | Loomans | 717/121 |
| 6,405,364 B1 * | 6/2002 | Bowman-Amuah | 717/101 |
| 6,418,441 B1 * | 7/2002 | Call | 709/217 |
| 6,484,149 B1 * | 11/2002 | Jammes et al. | 705/26 |
| 6,493,733 B1 * | 12/2002 | Pollack et al. | 715/513 |
| 6,546,397 B1 * | 4/2003 | Rempell | 707/102 |
| 6,550,057 B1 * | 4/2003 | Bowman-Amuah | 717/126 |
| 6,609,105 B2 * | 8/2003 | Van Zoest et al. | 705/14.47 |
| 6,611,498 B1 * | 8/2003 | Baker et al. | 370/252 |
| 6,622,168 B1 * | 9/2003 | Datta | 709/219 |
| 6,625,581 B1 * | 9/2003 | Perkowski | 705/27 |
| 6,826,594 B1 * | 11/2004 | Pettersen | 709/203 |
| 6,829,780 B2 * | 12/2004 | Kraft et al. | 725/42 |
| 7,013,340 B1 * | 3/2006 | Burd et al. | 709/229 |
| 7,657,436 B2 | 2/2010 | Elmore et al. | |
| 2003/0135587 A1 * | 7/2003 | Fisher et al. | 709/219 |

FOREIGN PATENT DOCUMENTS

WO    WO 00/20945 A2    4/2000

OTHER PUBLICATIONS

Client-Side Web Scripting with HaskellScript (Erik Meijer, Daan Leijen and James Hook; Jan. 1, 1998; Springer Berlin / Heidelberg; pp. 1-103).*

International Search Report for PCT/US01/24675, mail date: Nov. 21, 2001, 1 page.

* cited by examiner

```
Subscriber ADP Example from Syndicator 3.0

<SCRIPT LANGUAGE="javascript">
if (location.search.indexOf("j3serial") != -1) {
document.write('<SCRIPT LANGUAGE="javascript"
SRC="http://localhost:8080/servlet/com.activedatax.products.syndicator.export.ADPExport' +
location.search + '&j3durl=' + escape(location.href) + '"><\/SCRIPT>');
} else { document.write('<SCRIPT LANGUAGE="javascript"
SRC="http://localhost:8080/servlet/com.activedatax.products.syndicator.export.ADPExport?j3serial=
19000025&j3sub=19000003&j3ocset=19000002%3A19000020%3A19000017&j3itemid=0&j3fullnum=0%3A0%3A0&j3a
rcnum=10%3A10%3A10&j3newwindow=false&j3showdates=false&j3durl=' + escape(location.href) +
'&j3brand=' + escape(Math.random()) + '"><\/SCRIPT>');
</SCRIPT>
```

*Figure 17*

```
Admin ADP For Randomizer/Blurb Machine

<SCRIPT LANGUAGE="javascript">
if (location.search.indexOf("jbact") != -1) {
document.write('<SCRIPT LANGUAGE="javascript"
SRC="http://publisher3.activedatax.com/servlet/com.activedatax.products.Blurb.JBlurbAdmin' +
location.search + '&jbdurl=' + escape(location.href) + '&jbrand=' + escape(Math.random()) +
'"><\/SCRIPT>');
} else {
document.write('<SCRIPT LANGUAGE="javascript"
SRC="http://publisher3.activedatax.com/servlet/com.activedatax.products.Blurb.JBlurbAdmin?jbsid=9
31717&jbdurl=' + escape(location.href) + '&jbrand=' + escape(Math.random()) + '"><\/SCRIPT>');
} </SCRIPT>
```

*Figure 18*

```
Random Blurb Output ADP

<SCRIPT LANGUAGE="javascript">
document.write('<SCRIPT LANGUAGE="javascript"
SRC="http://publisher3.activedatax.com/servlet/com.activedatax.products.Blurb.JBlurb?jbsid=931717
&jbgid=136593&jbdurl=' + escape(location.href) + '&jbrand=' + escape(Math.random()) +
'"><\/SCRIPT>');
</SCRIPT>
```

*Figure 19* blurb blurb_id: int
blurb_site_id: int
blurb_group_id: int
html: text
status: char(1)
created_on: datetime
last_modified_on: datetime blurb_site blurb_site_id: int
blurb_site_name: varchar(50)
description: varchar(255)
status: char(1)
url: varchar(255)
created_on: datetime
last_modified_on: datetime blurb_group blurb_group_id: int
blurb_site_id: int
blurb_group_name: varchar(50)
status: char(1)
created_on: datetime
last_modified_on: datetime

*Figure 20*

SYNDICATION METHODOLOGY TO DYNAMICALLY PLACE DIGITAL ASSETS ON NON-RELATED WEB SITES

CROSS-REFERENCE TO RELATED APPLICATIONS

This application claims the benefit of U.S. Provisional Application No. 60/223,394 filed Aug. 7, 2000, entitled "SYNDICATION METHODOLOGY TO DYNAMICALLY PLACE DIGITAL ASSETS ON NON-RELATED WEB SITES."

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

The present invention is directed to the process of Active Data Syndication and its use in web development and content management. More specifically, the present invention establishes the mechanism, the framework, the interfaces and the ancillary methodology to allow multiple content creators to offer for targeted syndication or network distribution and retrieval of digital assets across the web and to have those assets present within the constrains of the receiving web site, and to automate that process, where warranted.

Conventional web sites consist of a wide variety of articles and information compiled and entered independently by a webmaster. Tools abound to facilitate the production of such web sites, from textual HTML editors to visual page designers like Adobe GoLive. Programs like LinkBOT exist to validate links among pages. However, the conventionality of this form of web site generation becomes merely a shell for the advent of the more advanced, dynamic and interactive web site.

Site management tools allow for the collaborative efforts of site creation, but are significantly limited in their ability to share information and digital assets across the boundaries of web sites.

Syndication or distribution of digital assets across the web heretofore involved the direct replication of those assets to a database server under the control of the receiving web site manager, and away from the control of the supplier of the digital asset. Examples of implementations where content replication is the primary form of asset syndication include those from Vignette, Kinecta, Interwoven, ICE, and Arcadia-One.

Accordingly, there is a need for a system which (1) unifies the way digital assets, in any form, are shared from one site to another, (2) unifies the distribution of those digital assets across multiple platforms, (3) allows the owners of digital asset a management tool for tracking the business relationships surrounding the use of the digital assets, (4) establishes mechanisms, interfaces and methodology for the secure flow of information through information distribution networks, (5) facilitates the webmaster to have updated digital content present on the web site, and (6) automates the update of web content. The present invention fulfills these needs.

Prior to the present invention, it was not possible for web sites governed by any number of normal content management tools to proactively share information with independent and unrelated web sites. The lightweight and transportable tool of the present invention allows for a web site to be programmed to receive digital asset information in a multiplicity of formats, and to display those assets within the style and constraints of the receiving web site. The web sites need not be collocated, nor do they need to be created using the same tools. They simply need to render HTML in any web browser, capable of interpreting Java and JavaScript. The power of this tool is such that it can enhance, if not revolutionize, the bi-directional communications infrastructure using the web. These managed information distribution networks do for the Internet what faxes and overnight mail did for corporate correspondence two decades ago.

SUMMARY OF THE INVENTION

The present invention provides a scheme of obtaining selected content for a web page, wherein the selected content itself is not initially part of the web page. The web page includes script, such as JavaScript, associated with the selected content. The scheme operates as follows:

1. A web browser requests a web page that includes script associated with the selected content. The selected content may be only a portion of the web page. The selected content may be a digital asset or an executable file. In the preferred embodiment, the web page is constructed using HTML, and the script is embedded therein.
2. The web browser interprets the script and formats a request to obtain the selected content from a remote site. The request includes a uniform resource identifier (URI) of the web page and a unique identifier of the selected content. The URI may be a URL.
3. A remote site, such as a web server, receives the request and authenticates whether the URI is authorized to receive the selected content. If so, then the remote site locates the selected content and sends the selected content to the web browser. The selected content may be stored in a content repository connected to the web server. If the URI is not authorized to receive the selected content, then the remote site sends a signal to the web browser that the selected content is not available, and the web browser assembles the web page without the selected content.
4. The web browser assembles the initially requested web page using the selected content obtained from the remote site.

The assembled web page may include one or more content sets from the syndicator, each having its own script for implementing the steps above.

In one preferred embodiment, the script includes a subscriber identifier and a content identifier which are both used to create the unique identifier of the selected content.

The present invention also provides a scheme for syndicating digital assets. A web page is constructed, and script, such as JavaScript, associated with at least one digital asset that is desired to be part of the fully rendered web page is inserted into the web page. The script, when executed by a browser, performs modest authentication regarding the URI and requests the content of the digital asset from content repository. The request includes a uniform resource identifier (URI) of the web page and a unique identifier of the selected content. In one preferred embodiment, the script includes a subscriber identifier and a content identifier, which, together, create the unique identifier of the selected content. The selected content may be an executable file.

BRIEF DESCRIPTION OF THE DRAWINGS

The following detailed description of preferred embodiments of the present invention would be better understood when read in conjunction with the appended drawings. For the purpose of illustrating the present invention, the drawings show embodiments of the present invention which are presently preferred. However, the present invention is not limited to the precise arrangements and instrumentalities shown. In the drawings:

FIGS. 17-19 are JavaScript source code snippets for implementing a web application embodiment of the present invention; and FIG. 20 is a database schema for the web application embodiment of the present invention.

DETAILED DESCRIPTION OF THE INVENTION

Figure 1:
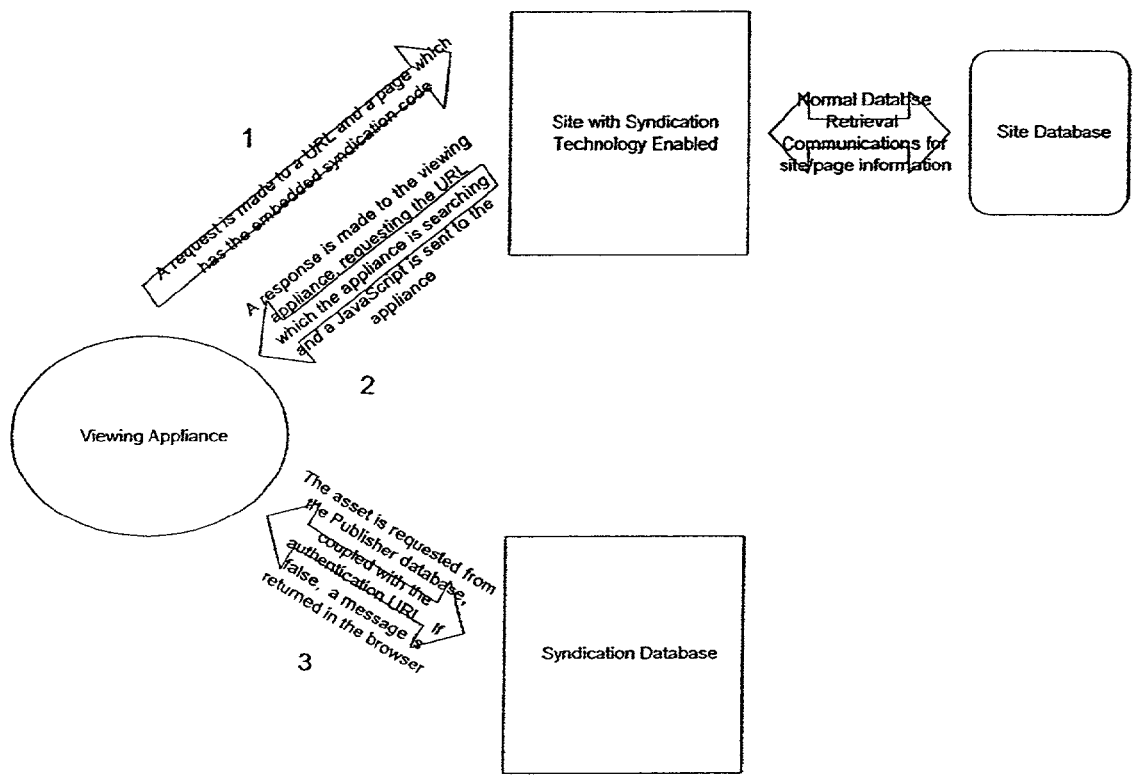
FIG. 1 is a schematic block diagram that provides an overview of one preferred embodiment of the asset syndication scheme of the present invention.

Certain terminology is used herein for convenience only and is not to be taken as a limitation on the present invention. In the drawings, the same reference letters are employed for designating the same elements throughout the several figures.

I. Definitions

Content: Any textual, visual, and audio materials or the combination thereof, including animated images, video clips, executable files, or digital assets targeted for presentation.

Content Repository: a database of file structure which contains the syndicatable asset.

Syndicated Asset: Any content which is available to an authenticated receiver.

Authenticated Receiver: A receiver of content that is authorized to retrieve and present that content.

Subscriber: Synonym to Authenticated Receiver.

Domain: The name which appears in the URL between the "www" and the end of the three letter extension (e.g., .com, .net, .org). Example: www.regiononline.com, the domain is regiononline.com.

II. Overview of Present Invention

Referring to FIG. 1, the following steps are performed:
1. A request is made from a web appliance to a UTRL, which contains a web page that has embedded the syndication code.
2. The web page, while rendering other data present on the page, such as navigation, headers and footers, and other assets not related to the syndicated content, returns JavaScript which tests the appliance for the site URL requested. The JavaScript effectively functions as a dynamic content retrieval agent.
3. This information is then used to authenticate the content presence on the site as valid, and then to retrieve from the syndication database those assets for display, and render those syndicated assets through the appliance.

The present invention introduces the notion of web real estate and the apportionment of content sections to a particular web page. A visually unified site is substantially divided into sub-sites, or content sections, that are independently maintained by section managers or through syndicated content offerings. As a direct and targeted information management delivery tool, the present invention is useful to the large corporation, a community site, or any site which enables the sharing of targeted information. Any content or information rich site will find this present invention very helpful.

The present invention may be used to complement web pages created in MS Frontpage, or any number of content management tools. The present invention does not perform visual layout, and may be considered a post-design tool.

The present invention may be used with any number of programming languages such as Cold Fusion, ASP, $C^{++}$, Java, Visual Basic or Perl. The present invention may serve as an extension to the web page, or an add-on component to any number of content management tools.

The present invention may be used on any site that renders HTML, and is intended to be programming language neutral, through the use of JavaScript, servlets, and Java features.

III. Detailed Description of one Preferred Embodiment

In one preferred embodiment of the present invention as described herein, the user communicates through a browser with the necessary web site via an electronic network, such as the Internet. However, the scope of the invention includes other types of user interfaces and electronic networks that are capable of performing the desired functions.

The present invention is described in the context of a commercially available software product called Active Data Syndicator™, available from Active Data Exchange, Inc., Bethlehem, Pa.

A. Detailed Explanation of Figures and Appendices

Figure 2:
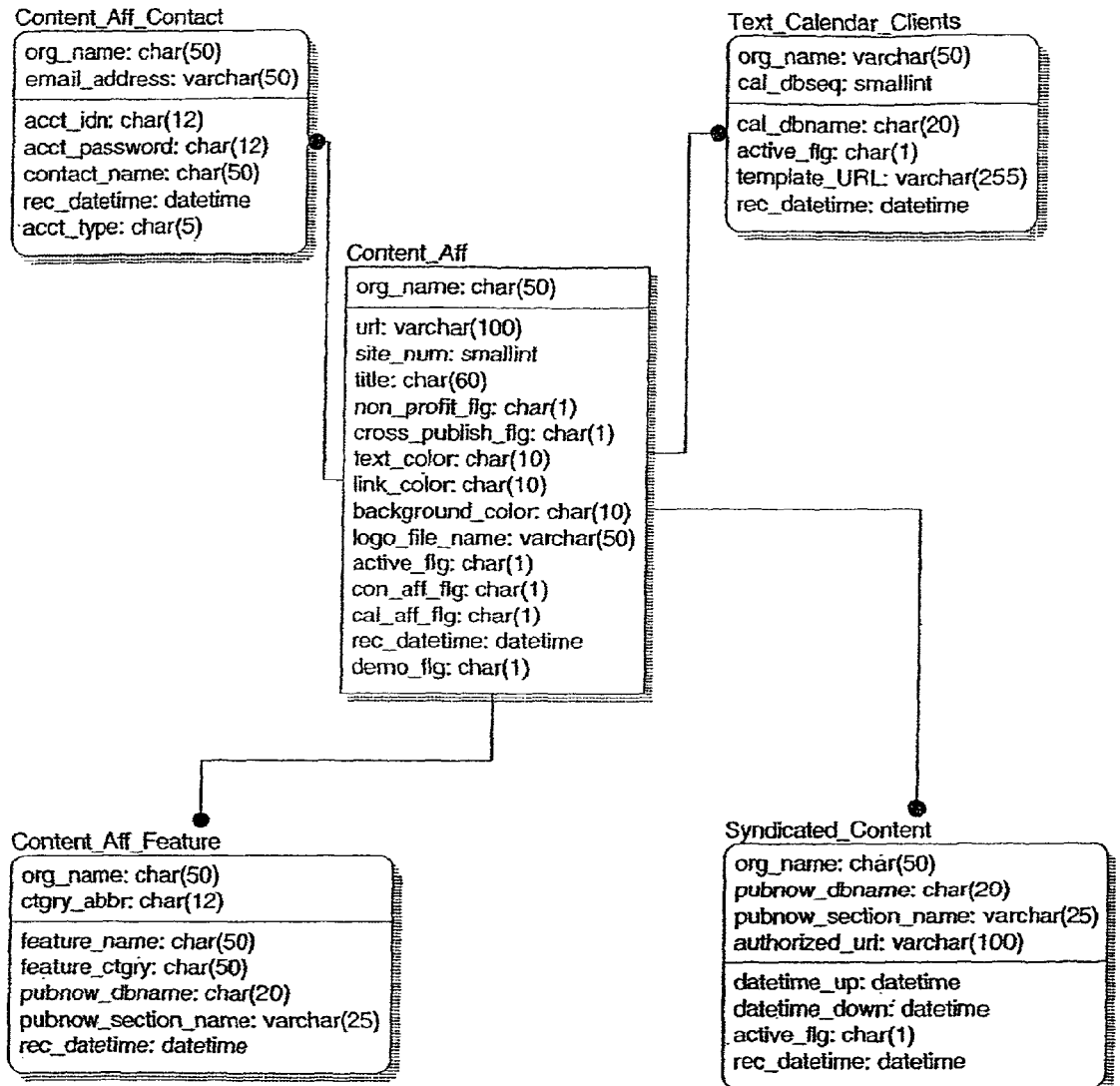
FIG. 2 is a database schema for one preferred embodiment of the present invention.
Figure 3:
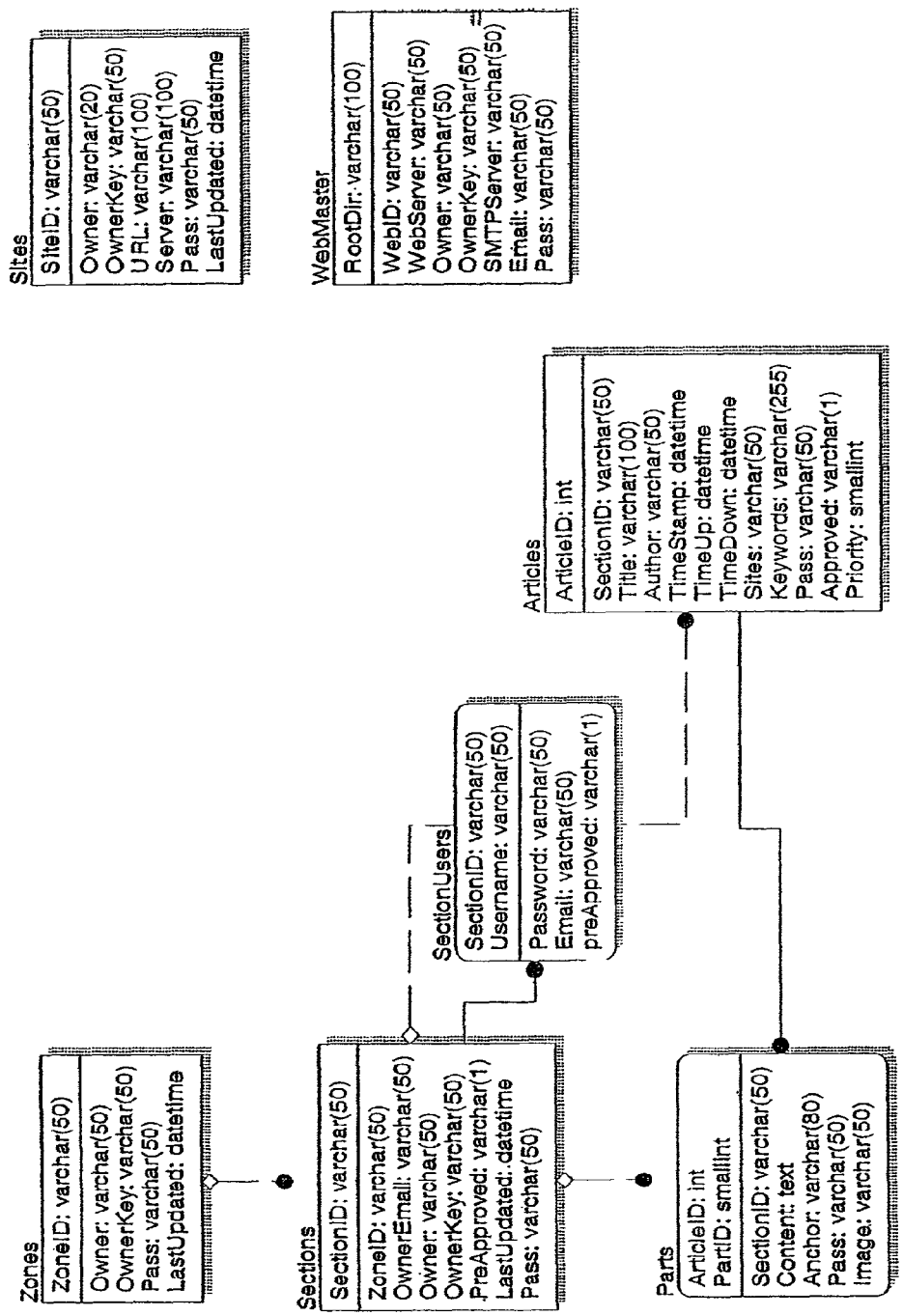
FIG. 3 is an authentication schema for one preferred embodiment of the present invention.

FIG. 2 is a self-explanatory database schema for one preferred embodiment of the present invention, and FIG. 3 is a self-explanatory authentication schema for one preferred embodiment of the present invention.

Figure 4:
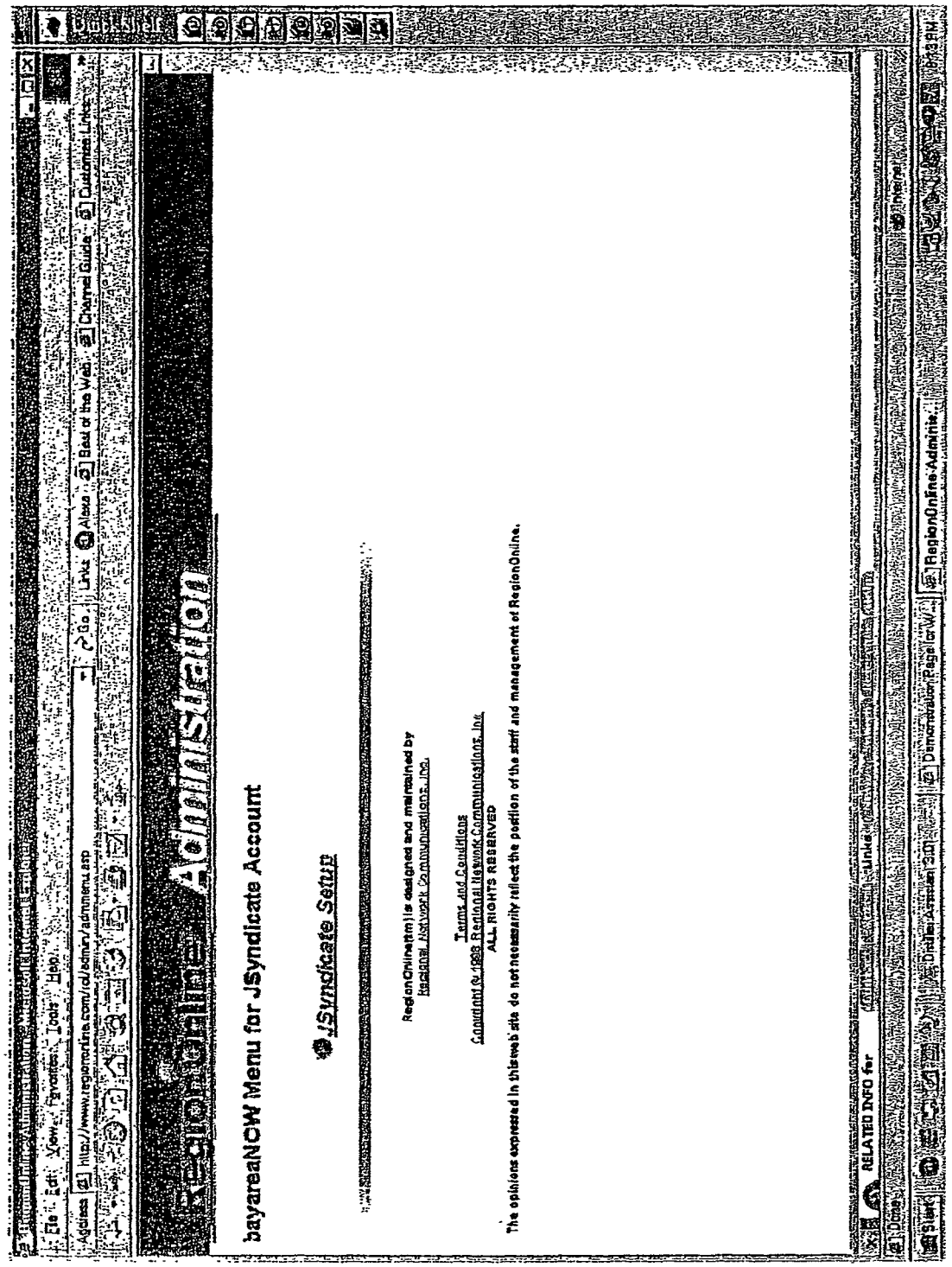
FIGS. 4-13B are user interface displays (administrative screen shots) for one preferred embodiment of the present invention.

FIG. 4 is an administrative entry screen for beginning the process.

Figure 5:
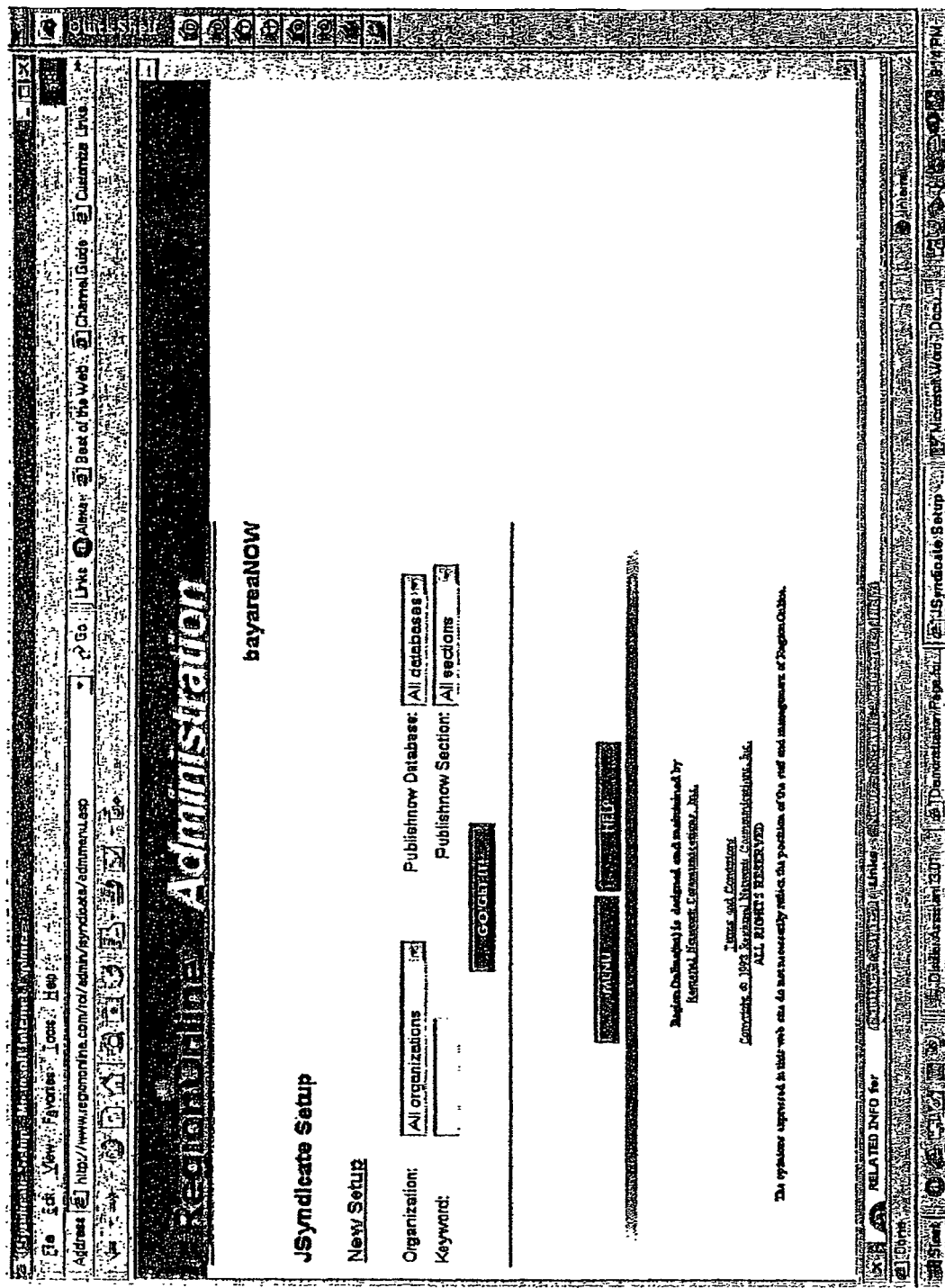

FIG. 5 is a user interface display that allows for the selection from an existing syndication or the creation of a new syndication.

Figure 6:
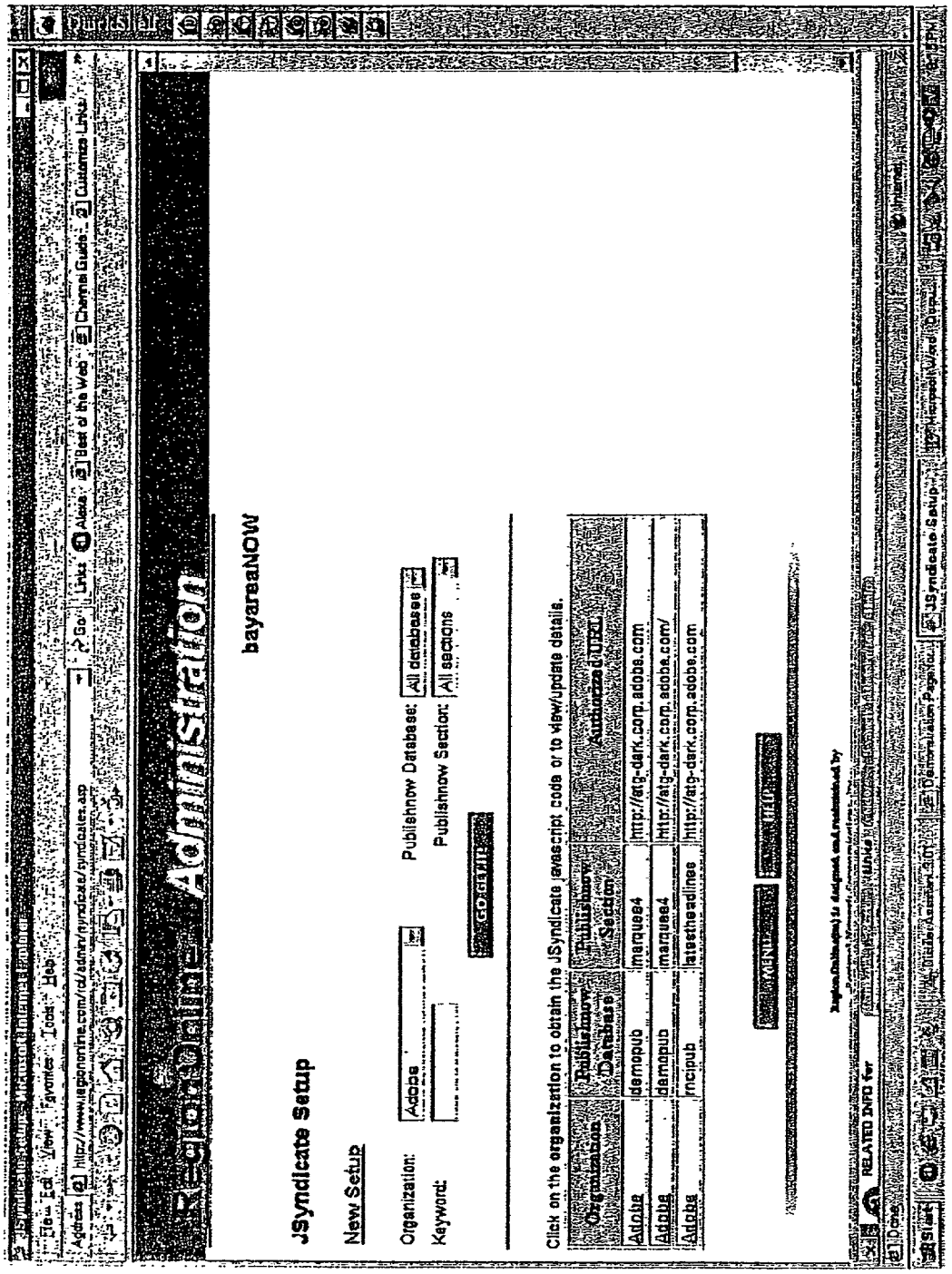

Referring to FIG. 6, if the administrator chooses the "go get it" button from the FIG. 5 display, then a listing of the syndication offers are presented. The "clickable" first field allows for the modification of that offering.

Figure 7:
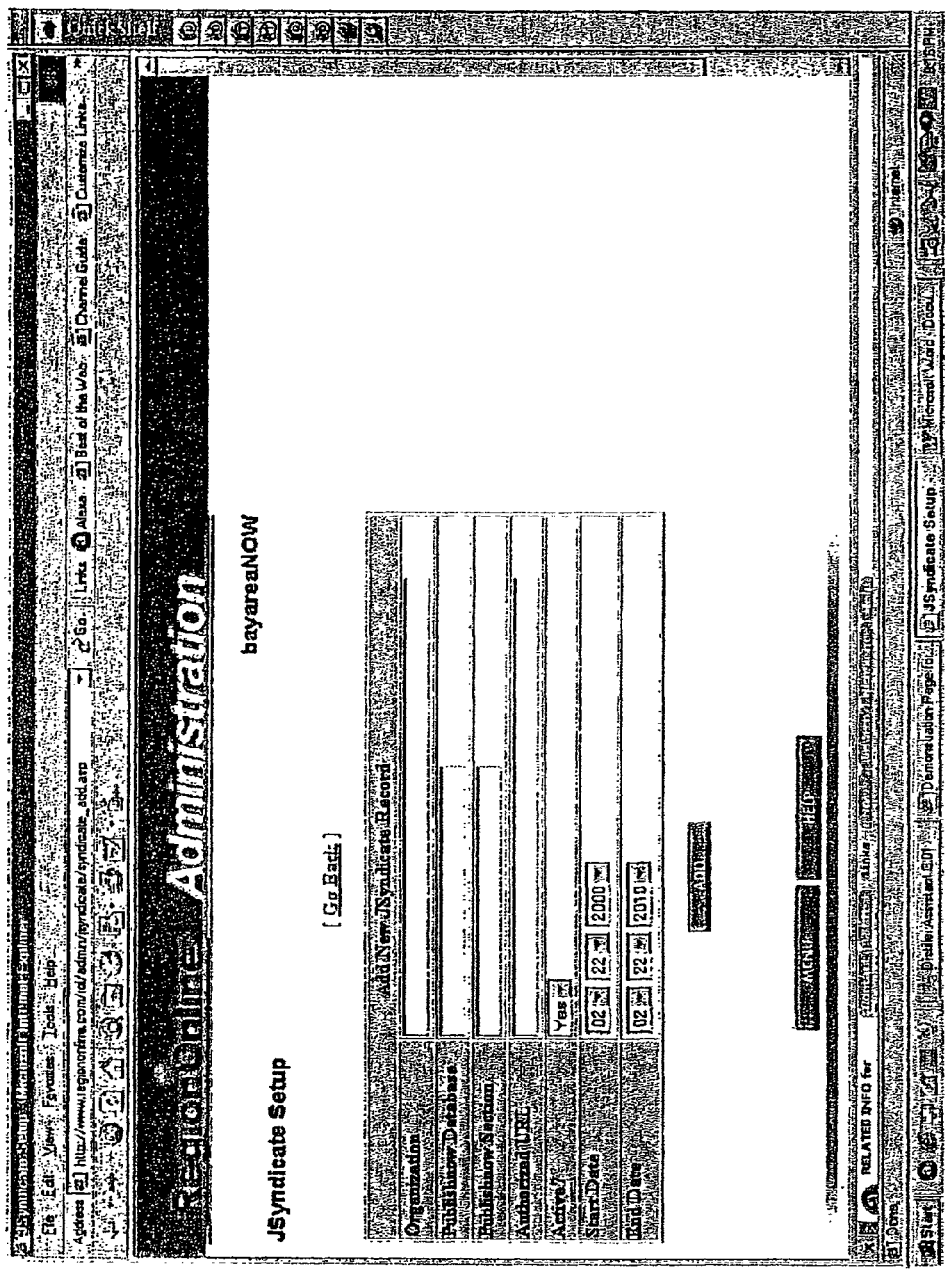
Figure 8:
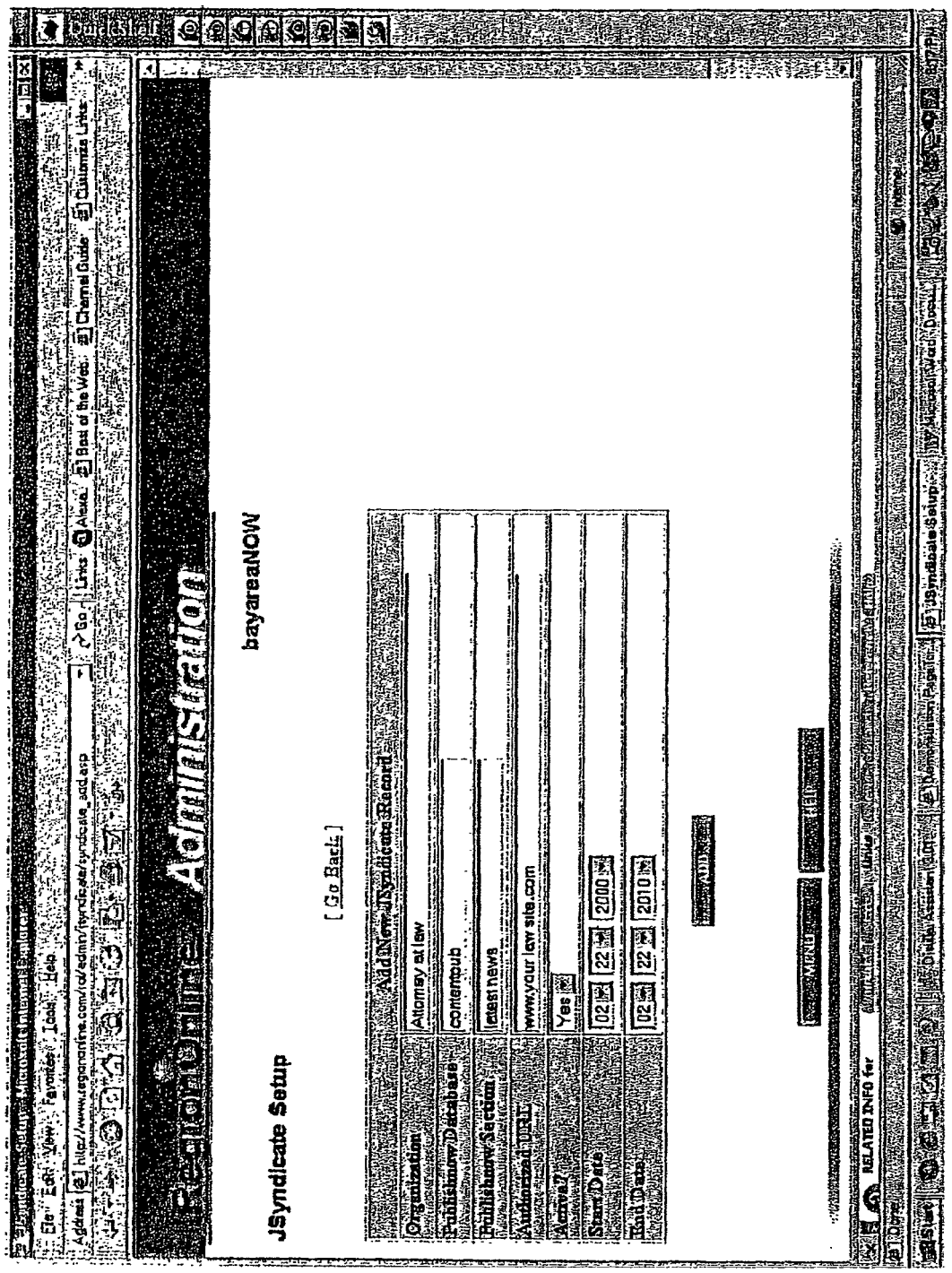

FIGS. 7 and 8 are user interface displays a for a "New Setup." The administrator completes the fields shown in these displays.

Figure 9:
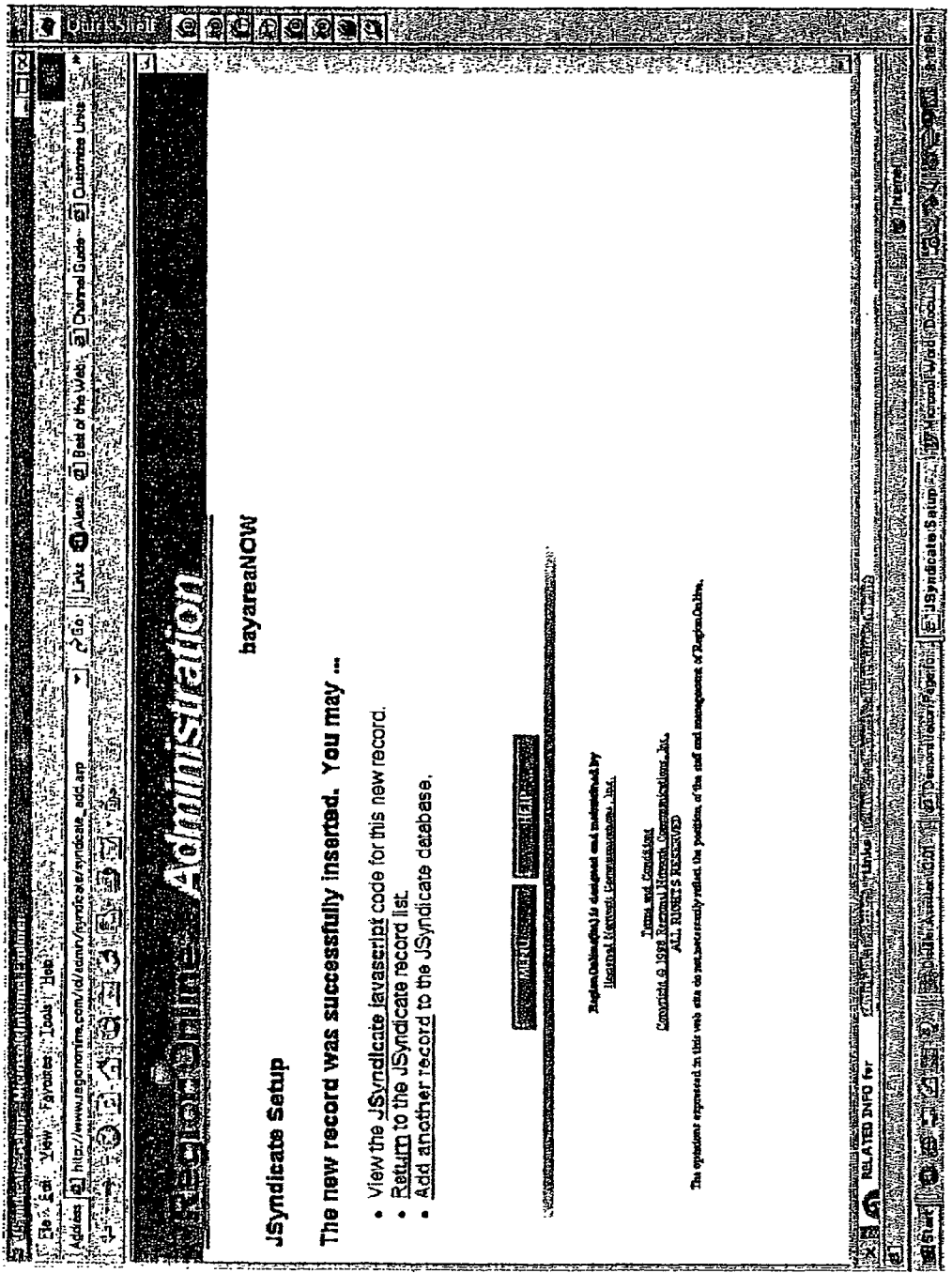

FIG. 9 is a user interface display that allows for the viewing of the necessary syndication code for placement into the HTML of the subscriber/receiver web site.

Figure 10A:
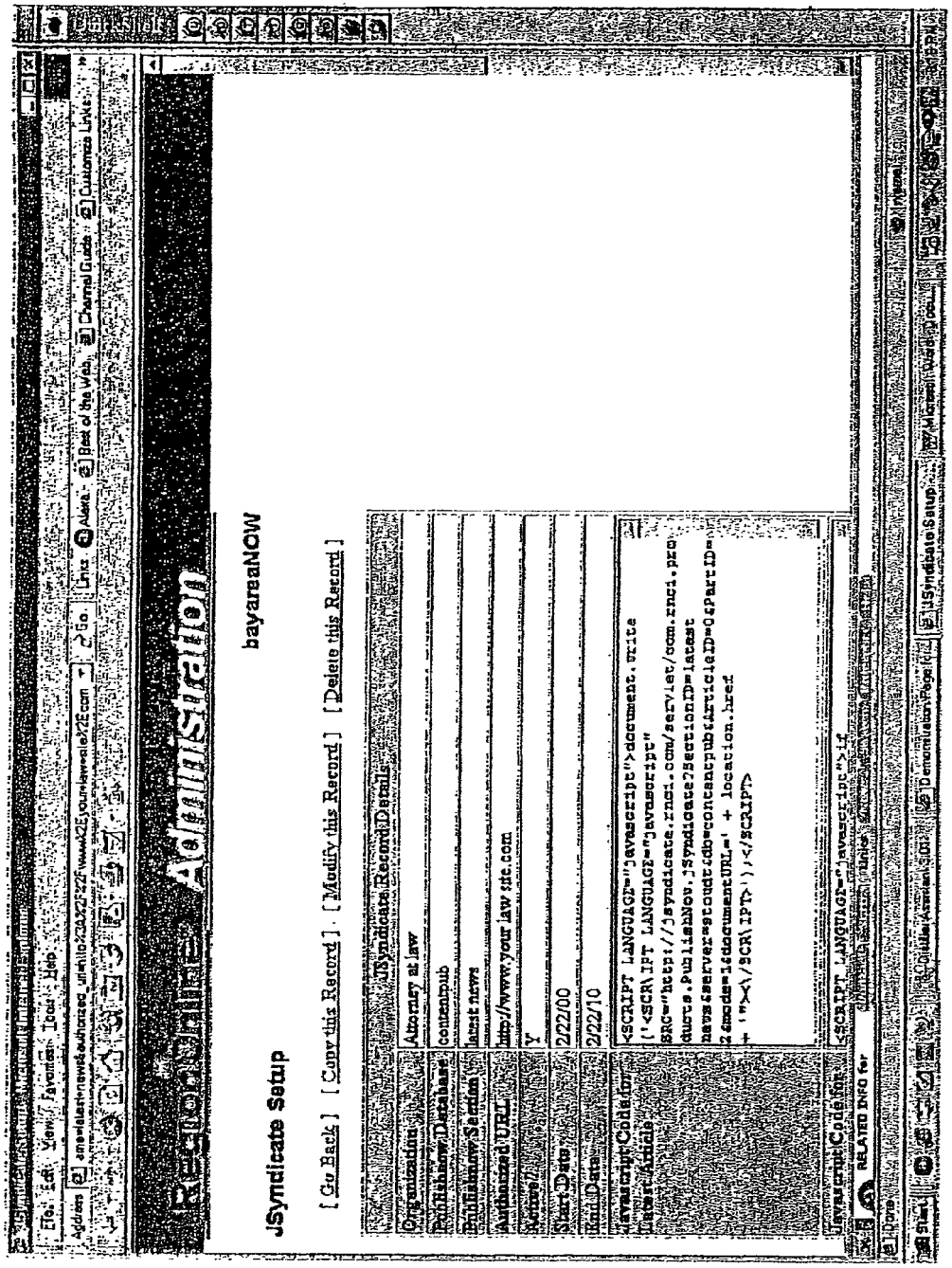

FIG. 10A shows the actual code for placement on the subscriber/receiver HTML page for the fictitious client Attorney at Law. This code allows for the one time insertion of the code for presentation of information, news, events, or other digital assets on an ongoing basis.

Figure 10B:
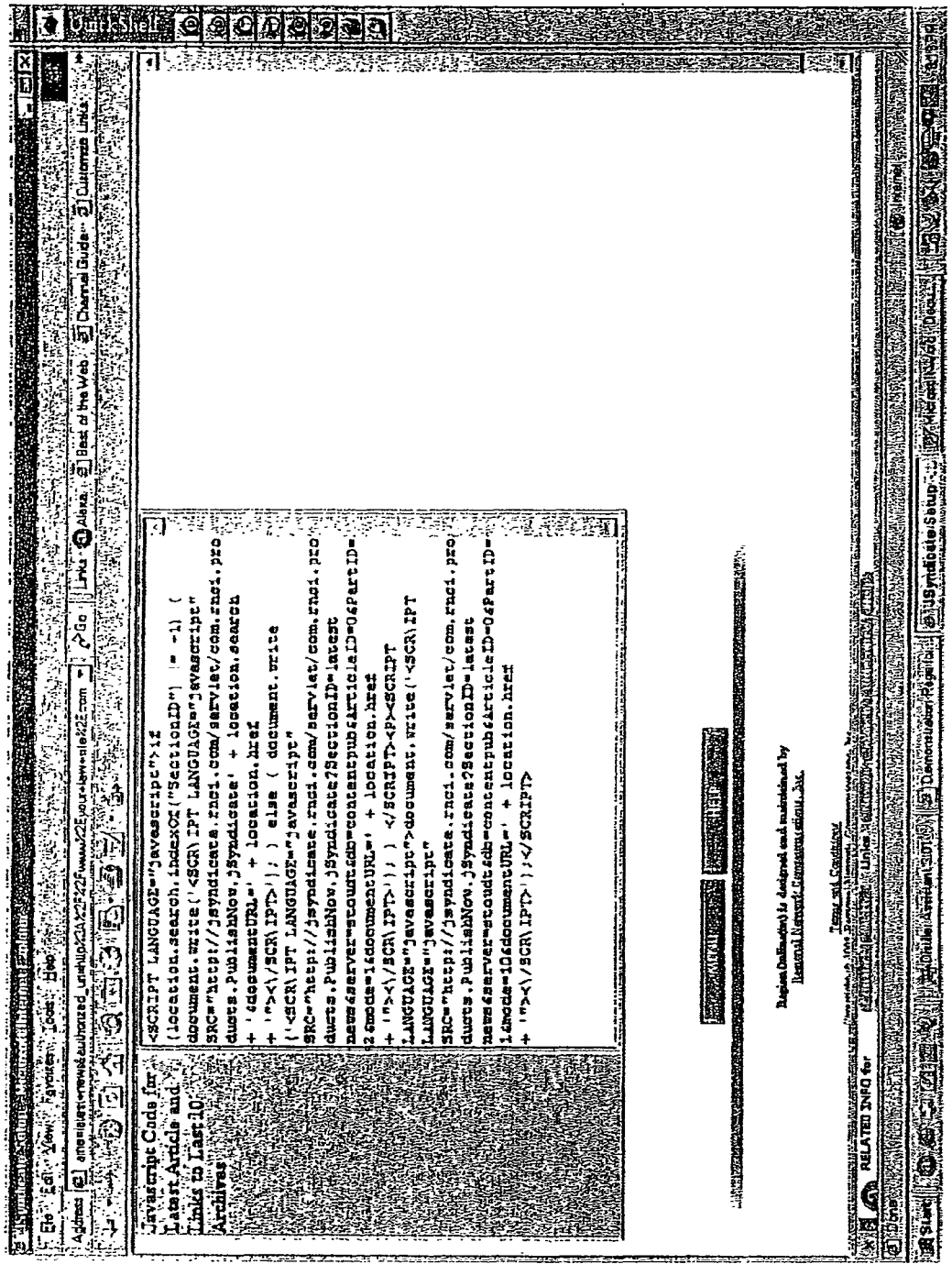

FIG. 10B shows the same code, modified to present the latest asset, as well as the creation of several hypertext links for viewable archives of older digital assets. In this case, there is the ability to present for viewing up to 10 viewable archives from the database.

Figure 11:
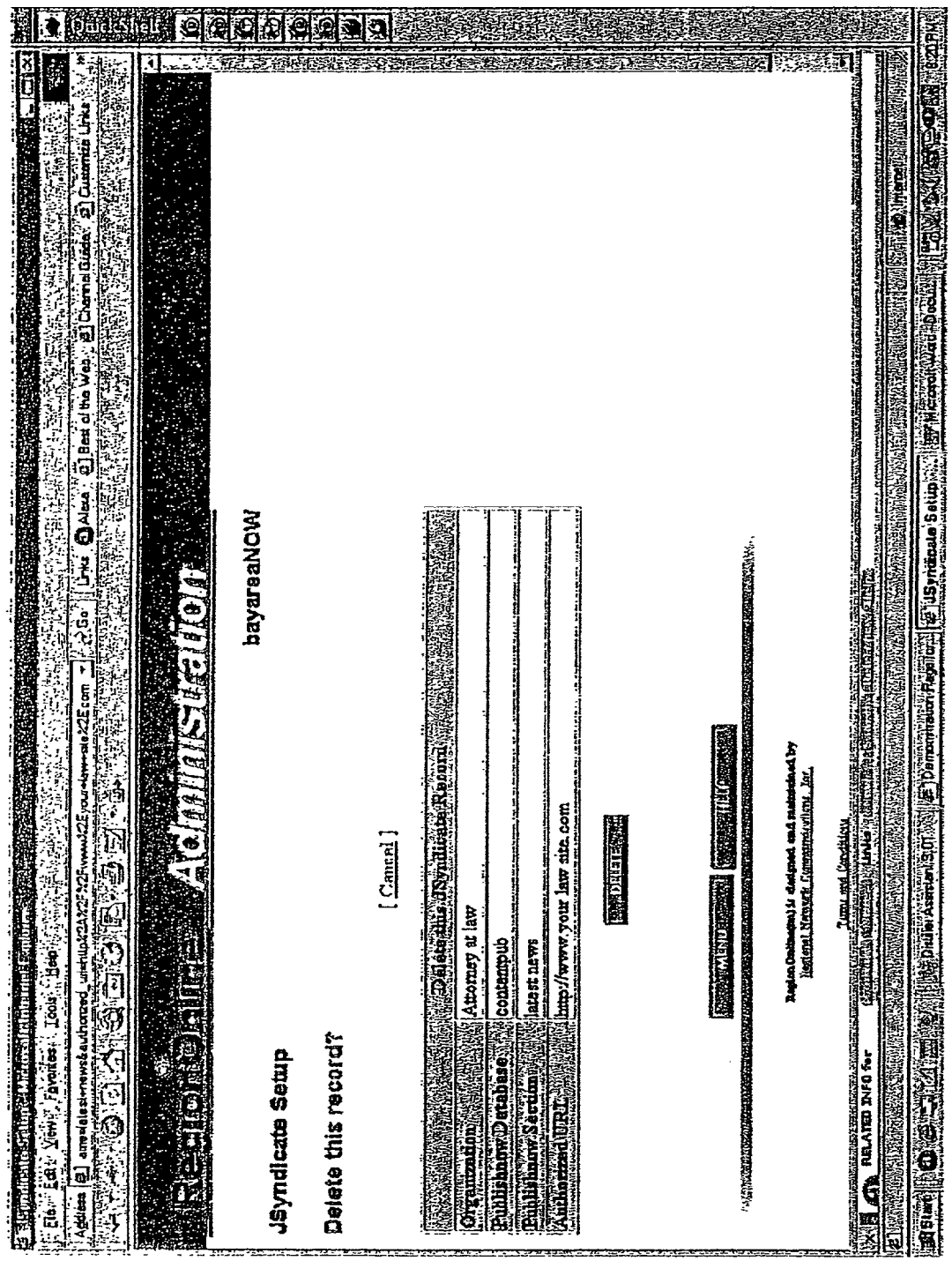
Figure 12:
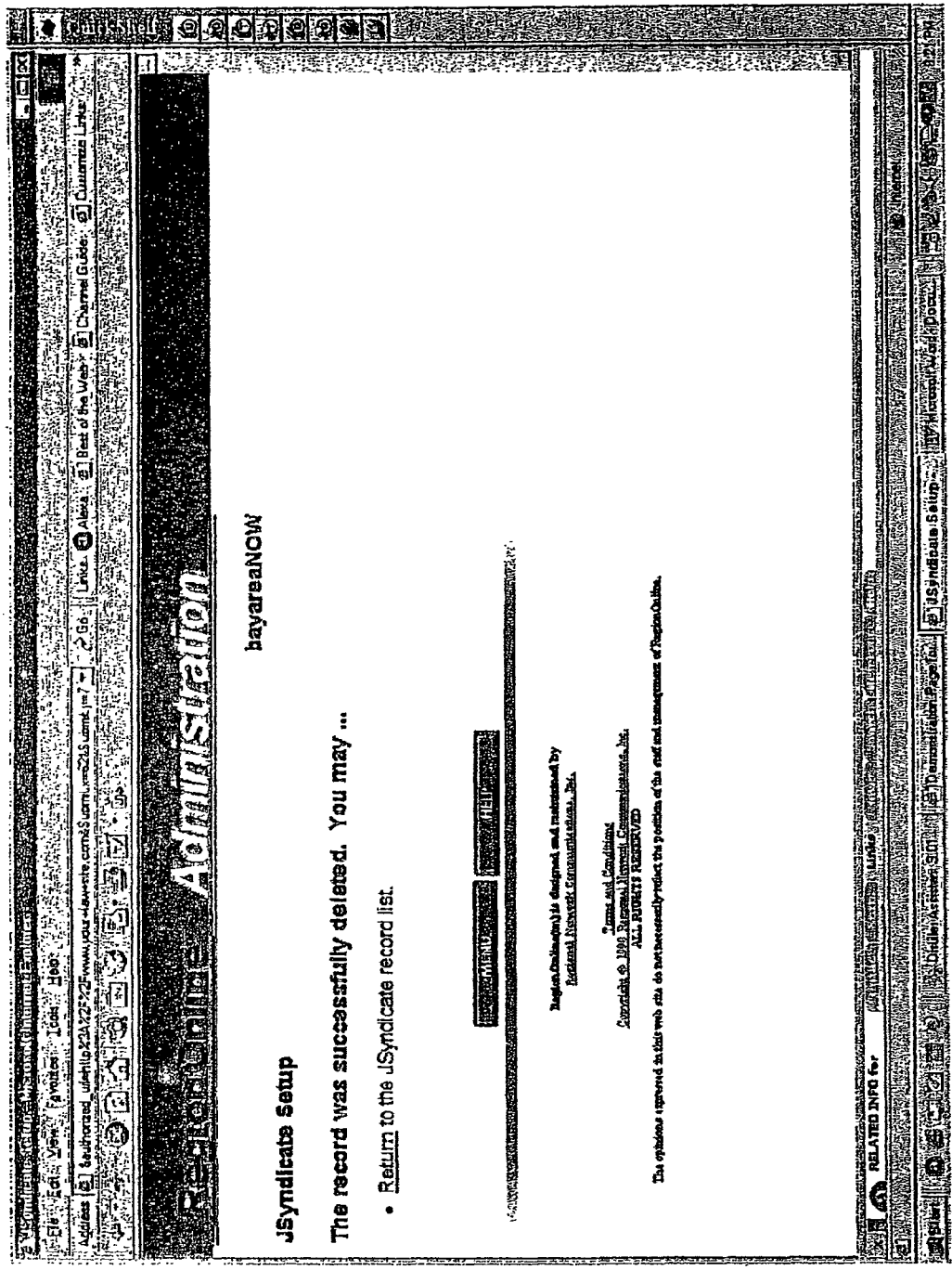

FIGS. 11 and 12 show additional administrative functions for the deletion of a subscriber.

Figure 13A:
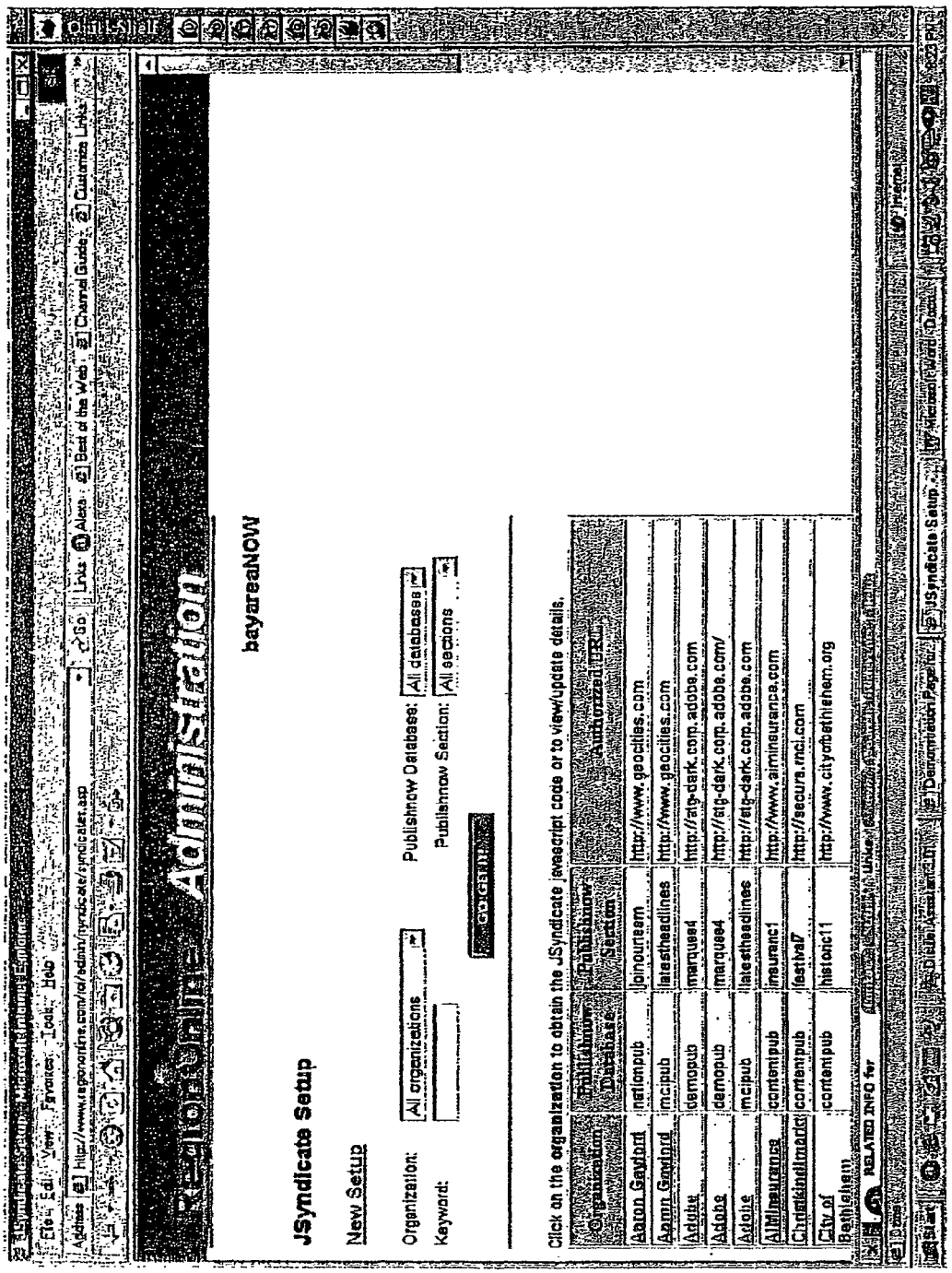
Figure 13B:
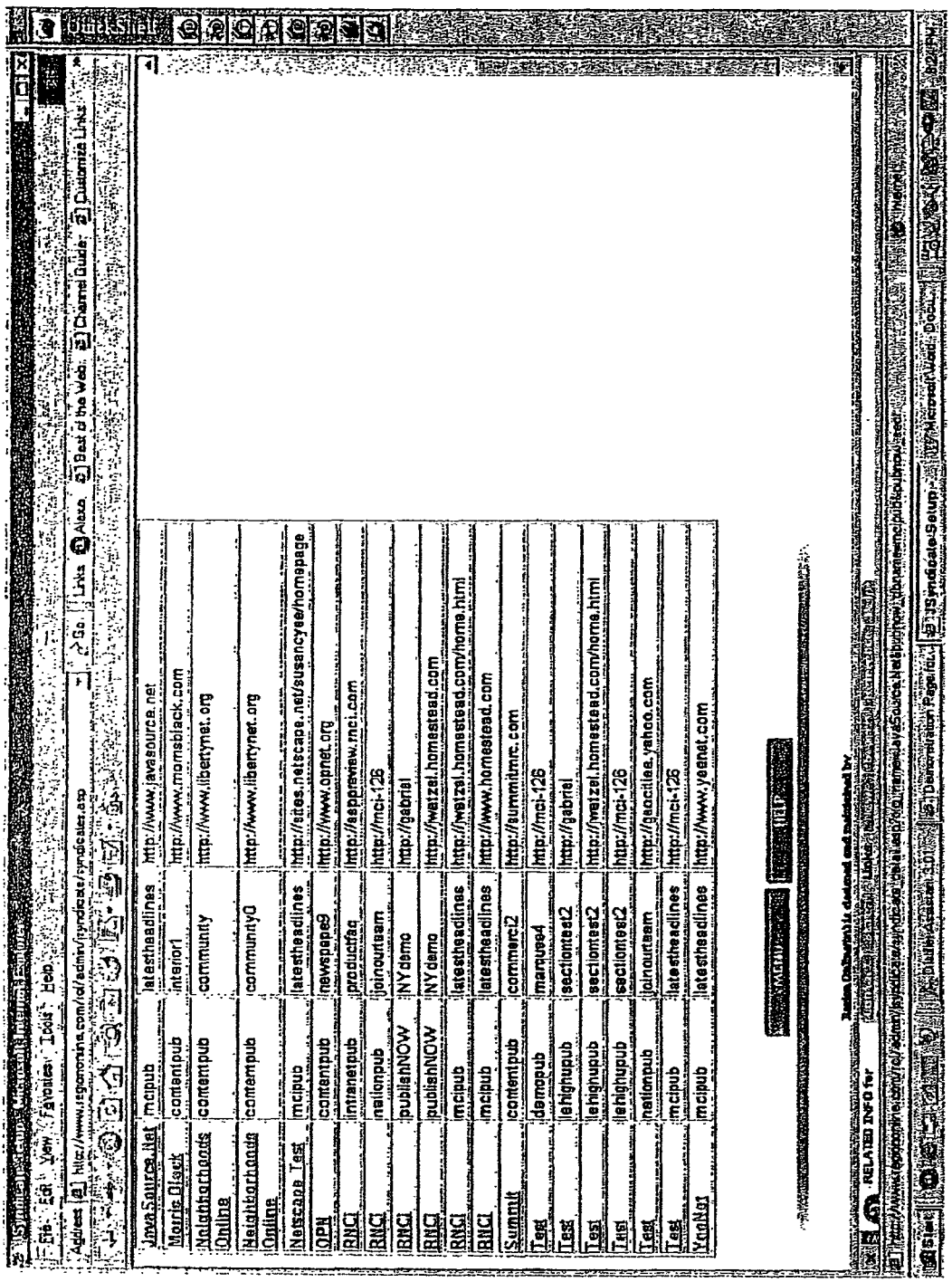

FIGS. 13A and 13B show the list of subscribers/receivers for overall administrative purposes.

Appendix A is the syndication source code for the embodiment of the present invention shown in FIGS. 2-13B.

Appendix B is the servlet package source code for the embodiment of the present invention shown in FIGS. 2-13B.

B. Inherent Security

All web sites do not use the same syndication code. Subtle differences in the code are "keyed" to the receiving domain. It is through this "key" that the integrity of the business relationship and the placement of the digital asset are preserved. The process includes a security module that looks at the browser URL of the appliance to determine which URL (domain) it is calling. If the domain does not match an existing client URL (coupled with the content authorized for use), a message is returned to the appliance, which states that the content is unavailable.

C. Web Site Setup for Receiving Syndication Offerings

To set up a web site page for syndication, a few parameters must be understood and defined:
1. The receiving URL, as authentication or validation of the receiver/subscriber is performed to the domain level.
2. The asset section to be syndicated. This refers to a content section in a content management system. One instant example would be to syndicate "What's News" from a company or organization. This section of the site is a hypothetical region where all information regarding press releases and latest organizational information is to be found. In this installation, the site only needs to be set up with the HTML snippet one time. Content changes occur dynamically.
3. The number of displayed archives the receiver would like to be able to view. This is a title listing of previously syndicated content for this section.
4. The database location of the digital asset.
5. The organizational name (for administrative purposes).
6. The start and end time for the syndication. This is important if the syndicated asset is time dependant or whether or not the subscription to the syndicated digital asset is on a monthly or other time dependent basis.

Through these parameters, metrics can be derived which display, from the syndication-offered standpoint, several management reports useful in understanding the offerings and their use. Metrics include:
1. Number of times a digital asset is accessed by a subscriber (useful in fee per use models as well as for tracking relative worth of the asset).
2. Places where the digital asset can be viewed/authorized domains.
3. Listing of the offerings available for release through the syndication model.
4. Through an oblique methodology, a measure of the physical overhead of the device housing that content.

D. Database Interrelationships

As discussed above, the present invention is platform independent and program neutral. It functions equally as well on operating systems written in Microsoft, as it does from that of Red Hat Linux. Furthermore, the database from which it pulls its content may either be MS SQL, Informix, Sybase or Oracle, as it uses command phrases which are non-vendor specific (ANSI SQL). The hardware, however, must be of sufficient strength to power databases that conceivably will receive hundreds of thousands of requests per second. FIG. 2, described above, illustrates one preferred database schema for the present invention.

E. Architectual Overview

The implementation of this business process and its underlying software is hardware independent, providing that the following applications/services are available: An application server running a servlet engine such as Allaire's JRUN or TomCat, and a web server such as Internet Information Server (IIS) from Microsoft or an Apache web server should the operating system of the server be RedHat Linux or Unix. The database server should have a strong relational database such as MS SQL, Oracle, or Sybase, overtop of the appropriate operating system.

The location of the servers used in the present invention can be anywhere within the infrastructure of the existing client network. One suitable scheme is to locate the servers behind a redundant firewall.

The invention environment provides for all system hardware requisite to the invention work. It includes an application/web server that controls the look of web pages, serves content for the web pages, and provides the environment for the administration of those tasks. The standard operating system for this invention is Linux. However, a client may choose Windows NT or UNIX as an alternate operating system (OS). Coupled with the OS, a web server needs to be chosen. In the example of Red Hat Linux, one suitable choice would be Apache. However, a Windows NT environment would most likely use IIS. Since the present invention is a Java-based application, a servlet engine needs to be incorporated into the server operation. One suitable configuration to support the invention includes the following elements:

Operating System (Application Server)
    Windows NT 4.0 with Service Pack 6A
    Red Hat Linux 6.2

Databases (Database Server)
    Sybase 11.02 [Windows NT, Linux]
    Oracle 8i Server 8.1.5 [Windows NT, Solaris, Linux]
    Microsoft SQL Server 6.5 with Service Pack 6A [Windows NT Only]
    Microsoft SQL Server 7.0 [Windows NT Only]

JDBC Drivers
    Microsoft SQL Server 6.5, 7.0: SPRINTA JDBC 2.0 Driver version 2000 [Type 4]
    Oracle 8.0.5.0.Production release JDBC [Windows NT, Solaris, Linux]

HTTP Servers (Web Server Types) Operating JRUN 2.3.3 or greater
    Netscape Enterprise Server 3.0, 3.6 [Windows NT, Solaris, Linux, AIX]
    Microsoft Internet Information Server Version 4.0 [Windows NT Only]
    Apache and Stronghold Web Server 2.4.2 [NT, AIX, Solaris, Linux]

Java Development Kit (JDK)
    Recommendation: Sun Compliant JDK minimum version 1.2.2

Example Configurations:
1. Linux Application Server with NT OS running the Database server Application/Web Server: Red Hat Linux version 6.2 with an Apache web server. Database Server: Microsoft NT 4.0 with Service Package 6A and MS SQL version 7 as the database.
2. Linux Application Server with Linux OS running the Database server Application/Web Server: Red Hat Linux version 6.2 with an Apache web server. Database Server: Red Hat Linux version 6.2 with Oracle 8i as the database.
3. NT Application Server with NT OS running the Database server Application/Web Server: Microsoft NT 4.0 with Service Package 6A and IIS version 4 with full options as the Web Server. Database Server: Microsoft NT 4.0 with Service Package 6A and MS SQL version 7 as the database.

The Database Server becomes more critical as database size increases over time. It is feasible for an installation to use a different OS for the application server than that of the database server. Different database engines serve data at different rates (some faster than others) and some networks operate with corporate standards which mandate the use of certain configurations, to standardize application environments for ease of maintenance. For those reasons, the publishing database was developed platform independent. It is functionally transparent whether or not it is installed over Oracle, Sybase, MS SQL or Informix.

The present invention may be installed as part of a related product from Active Data Exchange, Inc., called Active Data Publisher™/Web Server, or it may be a functionally independent device. The setup of the environment of the present invention is the same as the Application/Web server environment.

F. Examples of Syndication use and Application

Case One: Large organization with multiple web sites (Public and Private)

A large organization has multiple web sites to manage, both public (visible to all) and private (internal and departmental in nature). The sites are repositories for a wide variety of information specific to their department of corporate division. There are, however, many assets which are frequently reproduced and shared among those sites. If a directive from Senior Management needs to be presented on each of the sites, conventional content management tools would require the HTML editors to re-post the directive on each and every site. This repetitive process creates organizational inefficiencies.

Using the present invention, an HTML snippet is placed on the page in the place where information bulletins will be seen. (See FIGS. 10A and 10B which illustrate an HTML snippet.) Every time a new information bulletin is released, the web page is automatically updated, without technology intervention. Furthermore, the bulletin is created in the native environment frequently used by the author or their assistant, and posted once through an intuitive, easy to use interface module which converts the document to HTML, enters the data into the syndication database, and prepares it for view on the site.

Case Two: Supply Chain Information Management

A manufacturer manages information streams from raw materials suppliers (upstream providers) to distributors (end users). The management objective is to assure that the end user receives the completed goods at a fair price in a timely manner, and that the raw materials suppliers notify the manufacturer of delays in shipments, which, in turn, affect product availability. If one believes that the main differentiation between suppliers of similar materials is their ability to enhance communications with clients and vendors, and that issue singularly is what is going to set apart one from another, then the implementation of the tools provided by the present invention is the linchpin in corporate success. In this example, it is helpful from a supply management role to understand the needs of the client and the ability for the vendor to supply product to create the materials for the client. Subscribing to the notion of apportioned web real estate, and having particular areas designated for information relevant to those in the supply chain, a new communications modality is created called a Digital Information Network that is linking the supplier and the end user in such a fashion as to be able to enhance the decision process, increase productivity, and enhance the digital economy.

IV. Detailed Description of a Second Preferred Embodiment

The second preferred embodiment may be used with Active Data Syndicator v.3.

A. Detailed Explanation of Figures and Appendix

Figure 14:
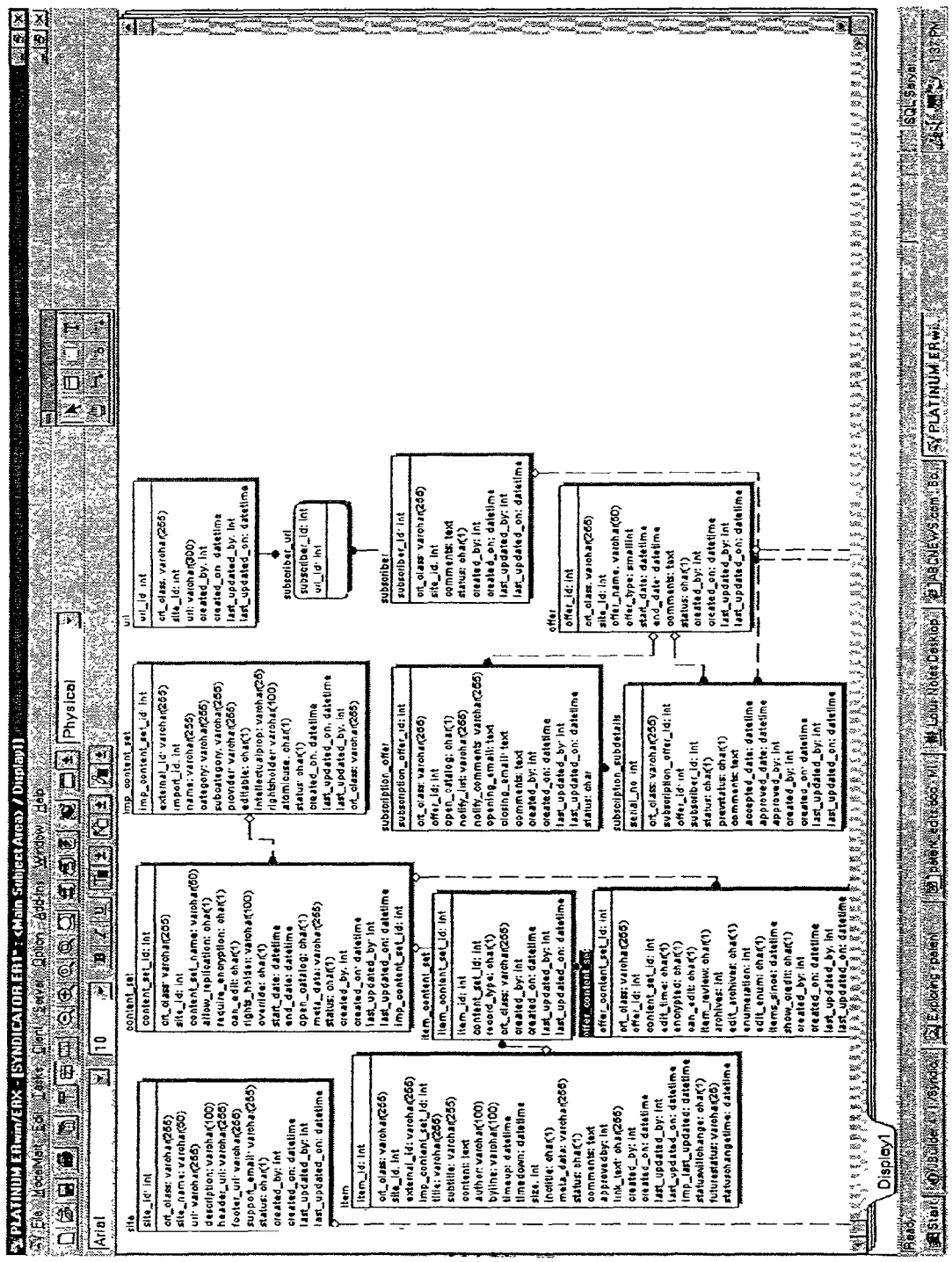
FIG. 14 is a database schema for the second preferred embodiment of the present invention.

FIG. 14 is a self-explanatory database schema for the second preferred embodiment. FIG. 14 shows only the portion of the database schema that relates to the present invention.

Figure 15A:
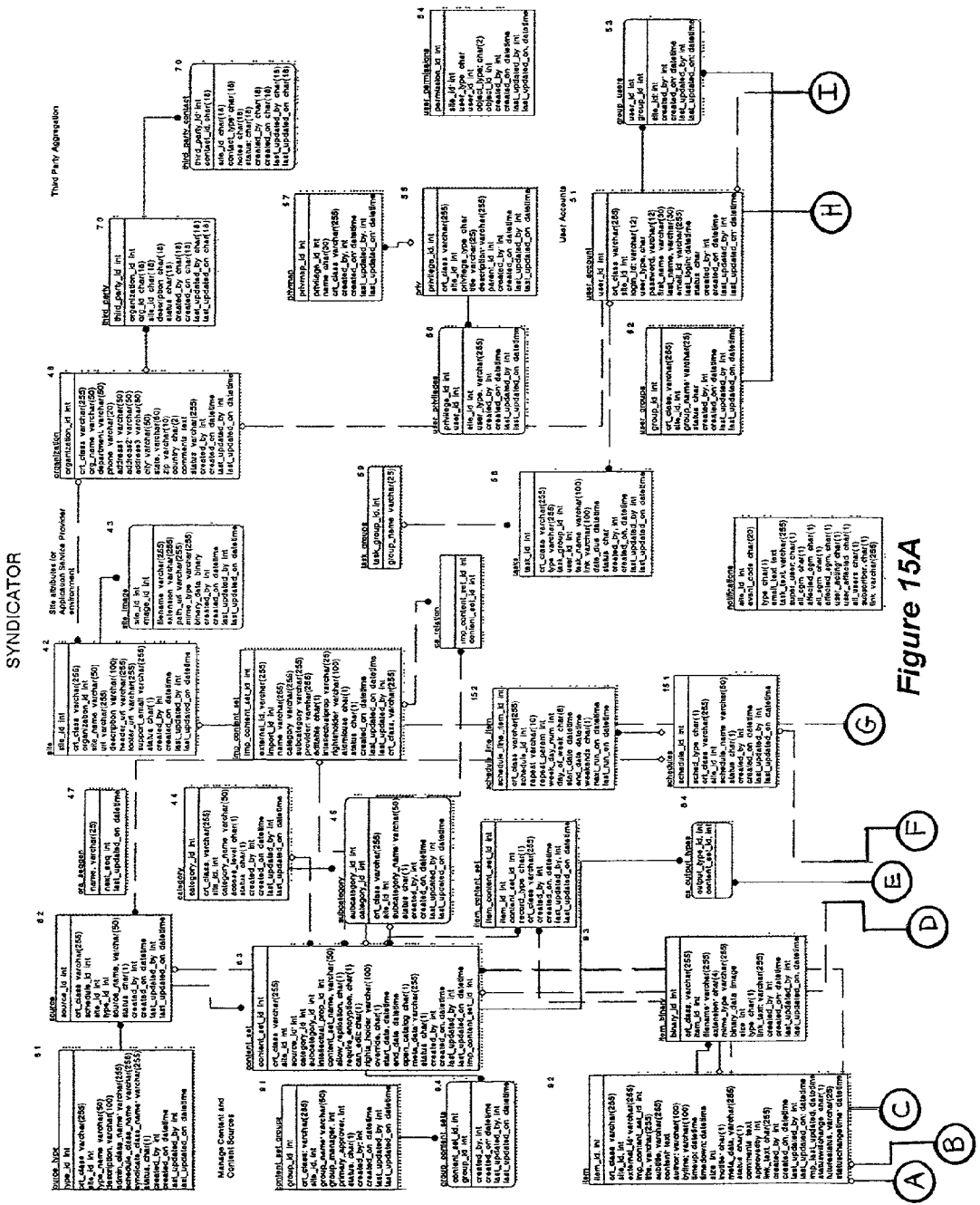
FIGS. 15A and 15B, taken together, are overall schemas for the second preferred embodiment of the present invention.
Figure 15B:
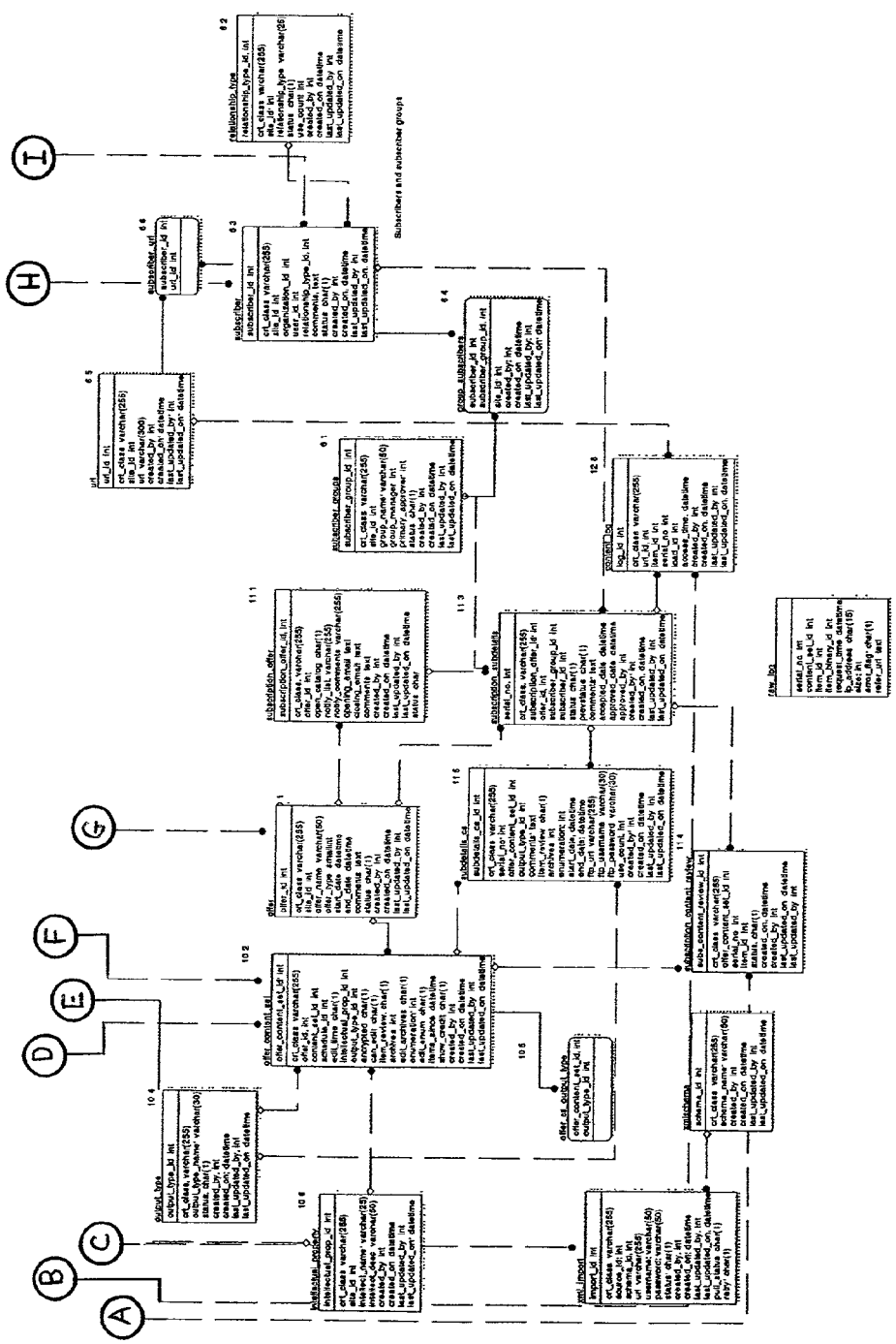

FIGS. 15A and 15B, taken together, are self-explanatory overall schema for the second preferred embodiment.

Figure 16:
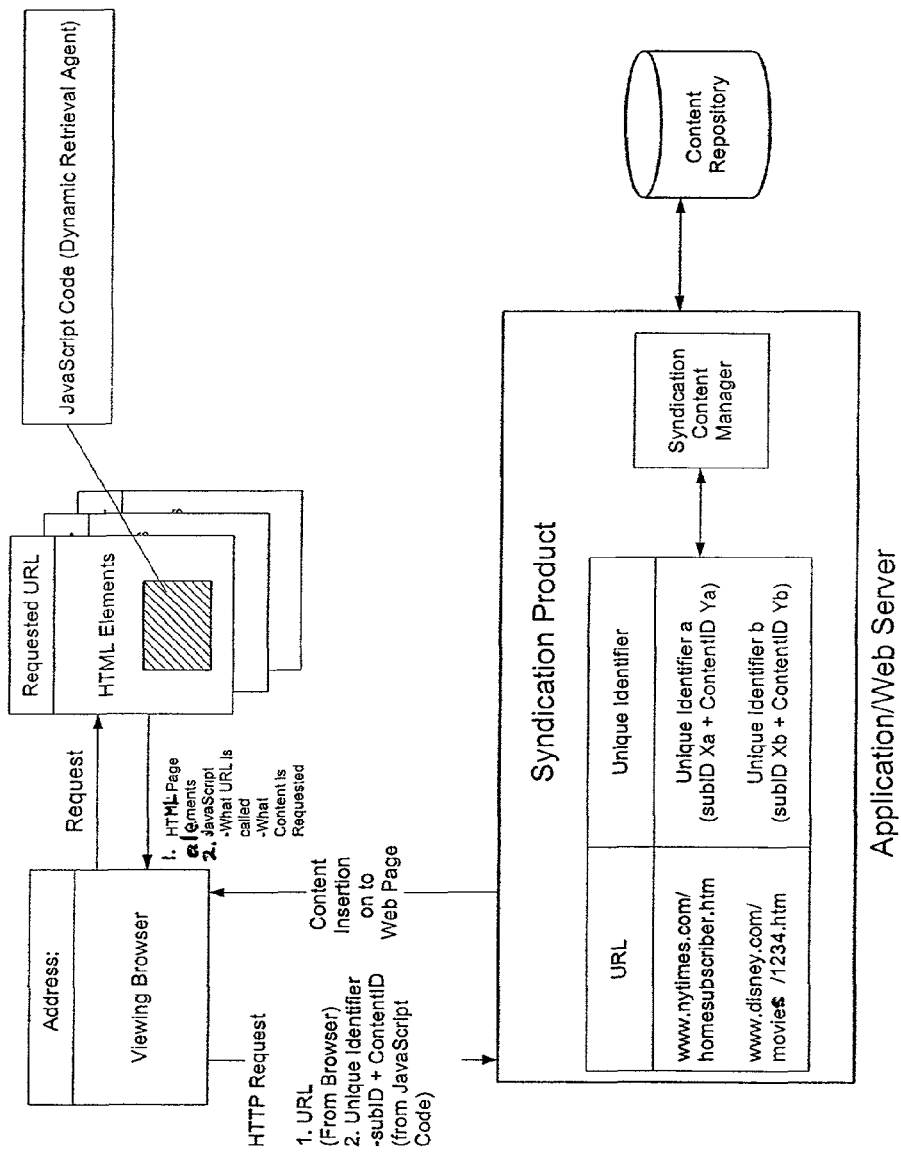
FIG. 16 is a schematic block diagram of the second preferred embodiment of the present invention.
Figure 2:
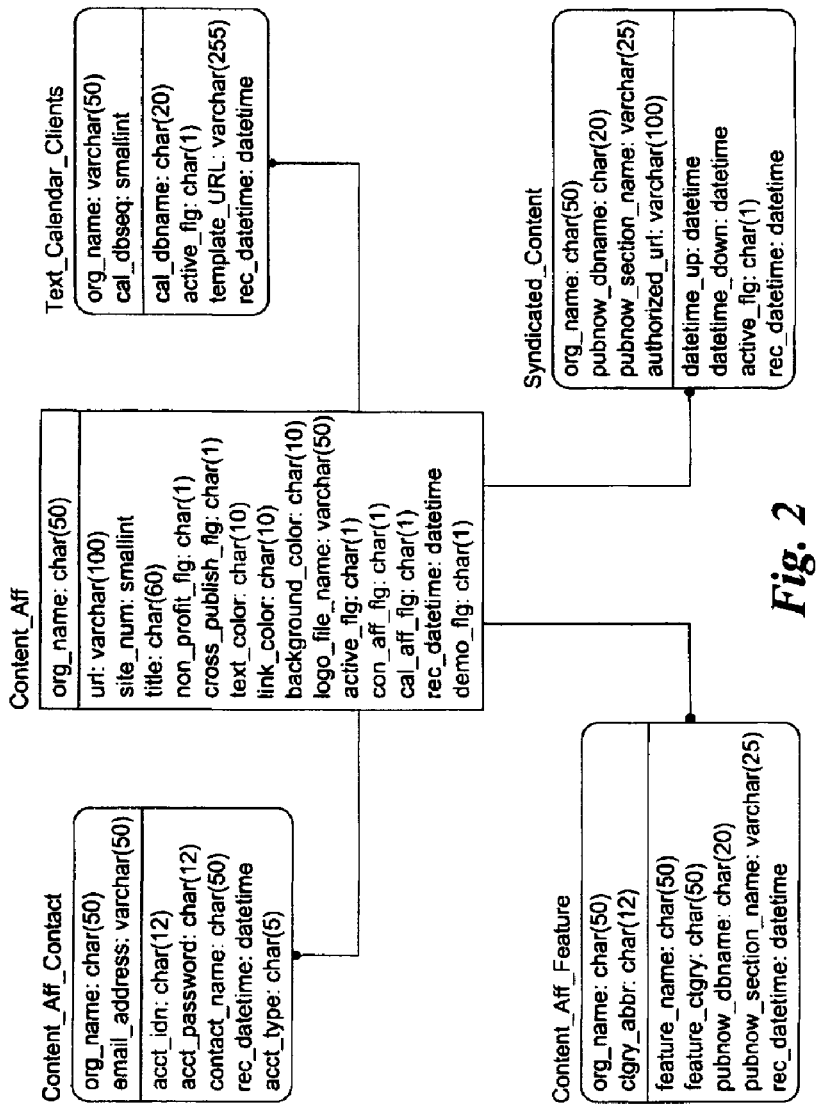
Figure 3:
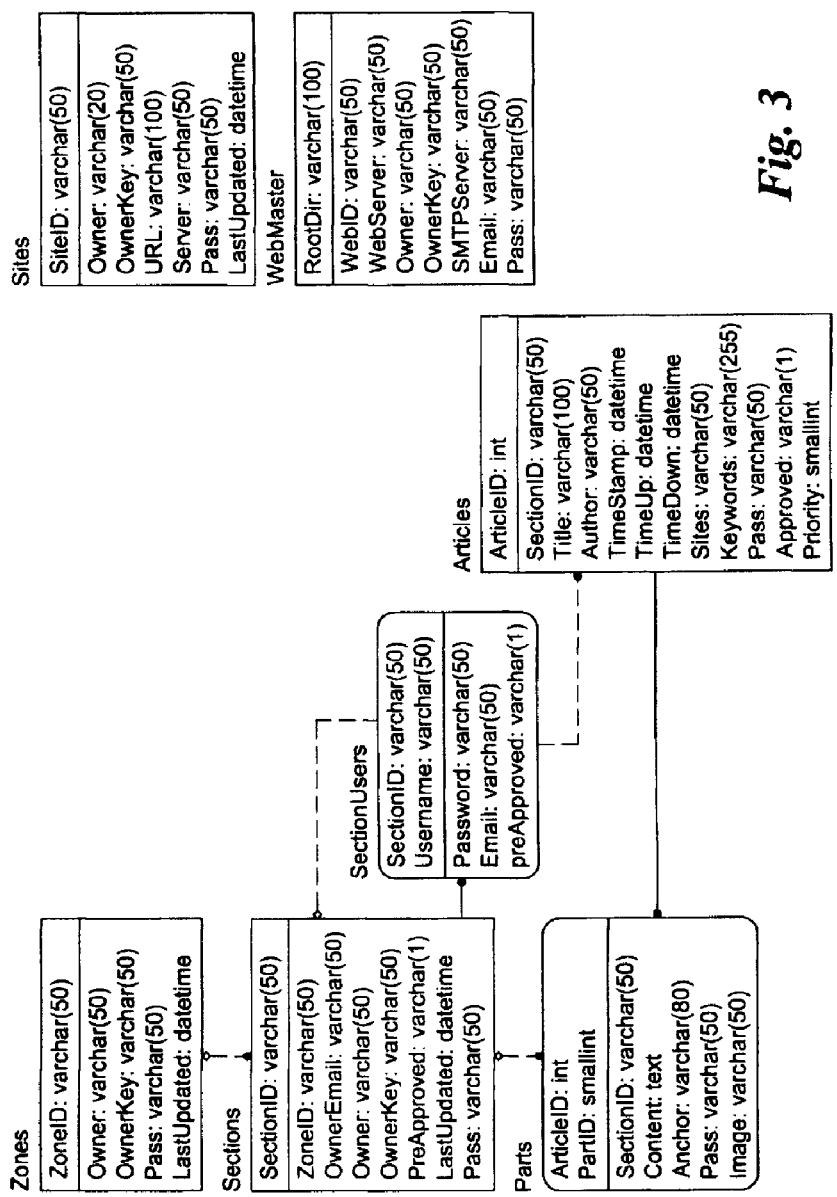
Figure 4:
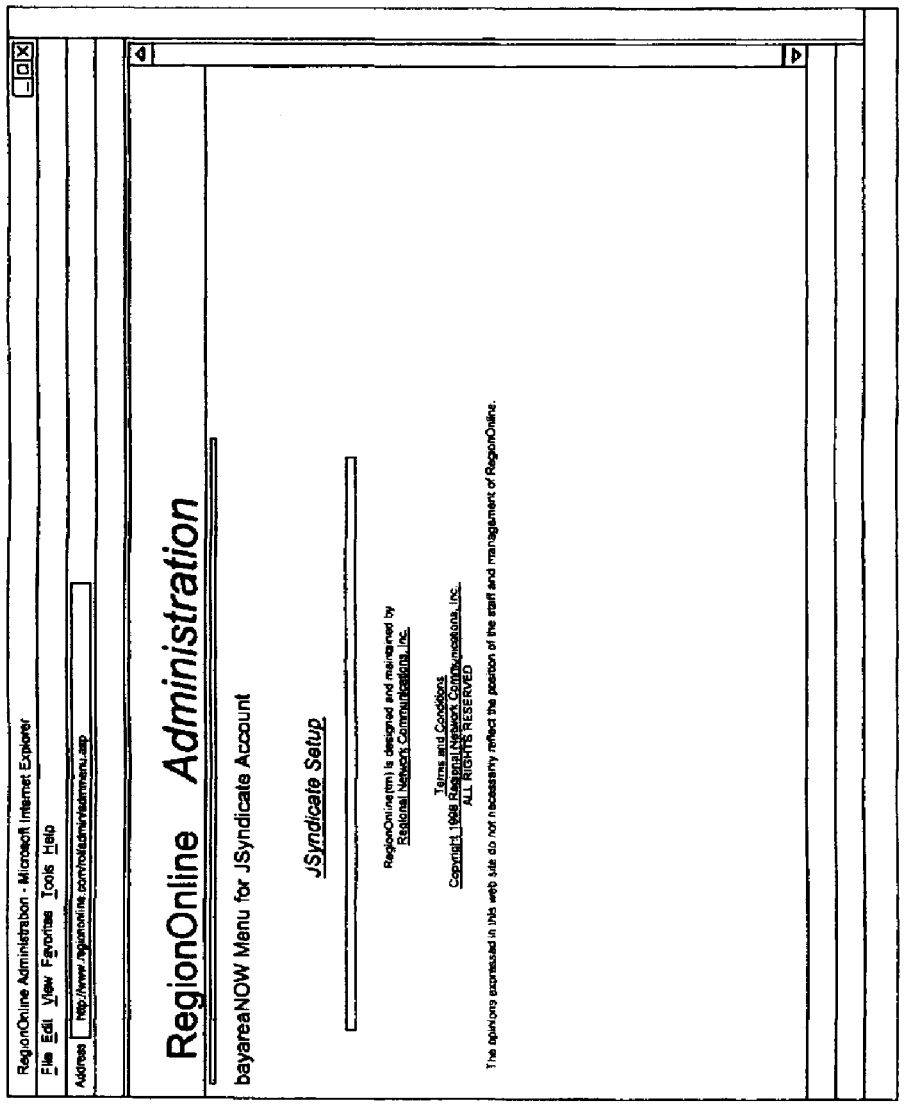
Figure 5:
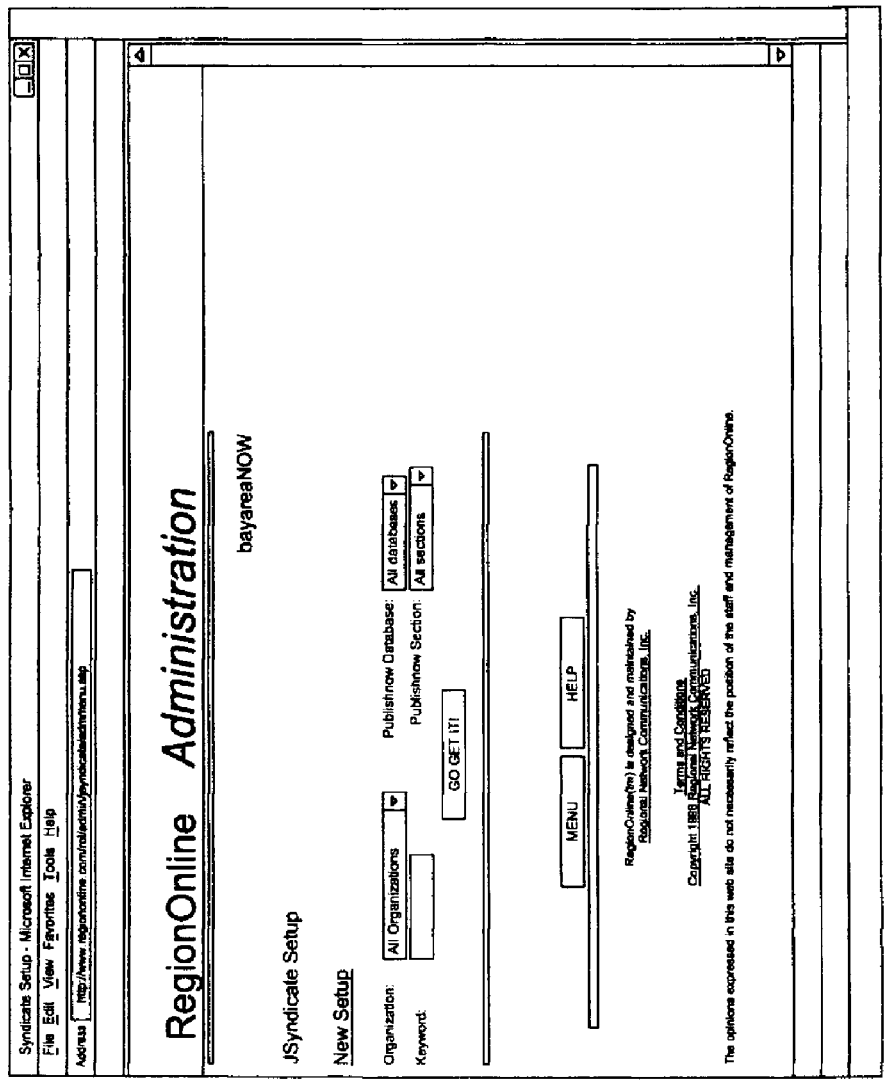
Figure 6:
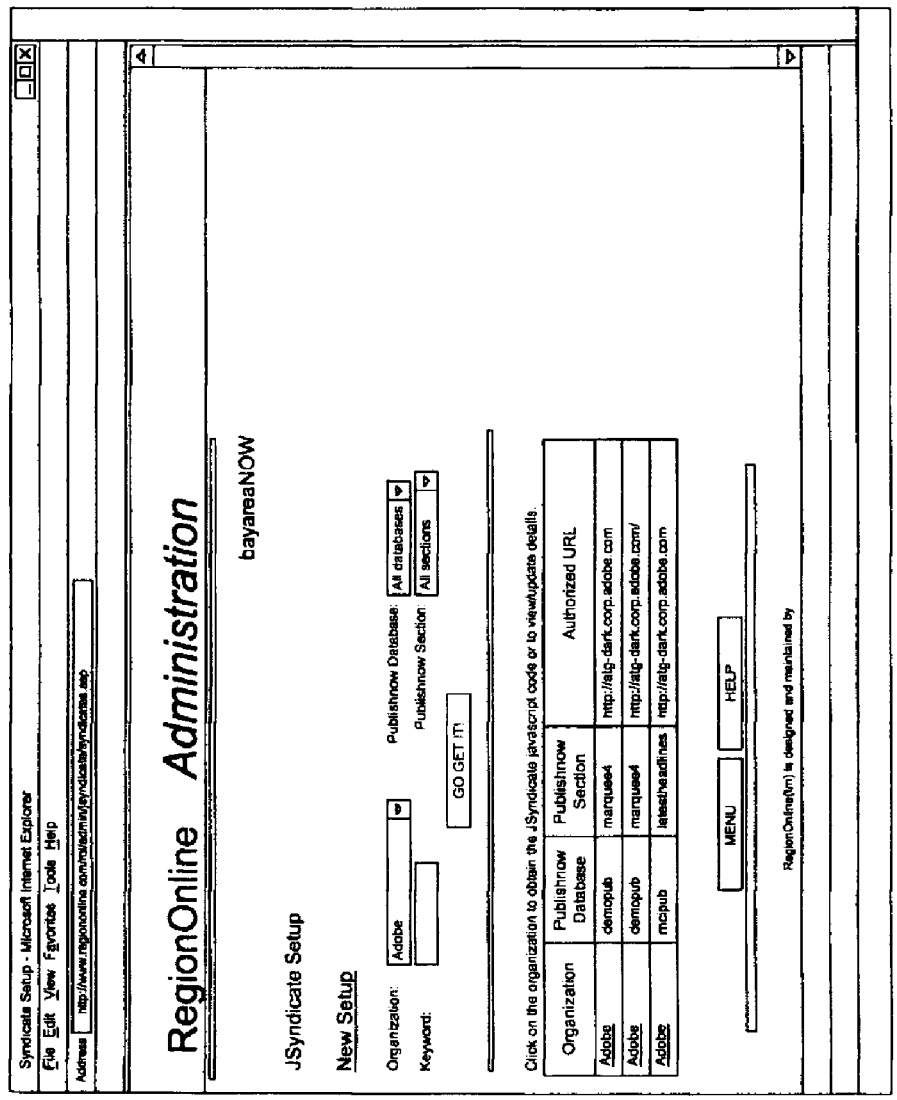
Figure 7:
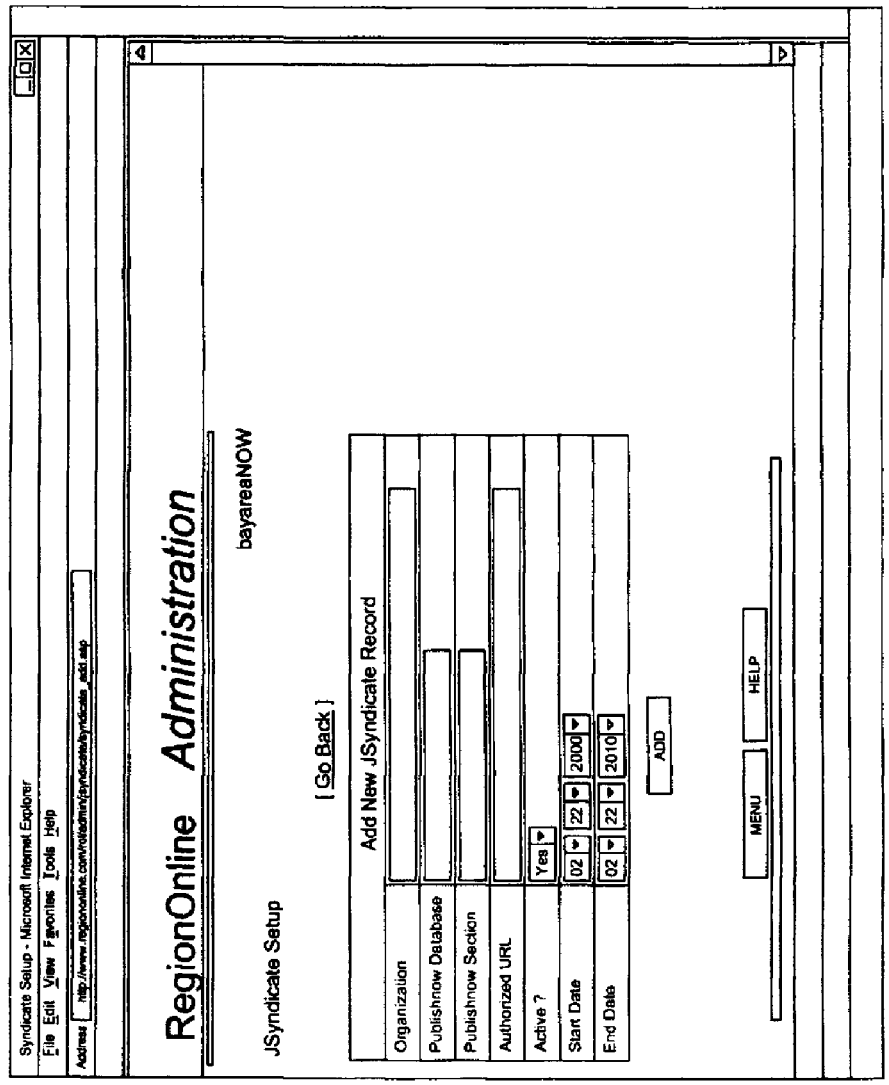
Figure 9:
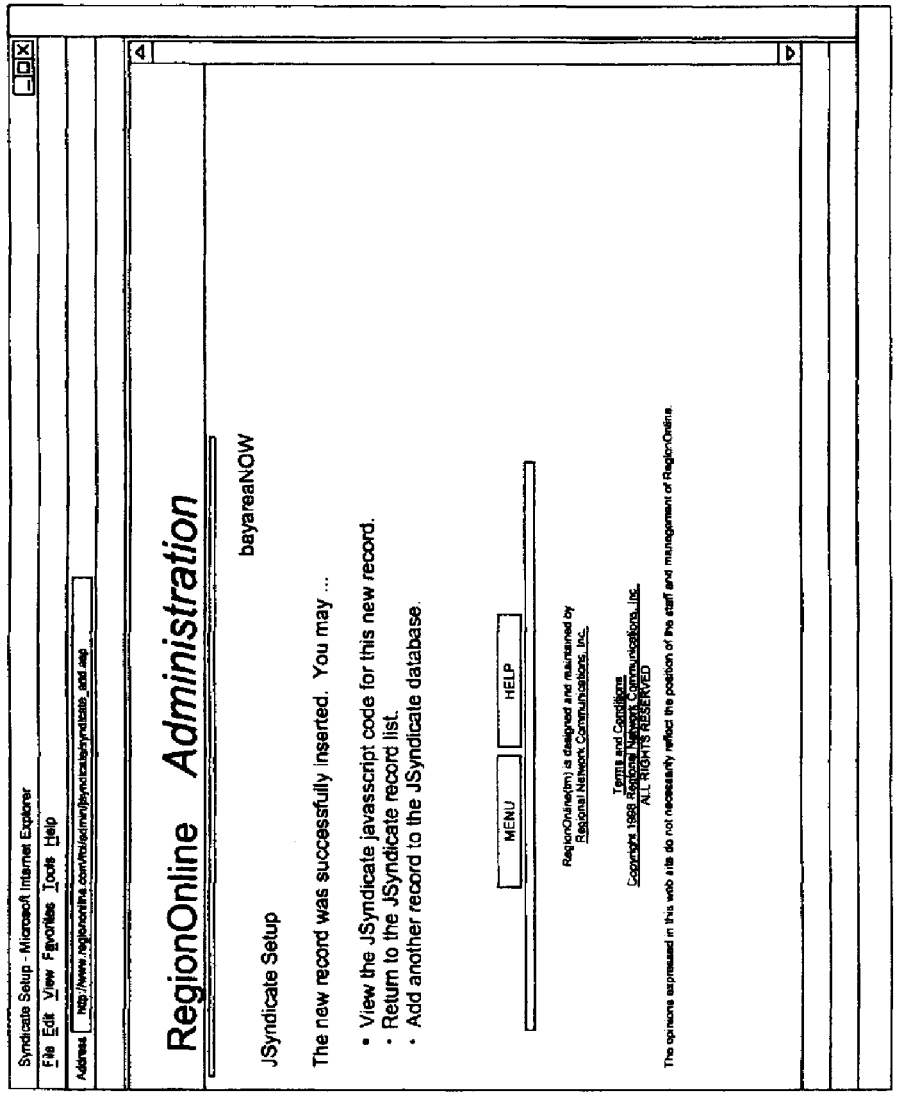
Figure 10B:
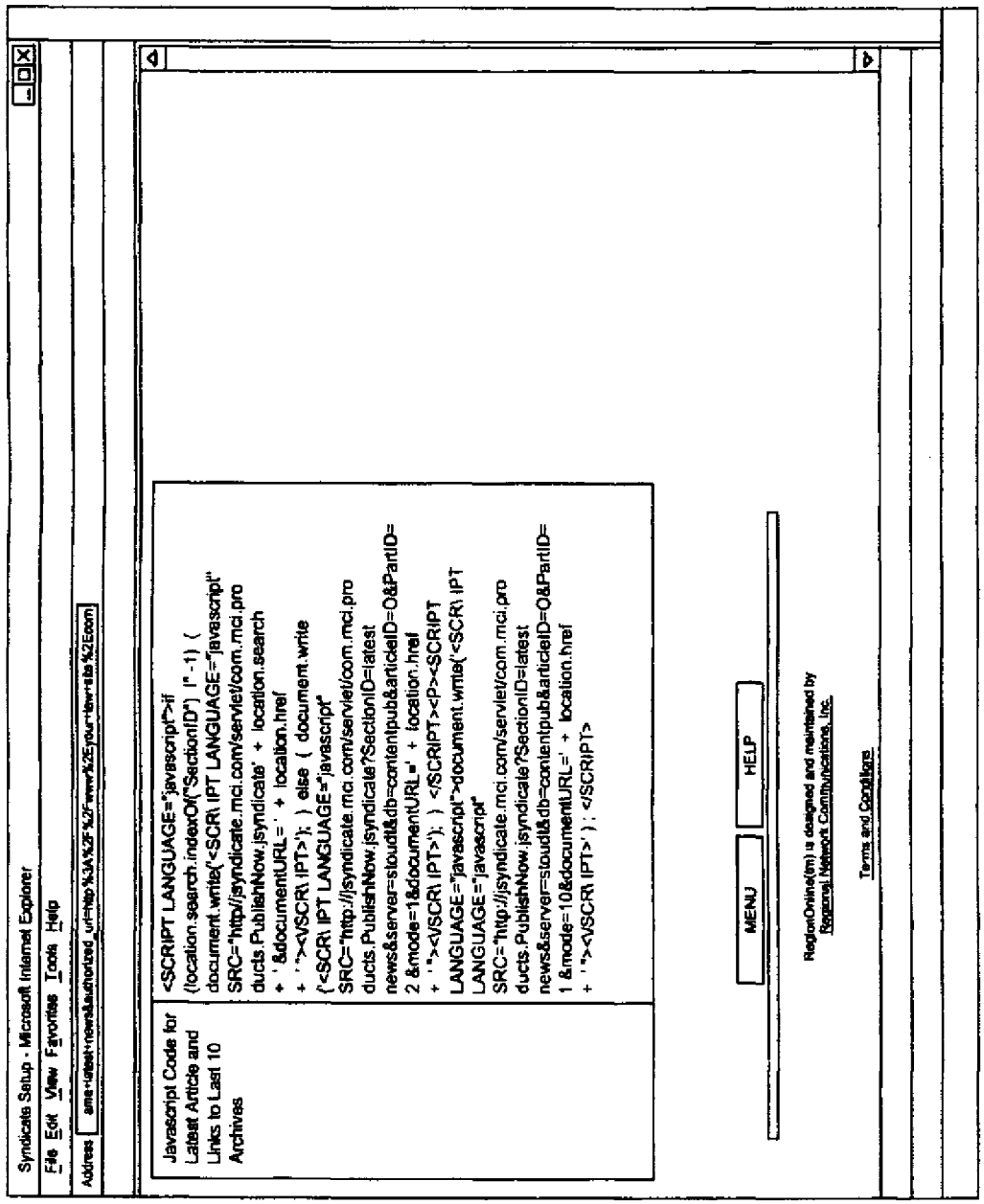
Figure 11:
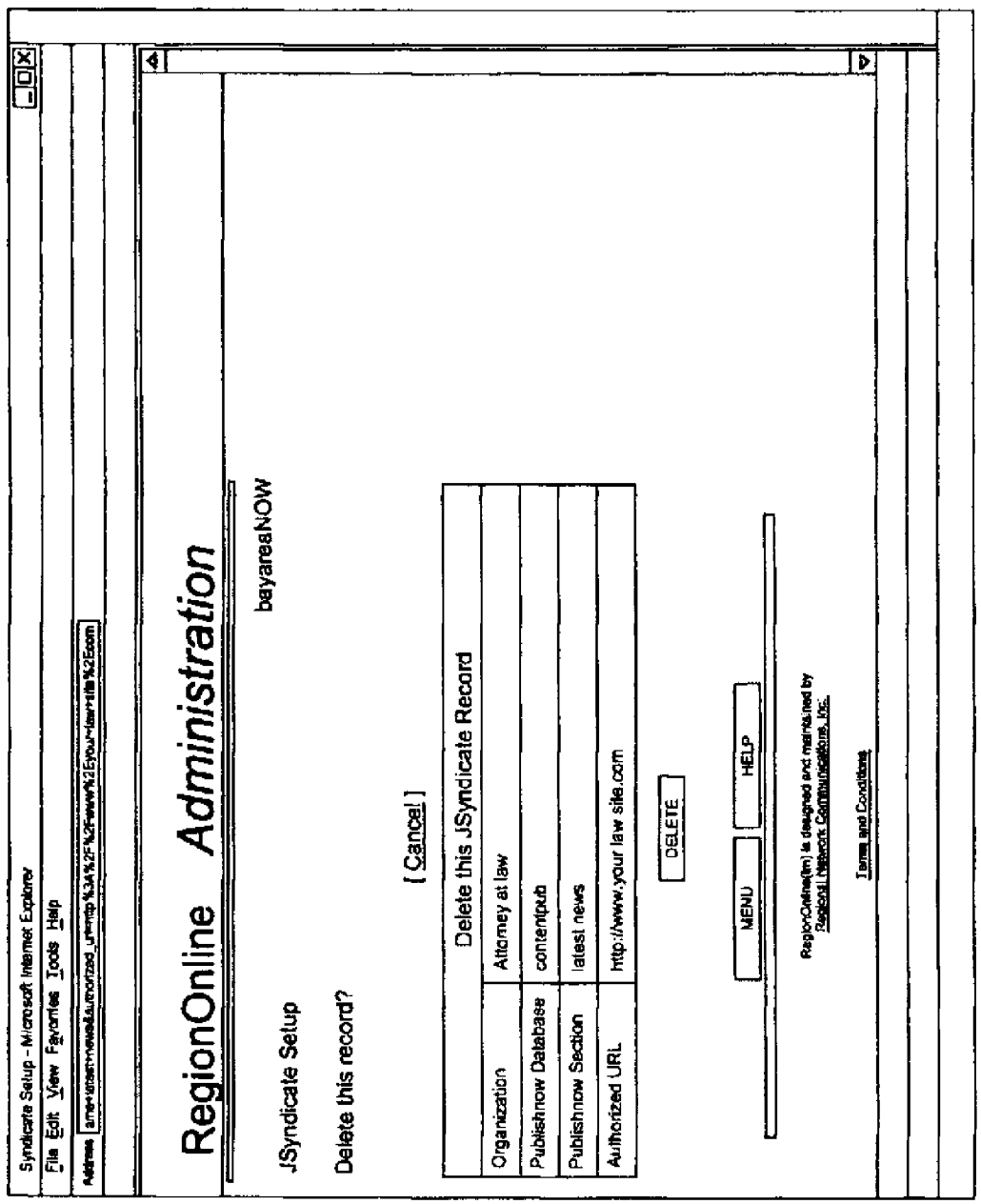
Figure 12:
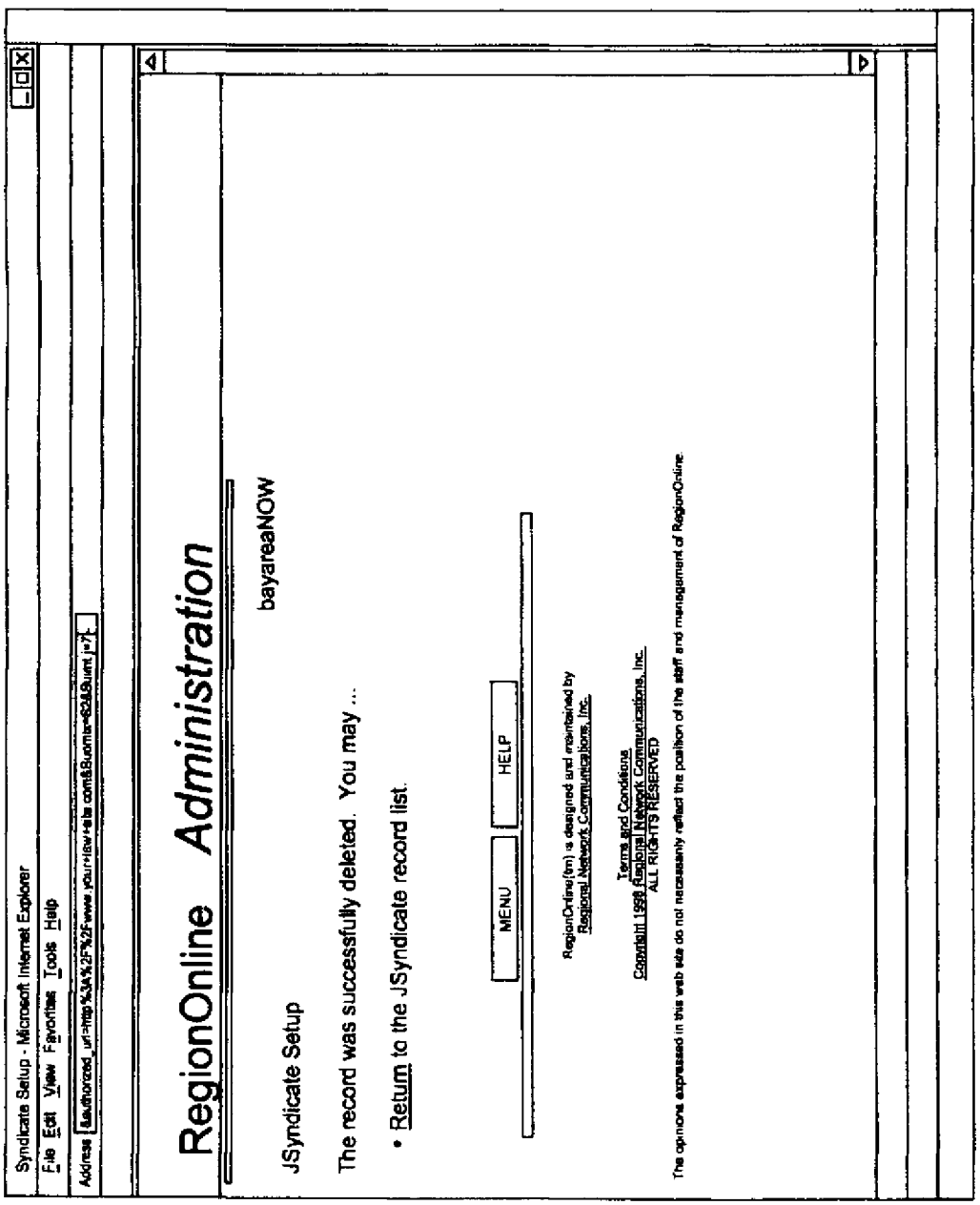
Figure 13A:
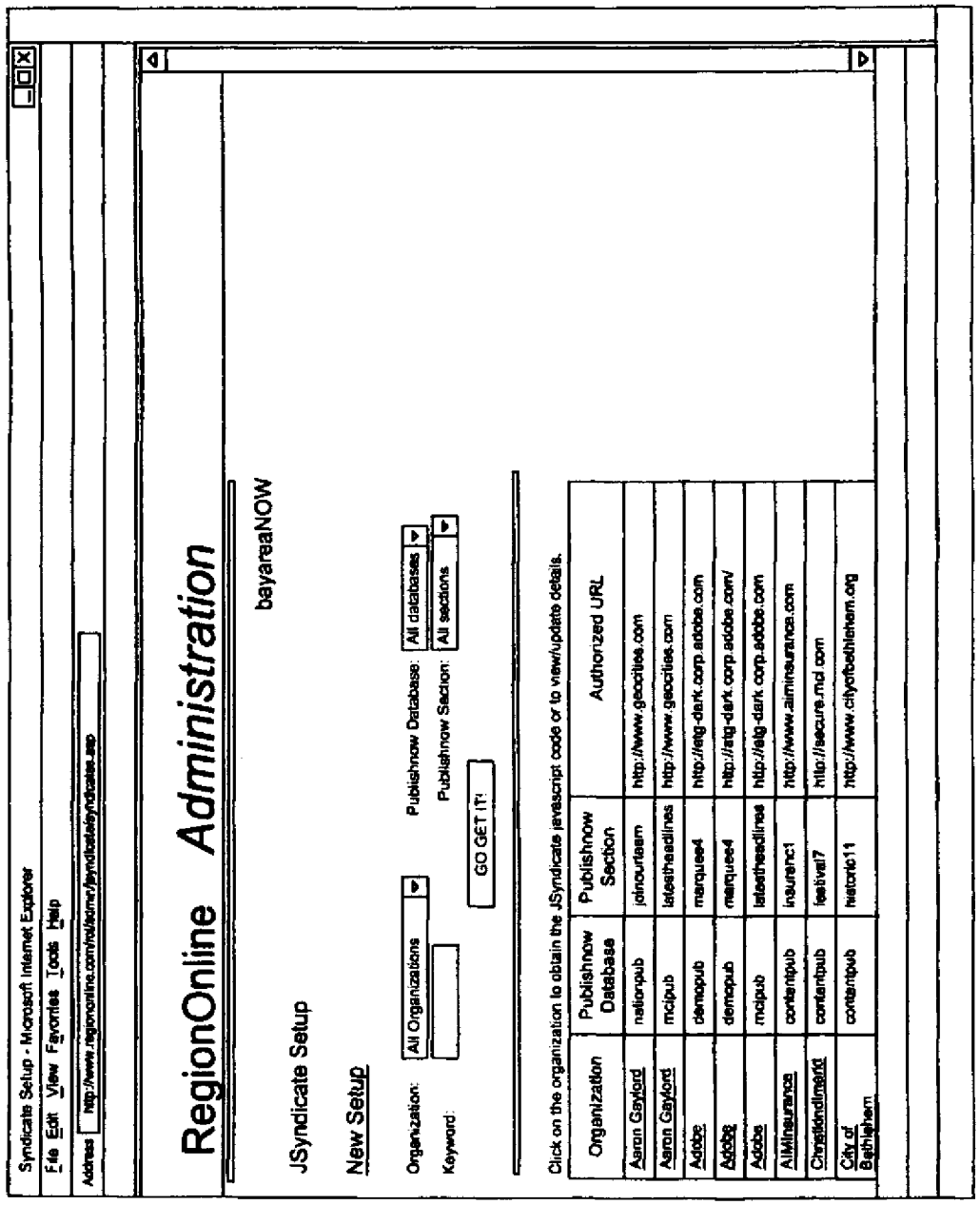
Figure 13B:
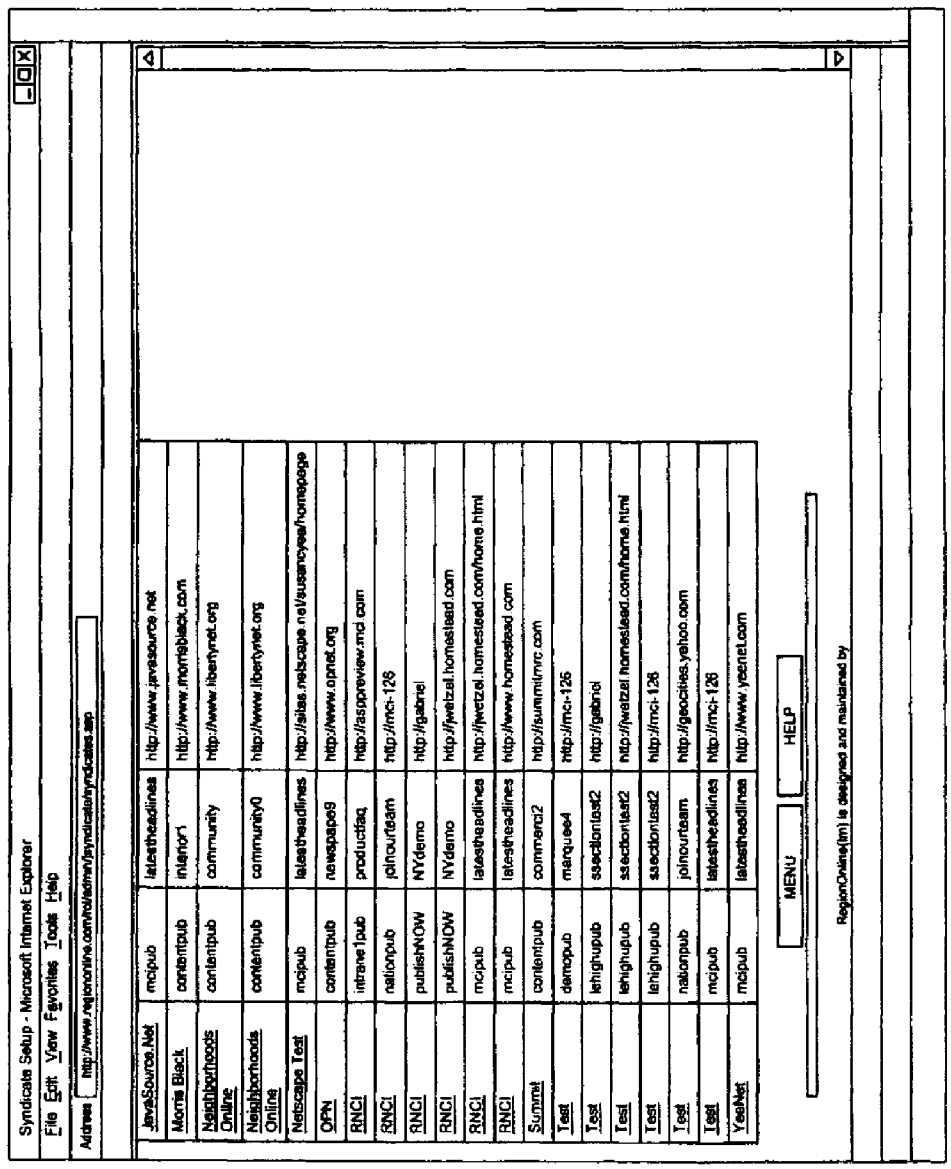
Figure 14:
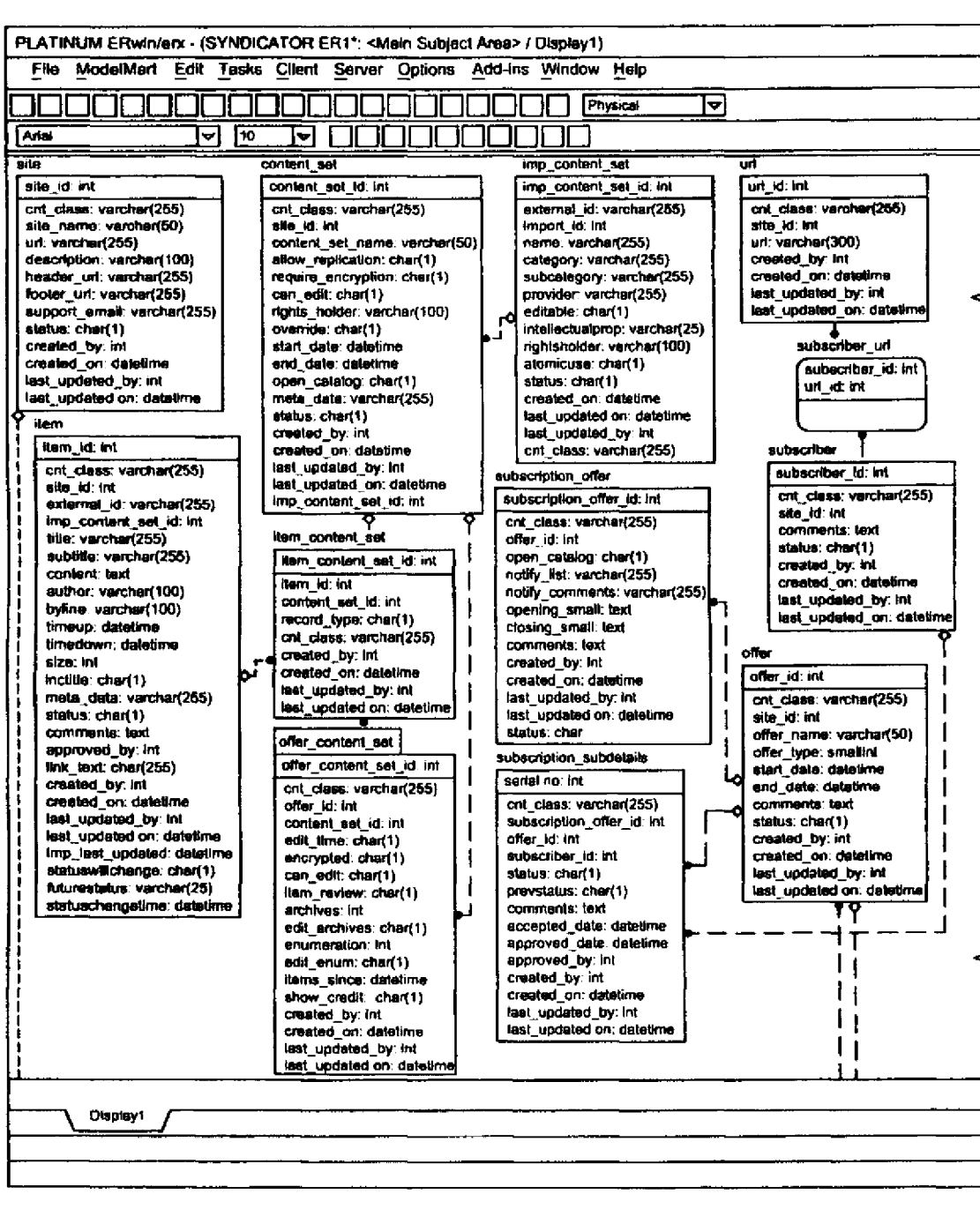
Figure 15A:
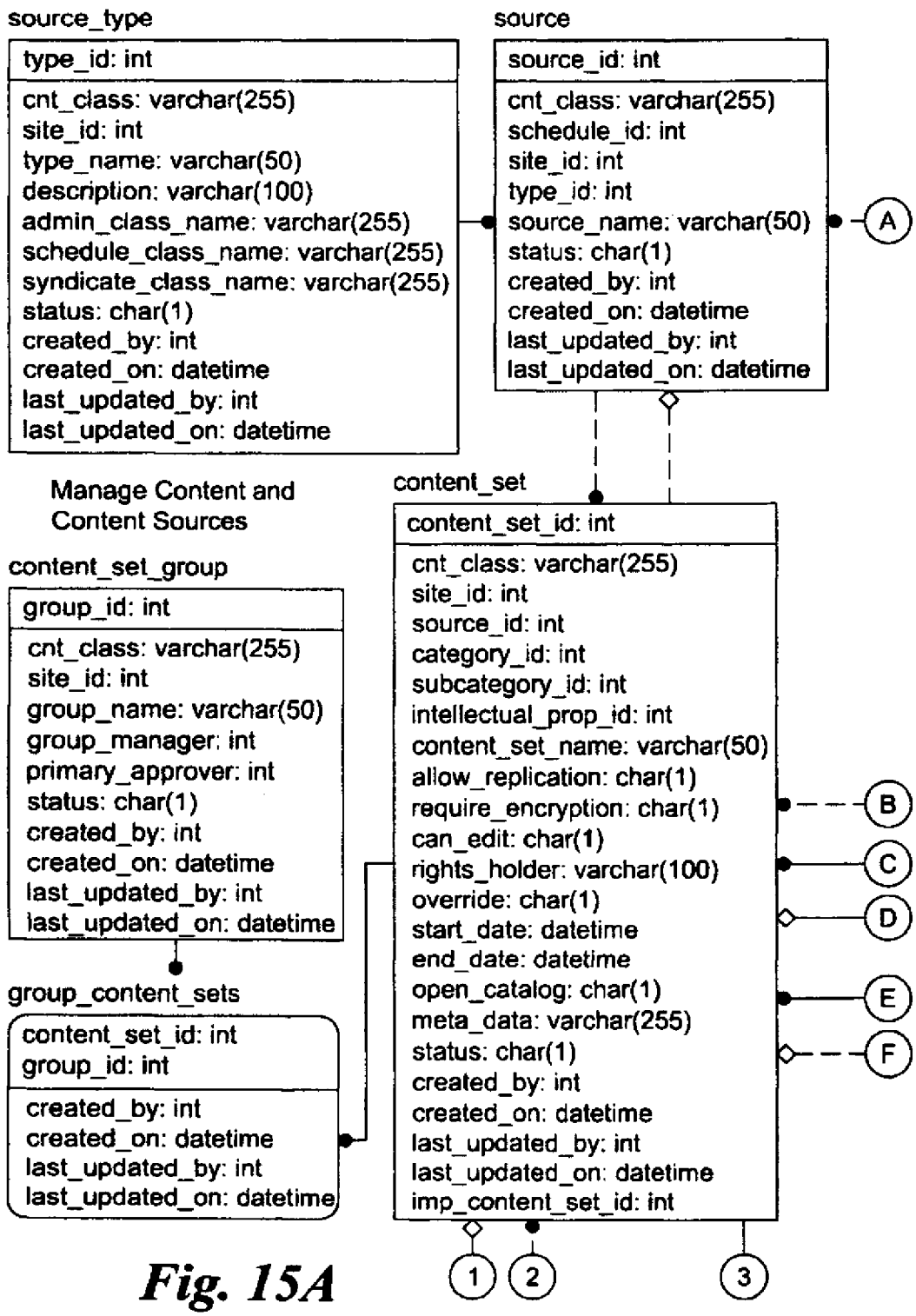
Figure 15B:
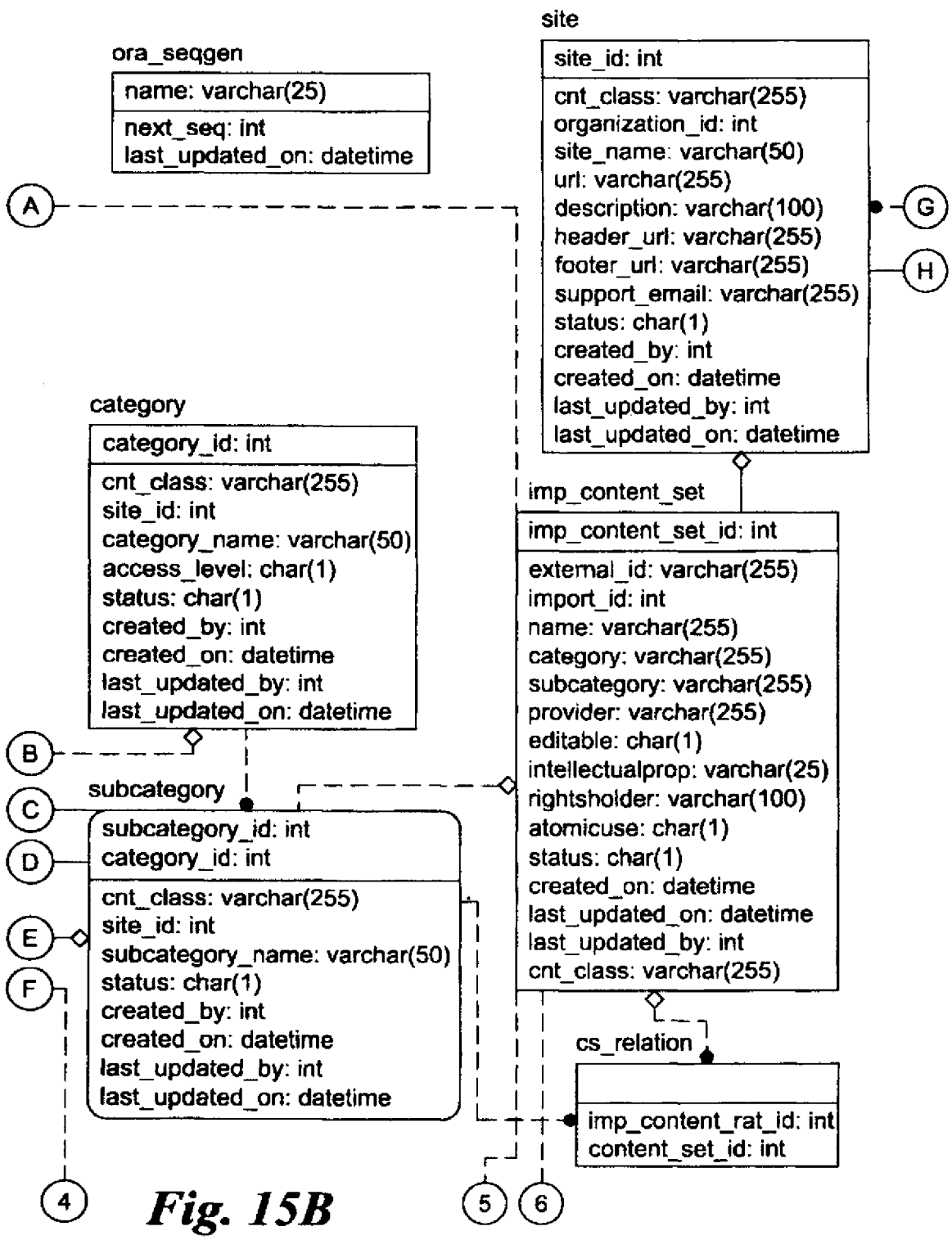
Figure 15C:
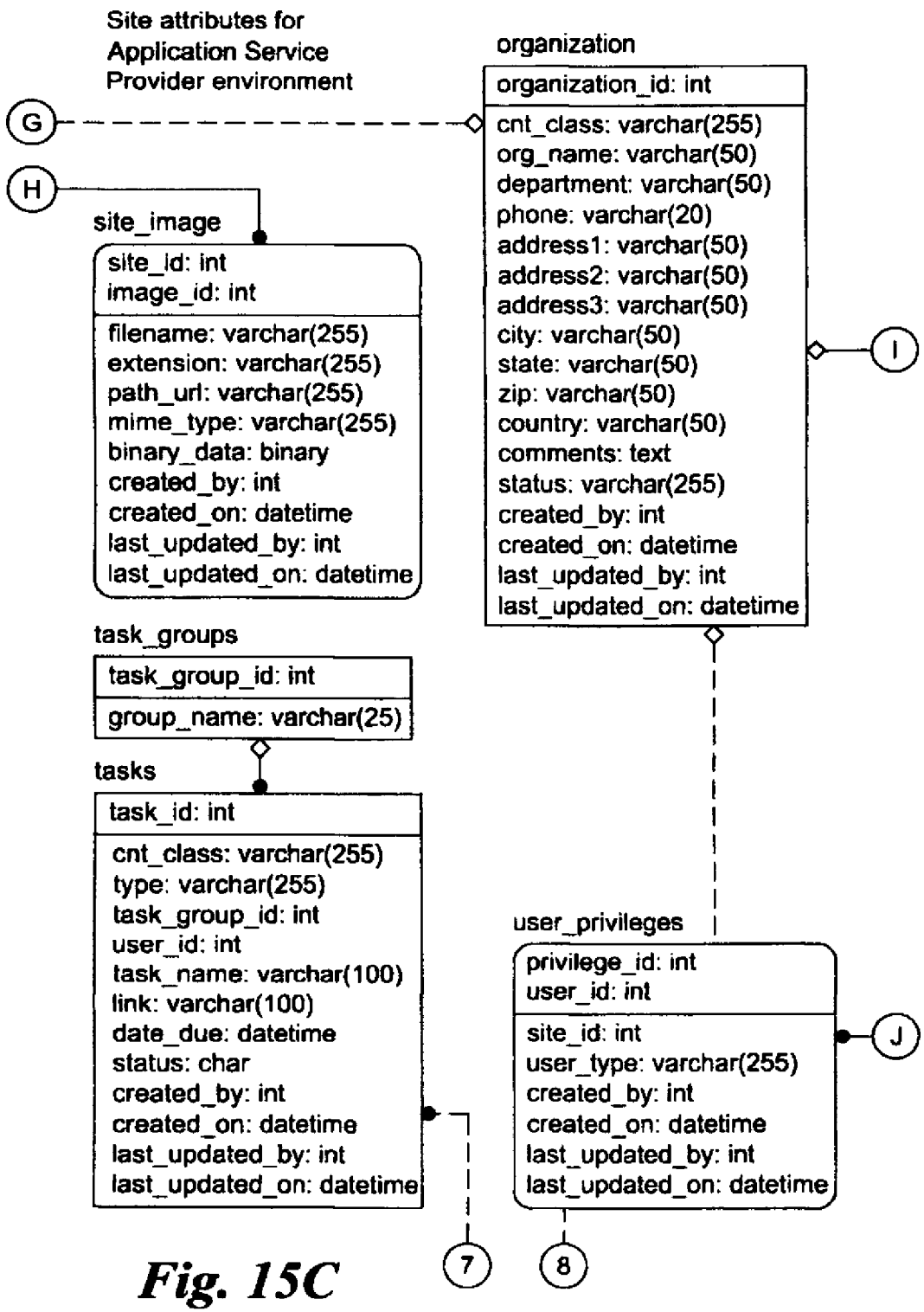
Figure 15D:
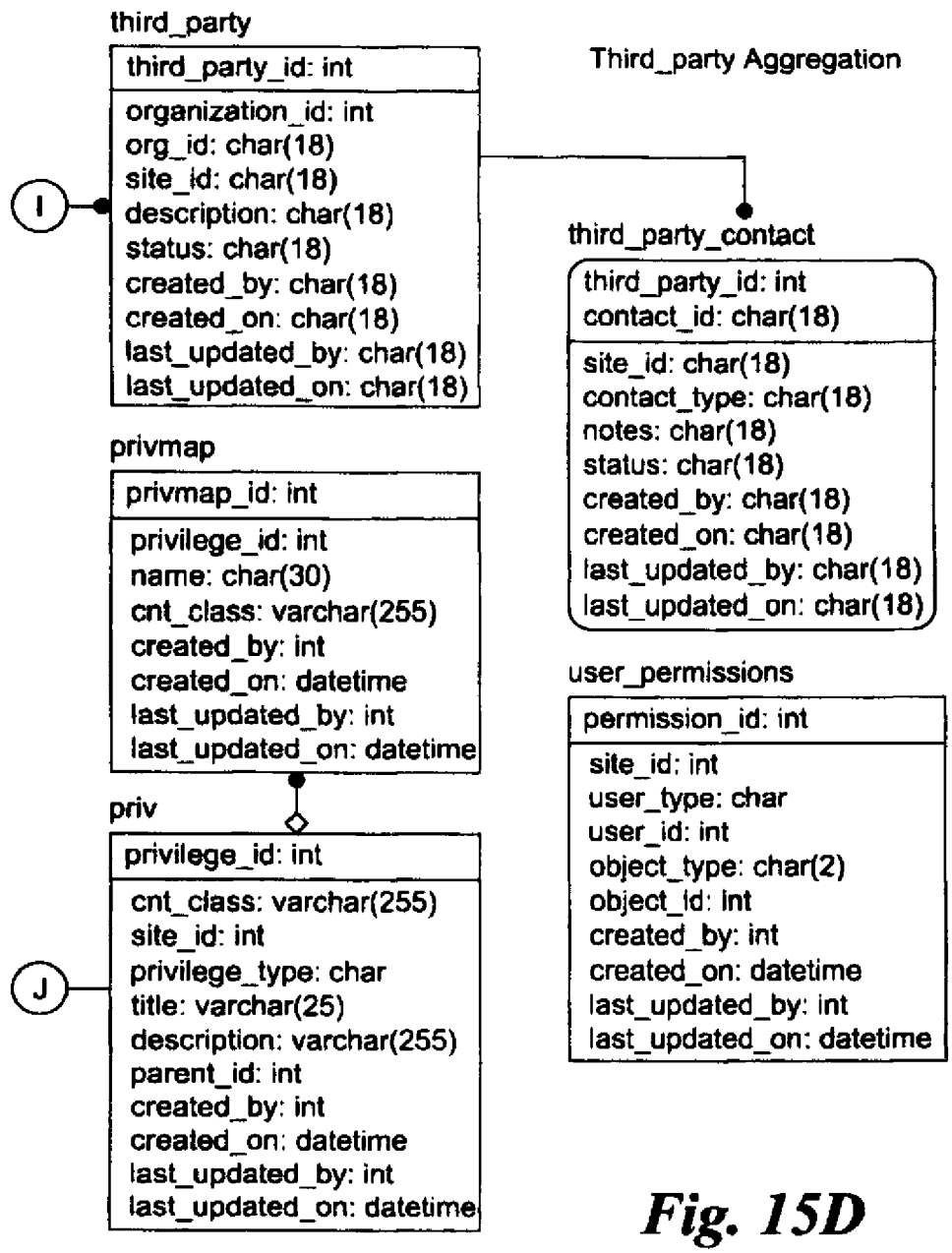
Figure 15E:
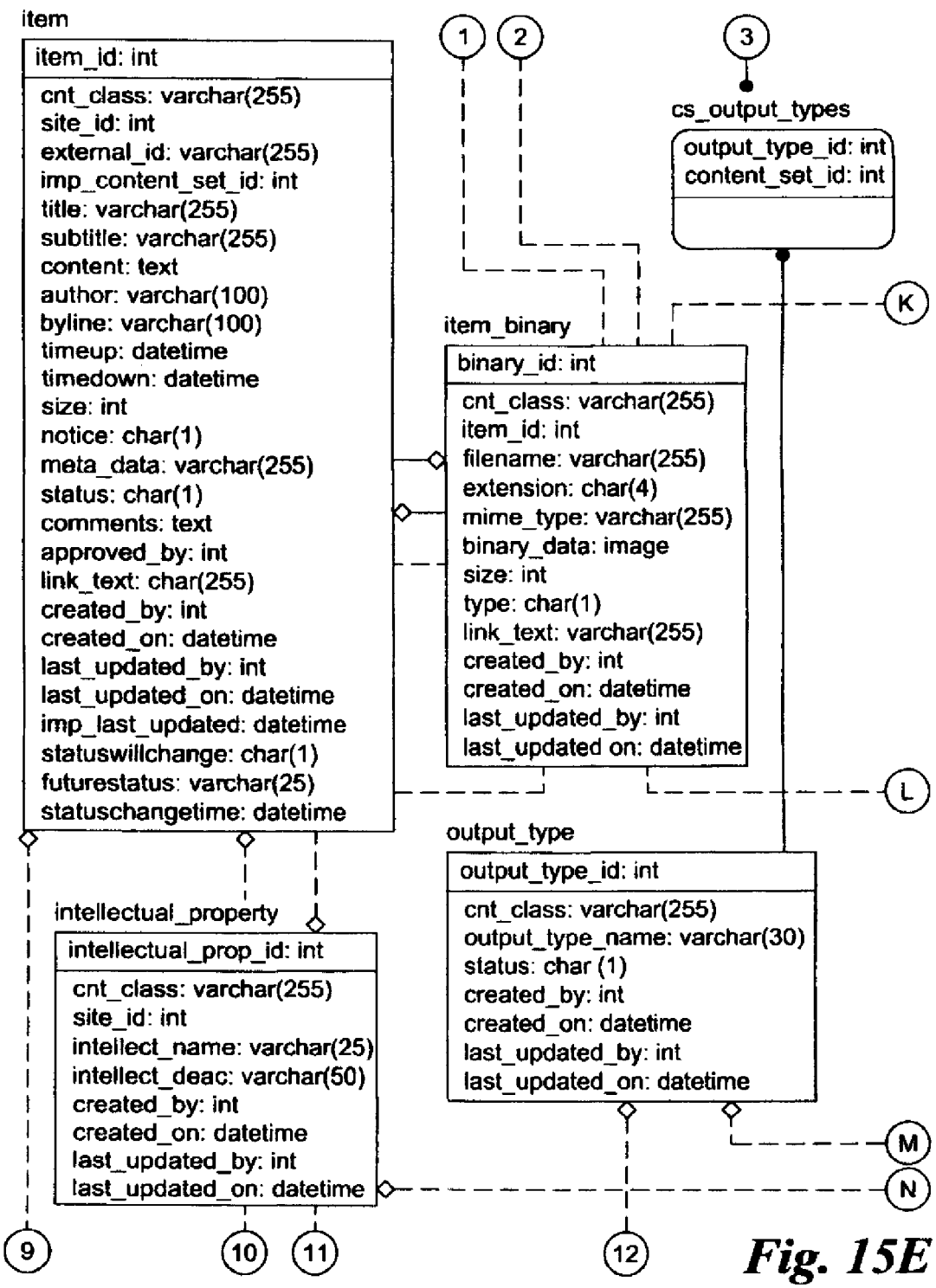
Figure 15F:
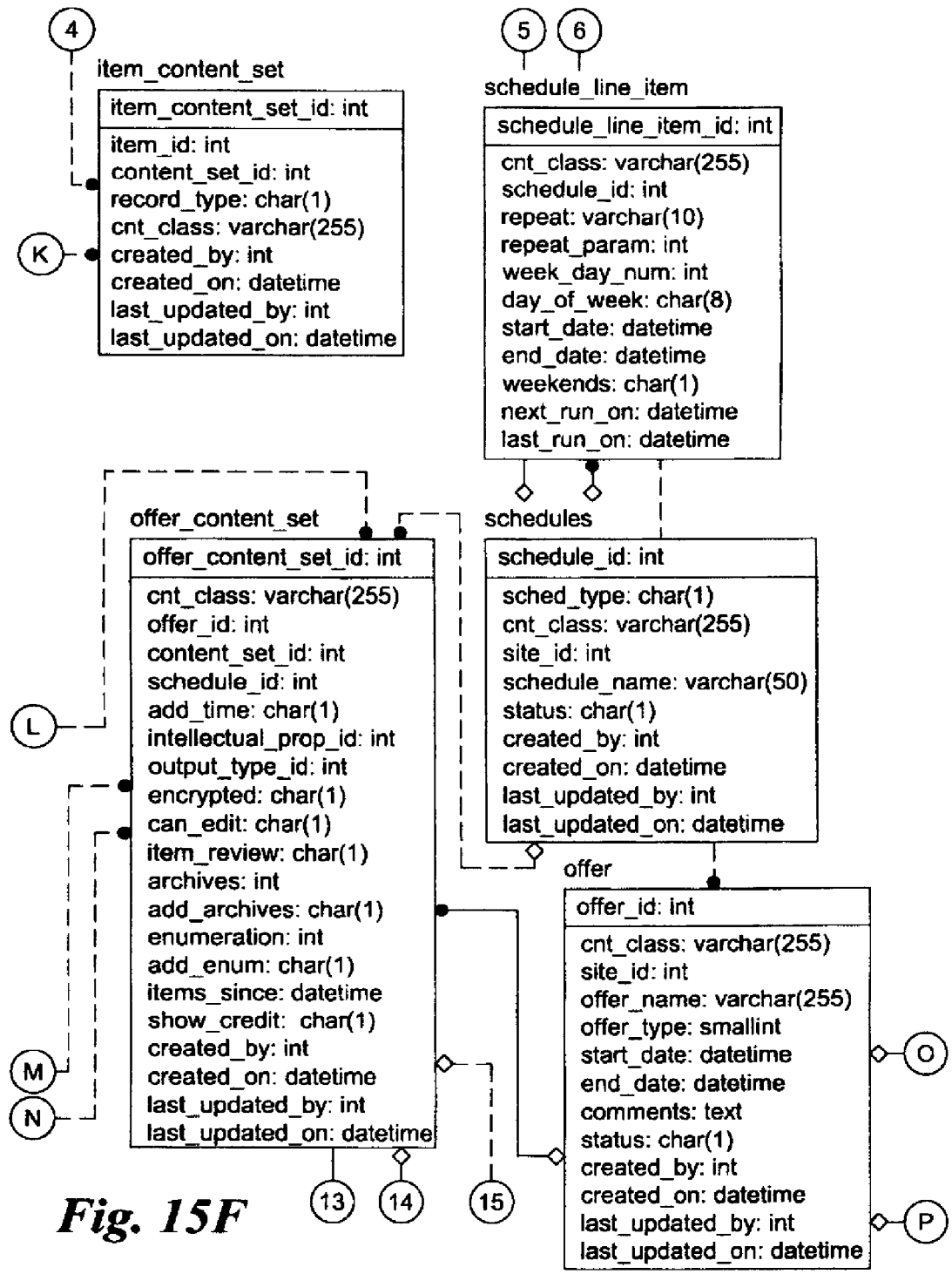
Figure 15G:
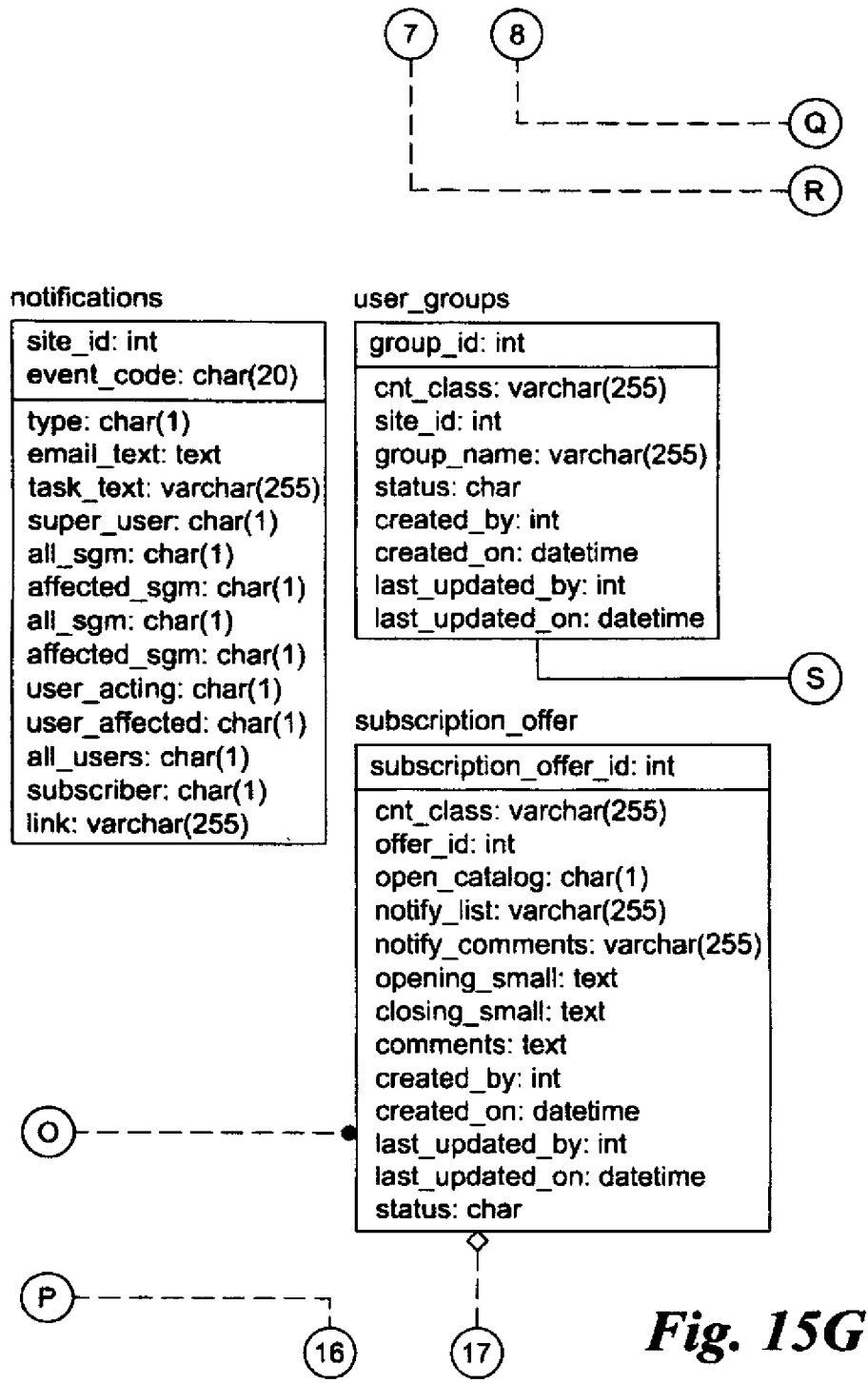
Figure 15H:
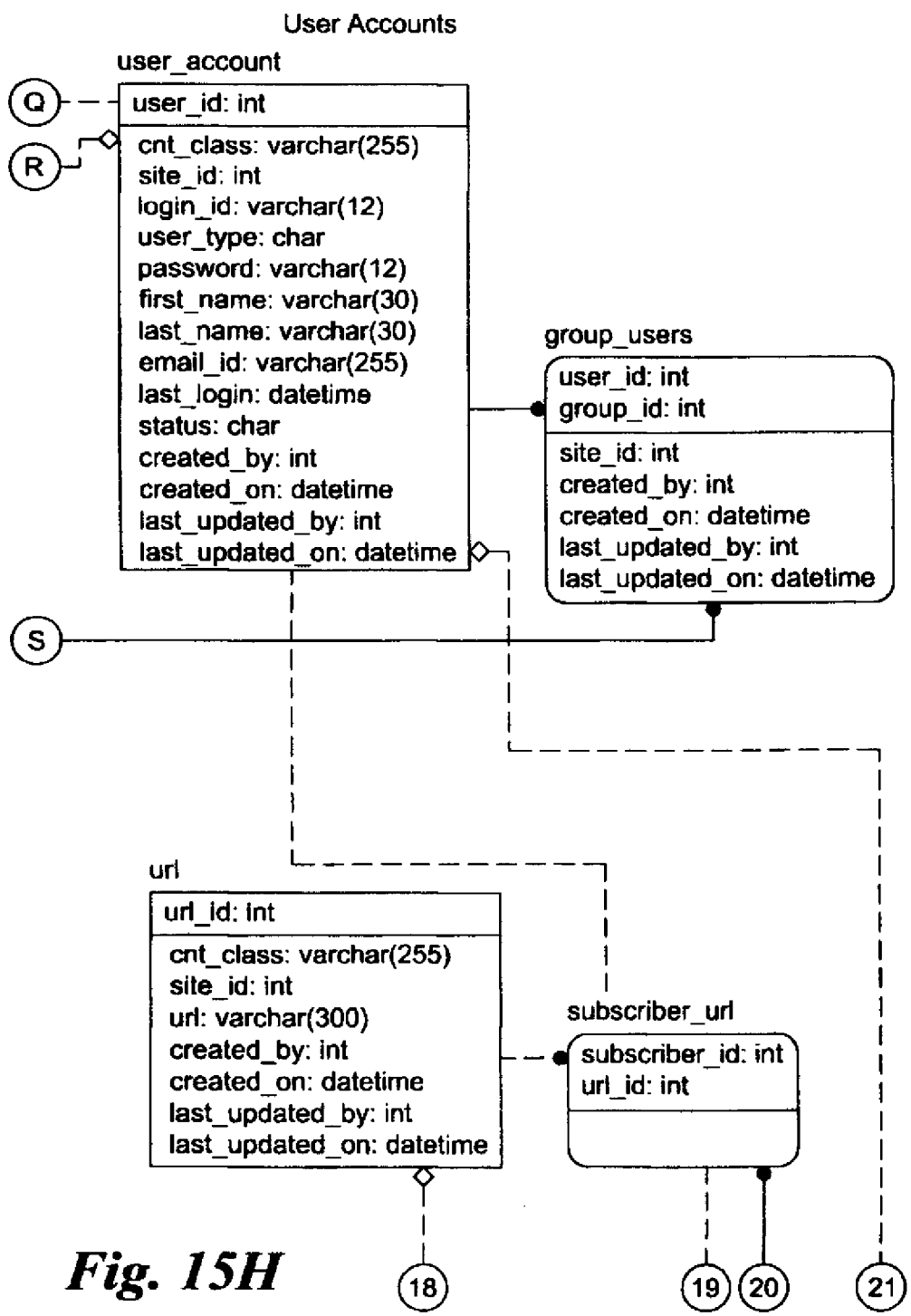
Figure 15I:
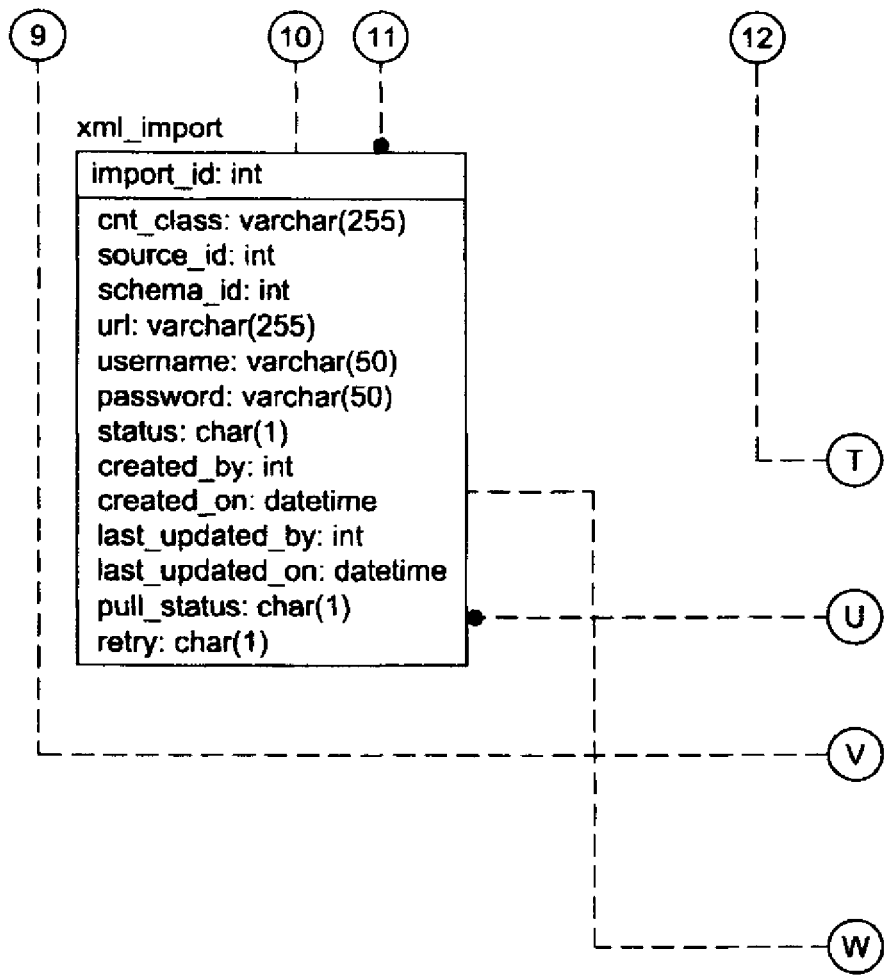
Figure 15J:
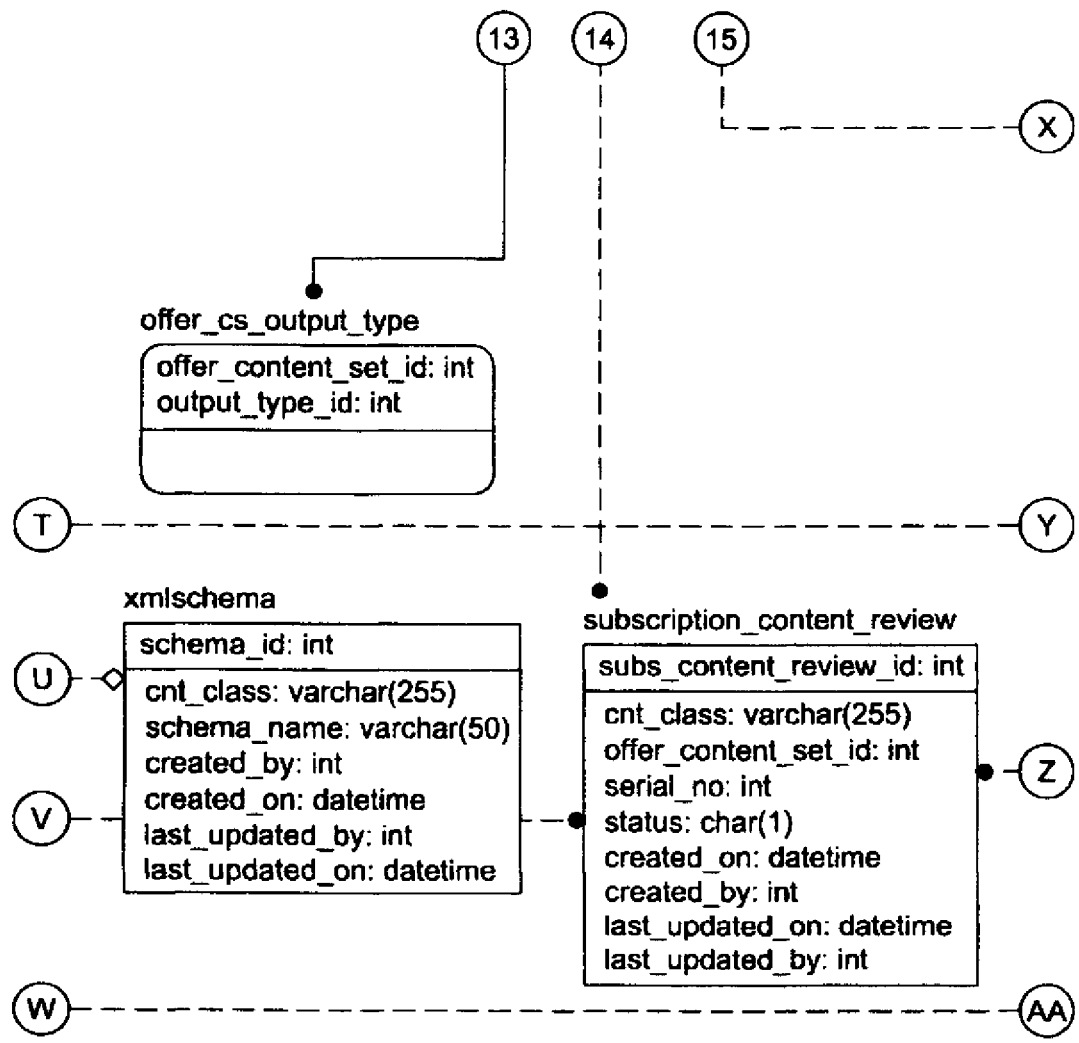
Figure 15K:
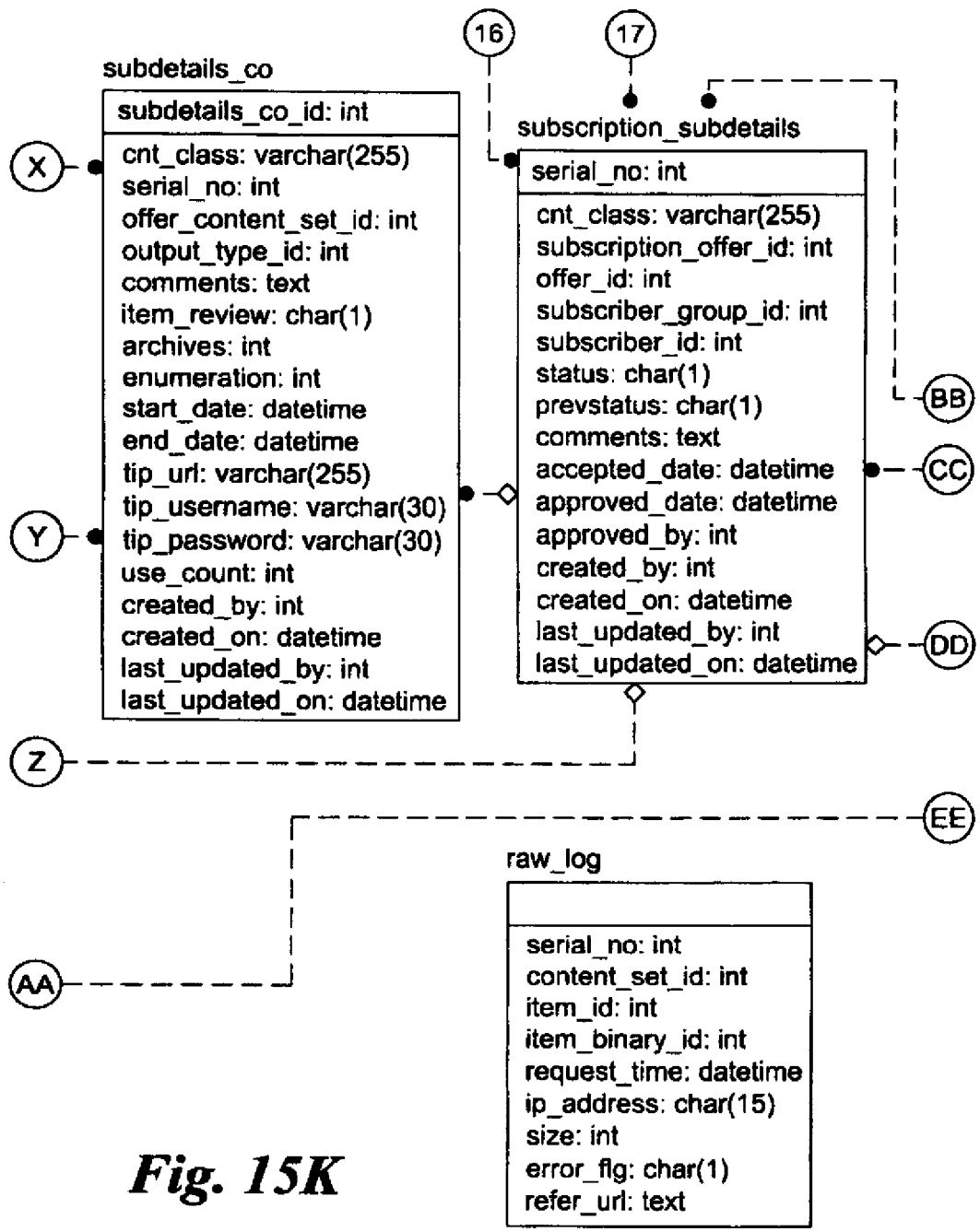
Figure 15L:
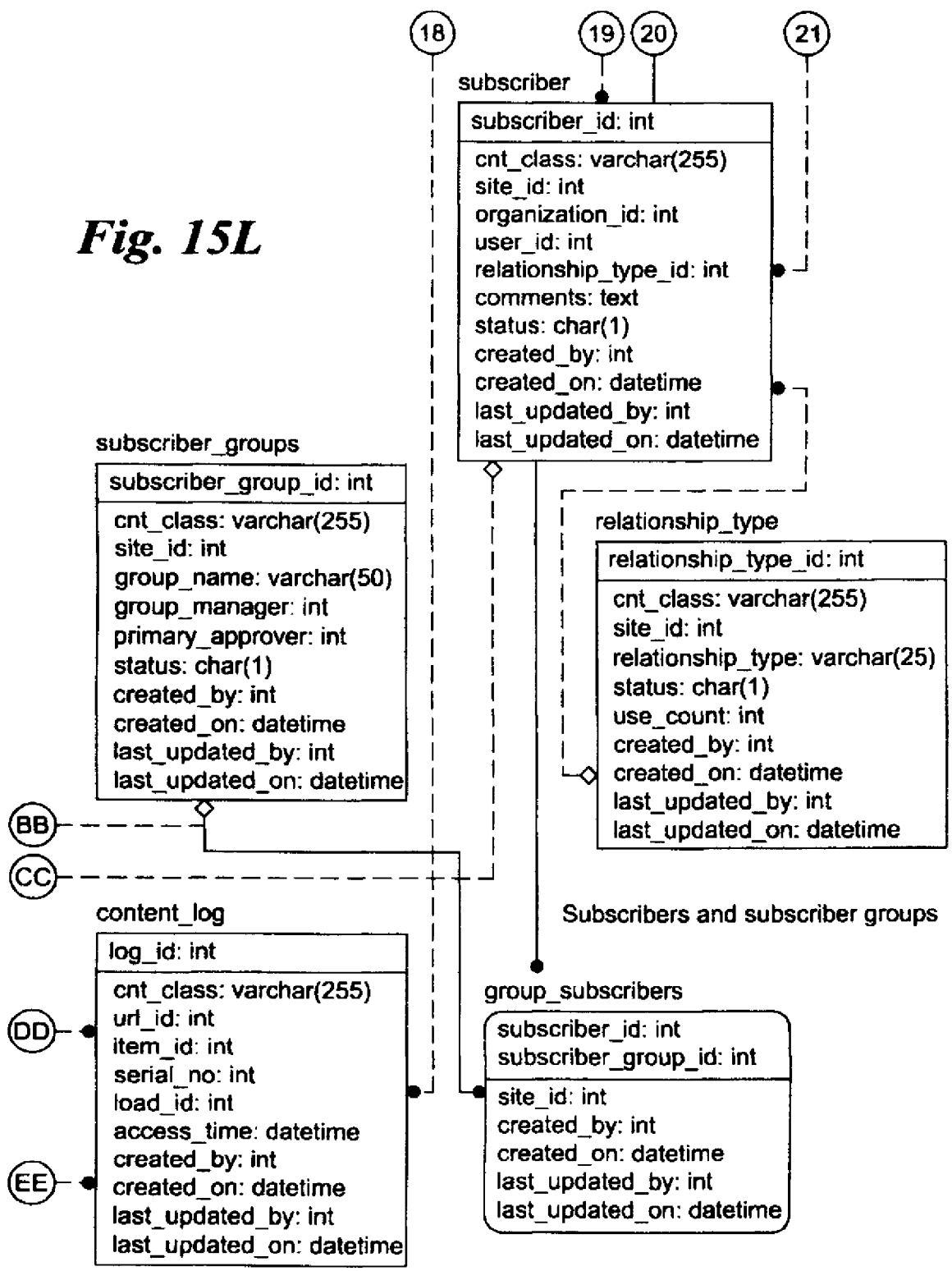
Figure 16:
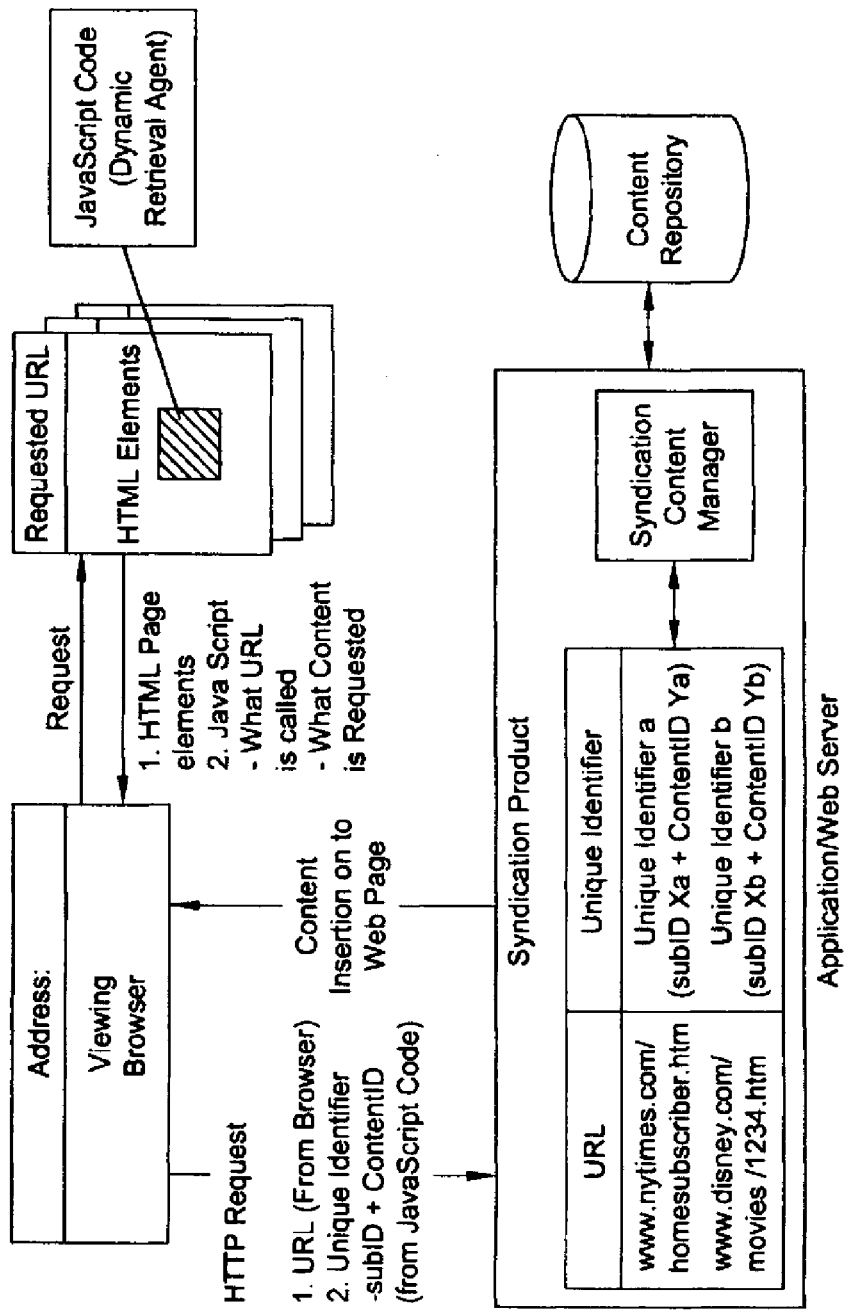

FIG. 16 is a schematic block diagram of the second preferred embodiment.

Appendix C is the combined syndication and servlet package source code for the embodiment of the present invention shown in FIGS. 14-16.

B. Implementation of Second Embodiment

FIG. 16 shows an overview of the second preferred embodiment. The basic elements include web pages located at a plurality of different LRLs, a viewing browser, an application web server that hosts the syndication product, and a content repository. Each of these elements may be interconnected by any suitable communication medium, such as the Internet. The process operates as follows:

1. A user at the viewing browser requests a web page from a particular web site. The requested web page contains HTML elements, as well as at least one snippet of JavaScript associated with the syndicated digital asset. Alternatively, the requested web page does not have to reside on a web site. The requested web page may also be a simple HTML file stored on the hard drive of a user's local computer in cases where an authenticating URL is not required.
2. The snippet of JavaScript is received by the browser.
3. When the JavaScript is received, it is not immediately used by the browser on the part of the web page on which it resides. Instead, the "src" attribute of the JavaScript tag is used to make a call to a Java servlet. More specifically, the JavaScript forms an HTTP (or HTTPS) request that includes a UTRI (e.g., a URL) of the requested web page as obtained from the browser, and a unique identifier contained within the JavaScript. In one preferred embodiment, the unique identifier is a combination of a subscriber identifier (sub ID) and a content identifier (content ID). In effect, the HTTP request is saying that URI [xyz] is requesting content [123], and is asking if it is okay to deliver it. The HTTP request is sent to an application web server that is designated by an address located within the JavaScript.

4. At the application web server, the syndication product receives the URI and the unique identifier, 5. The syndication product then looks in an authentication table to determine if there is a matching URI and unique identifier. If so, then the unique identifier is parsed to obtain the sub ID and content ID. The sub ID is used to check the current account status of the subscriber, and the content ID is used to locate the content in the content repository.

6. Assuming that a match is found in the authentication table, the subscriber ID is properly authorized, and the content is located in the content repository, then the content is retrieved from the content repository and sent by the syndication product to the browser for insertion at the appropriate location during the rendering of the web page. To facilitate this process, the syndication product contains content filtering and parsing methods (called "parseContent" and "swapStrings" in the example source code) which are used to prepare the content so that it can be rendered appropriately in the web page via a JavaScript "document.write" statement. If no match is found in the authentication table, and/or if the subscriber ID is not properly authorized, then a message is returned indicating that requested content cannot be received. Alternatively, no message is returned and the user merely does not receive the requested content. If the content is a text article, the web page may have a blank portion where the requested content would have appeared. If the content is multimedia-oriented, such as an audio file, then such content is not experienced.

7. The syndication content manager updates its records to reflect the activity. The manager may track content retrievals and charge subscriber accounts (if any exist) for such content retrievals. The content manager may remove an entry from the authentication table based upon expiration dates, number of retrievals, or any other suitable factor.

The process described above preferably occurs seamlessly in near real-time. Thus, the user is not aware that content (which is typically only a portion of the web page, but could be the entire content of the web page) is being requested and delivered from a remote content repository during the rendering of the web page.

The term "web application" as used herein refers to dynamic HTML web site content which varies depending upon user input, includes one or more interactive forms, involves the use of a web server programming/scripting language (e.g., Java, Perl, Cold Fusion, Active Server Pages, etc.), and may also make use of a backend database server for data storage. Some common examples of web applications include guestbooks, forums and shopping carts. Web applications typically execute on the same server as the hosting web server. This arrangement can place significant strain on the web server, especially when a large number of users are simultaneously requesting service and/or many web sites and applications are running concurrently on the same server. (This situation often occurs with ISP's.) The present invention leverages the JavaScript capabilities of the user's browser to execute the web application at a remote server independent of the subscriber's hosting web server, thereby reducing the potential load on the subscriber's web server and greatly simplifying the process by which a web application can be incorporated into a subscribing web site. That is, simply include the JavaScript snippet of the application using the present invention's syndication methodology in the HTML on the subscriber's web site. No further programming is then needed on the subscriber's web server. The user's browser effectively invokes the remote web application that runs and makes the subscriber's web page dynamic.

The present invention may be used for flat (static) sites and flat sites having one or more dynamic sections, as well as for fully dynamic sites.

The present invention is further advantageous because the traffic for creating the web pages uses port 80 (for http traffic) and port 443 (for https traffic), and thereby can pass through most server firewalls.

C. Web Application Example

Active Data Randomizer, available from Active Data Exchange, Inc., Bethlehem, Pa., is an example of a simple web application which incorporates the syndication methodology of the present invention. Randomizer produces two syndicated assets from two different JavaScript snippets.

FIG. 17 shows the first JavaScript snippet which renders in the browser as an administrator area (see FIG. 18) for the subscribing web site administrator to use in the configuration and entry of groups of HTML blurbs.

FIG. 19 shows the second JavaScript snippet which is generated from the administrative area and renders in the browser as a randomly selected HTML blurb from a group of HTML blurbs specified during the generation of the snippet.

Appendix D is a User Guide for this embodiment, and Appendix E shows sample source code for this embodiment.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media (non-transitory computer storage media encoded with computer-executable instructions). The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims

What is claimed is:

1. A method of constructing a web page that allows for receipt of digital assets, the method comprising:

(a) electronically constructing a web page from source code; and (b) inserting script associated with at least one digital asset that is desired to be part of a fully rendered web page into the web page, the inserted script including code to request the content of the digital asset from a remote site when the code is executed by a browser, the code including:
  (i) a uniform resource identifier (URI) of the web page for use by the remote site in authenticating whether the URI is authorized to receive the content of the digital asset, and
  (ii) a unique identifier of the content of the digital asset, wherein the script includes a subscriber identifier and a content identifier, which, together, create the unique identifier of the content.

2. A method of claim 1 wherein the content is an executable file.

3. The method of claim 1 wherein the script is a scripting language.

4. A method of claim 3 wherein the scripting language is JavaScript.

5. An article of manufacture for constructing a web page that allows for receipt of digital assets, the article of manufacture comprising non-transitory computer storage media encoded with computer-executable instructions for performing a method comprising:
  (a) electronically constructing a web page from source code; and
  (b) inserting script associated with at least one digital asset that is desired to be art of a full rendered web page into the web page, the inserted script including code to request the content of the digital asset from a remote site when the code is executed by a browser, the code including:
    (i) a uniform resource identifier (URI) of the web page for use by the remote site in authenticating whether the URI is authorized to receive the content of the digital asset, and
    (ii) a unique identifier of the content of the digital asset, wherein the script includes a subscriber identifier and a content identifier, which, together, create the unique identifier of the content.

6. The article of manufacture of claim 5 wherein the content is an executable file.

7. The article of manufacture of claim 5 wherein the script is a scripting language.

8. The article of manufacture of claim 7 wherein the scripting language is JavaScript.

9. A computer-implemented apparatus for constructing a web page that allows for receipt of digital assets, the apparatus comprising:
  (a) means for electronically constructing a web page from source code; and
  (b) means for inserting script into the web page constructed by the means for constructing a web page, the script being associated with at least one digital asset that is desired to be part of a fully rendered web page, the inserted script including code to request the content of the digital asset from a remote site when the code is executed by a browser, the code including:
    (i) a uniform resource identifier (URI) of the web page for use by the remote site in authenticating whether the URI is authorized to receive the content of the digital asset, and
    (ii) a unique identifier of the content of the digital asset, wherein the script includes a subscriber identifier and a content identifier, which, together, create the unique identifier of the content.

10. The apparatus of claim 9 wherein the content is an executable file.

11. The apparatus of claim 9 wherein the script is a scripting language.

12. The apparatus of claim 11 wherein the scripting language is JavaScript.

* * * * *

UNITED STATES PATENT AND TRADEMARK OFFICE
CERTIFICATE OF CORRECTION

| | | |
|---|---|---|
| PATENT NO. | : 7,814,172 B2 | Page 1 of 49 |
| APPLICATION NO. | : 09/923923 | |
| DATED | : October 12, 2010 | |
| INVENTOR(S) | : Martin et al. | |

It is certified that error appears in the above-identified patent and that said Letters Patent is hereby corrected as shown below:

The Title page;

The Title page, showing the illustrative figure, should be deleted and substitute therefor the attached Title page.

Delete figs. 1-21 and substitute therefor the drawing sheets, consisting of figs. 1-21 as shown on the attached page.

Signed and Sealed this
First Day of November, 2011

David J. Kappos
*Director of the United States Patent and Trademark Office*

Column 3, after line 35, insert:

Figures 21A-21I are user interface displays for "Active Data Randomizer" in accordance with one preferred embodiment of the present invention.

Column 3, after line 42 insert:

This patent application includes a computer program Appendix having a file named appendix401-13U1.txt, created on August 18, 2011, and having a size of 127,317 bytes. The Appendix is incorporated by reference into the present patent application. The Appendix includes the contents of the Appendices A, B, C and E referred to below.

Column 10, after line 40 insert; Appendix D (pages 1-6) as attached.

(12) United States Patent
Martin et al.

(10) Patent No.: US 7,814,172 B2
(45) Date of Patent: Oct. 12, 2010

(54) SYNDICATION METHODOLOGY TO DYNAMICALLY PLACE DIGITAL ASSETS ON NON-RELATED WEB SITES

(75) Inventors: Richard D. Martin, Bethlehem, PA (US); John E. Wetzel, Bath, PA (US)

(73) Assignee: Active Data Exchange, Inc., Bethlehem, PA (US)

( * ) Notice: Subject to any disclaimer, the term of this patent is extended or adjusted under 35 U.S.C. 154(b) by 1380 days.

(21) Appl. No.: 09/923,923

(22) Filed: Aug. 7, 2001

(65) Prior Publication Data
US 2002/0087660 A1 Jul. 4, 2002

Related U.S. Application Data

(60) Provisional application No. 60/223,394, filed on Aug. 7, 2000.

(51) Int. Cl.
*G06F 15/16* (2006.01)
(52) U.S. Cl. .......... 709/218; 709/219; 709/203; 709/217; 705/26; 705/27; 705/59; 705/5
(58) Field of Classification Search .......... 709/501, 709/217–219, 203; 705/26, 27, 14, 51, 76, 705/59; 717/100, 115
See application file for complete search history.

(56) References Cited

U.S. PATENT DOCUMENTS 5,640,193 A * 6/1997 Wellner .................. 709/218
5,774,670 A * 6/1998 Montulli ................. 709/227
5,819,271 A 10/1998 Mahoney et al.
(Continued)

FOREIGN PATENT DOCUMENTS

CA 2404014 A1 10/2001
(Continued)

OTHER PUBLICATIONS

Component framework for Web-based learning environments by Lindquist, T.E. Gary, K.A. Koehnemann, H.E. Naccache, H; This paper appears in: Frontiers in Education Conference, 1999. FIE '99. 29th Annual;Publication Date: 1999 vol. 2, on pp: 12C3/23-12C3/28 vol. 2;Meeting Date: Nov. 10, 1999-Nov. 13, 1999 ; (all pages).*
(Continued)

*Primary Examiner*—Nathan Flynn
*Assistant Examiner*—Mohammad A Siddiqi
(74) *Attorney, Agent, or Firm*—Panitch Schwarze Belisario & Nadel LLP

(57) ABSTRACT

Digital assets are syndicated by constructing a web page and inserting into the web page JavaScript associated with a digital asset that is desired to be part of a fully rendered web page. The content of the digital asset is not initially part of the web page. The script, when executed by a browser, requests the content of the digital asset from a remote site. The request includes a uniform resource identifier (URI) of the web page and a unique identifier of the selected content. The remote site receives the request and authenticates whether the URI is authorized to receive the selected content. If so, the remote site locates the selected content and sends the selected content to the web browser. The web browser assembles the initially requested web page using the selected content obtained from the remote site.

12 Claims, 21 Drawing Sheets

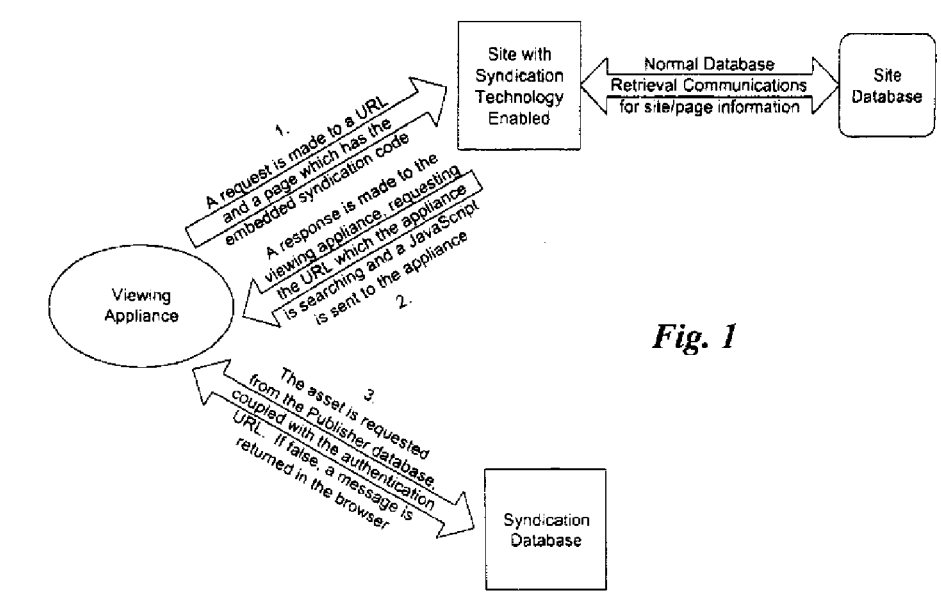

*Fig. 1*

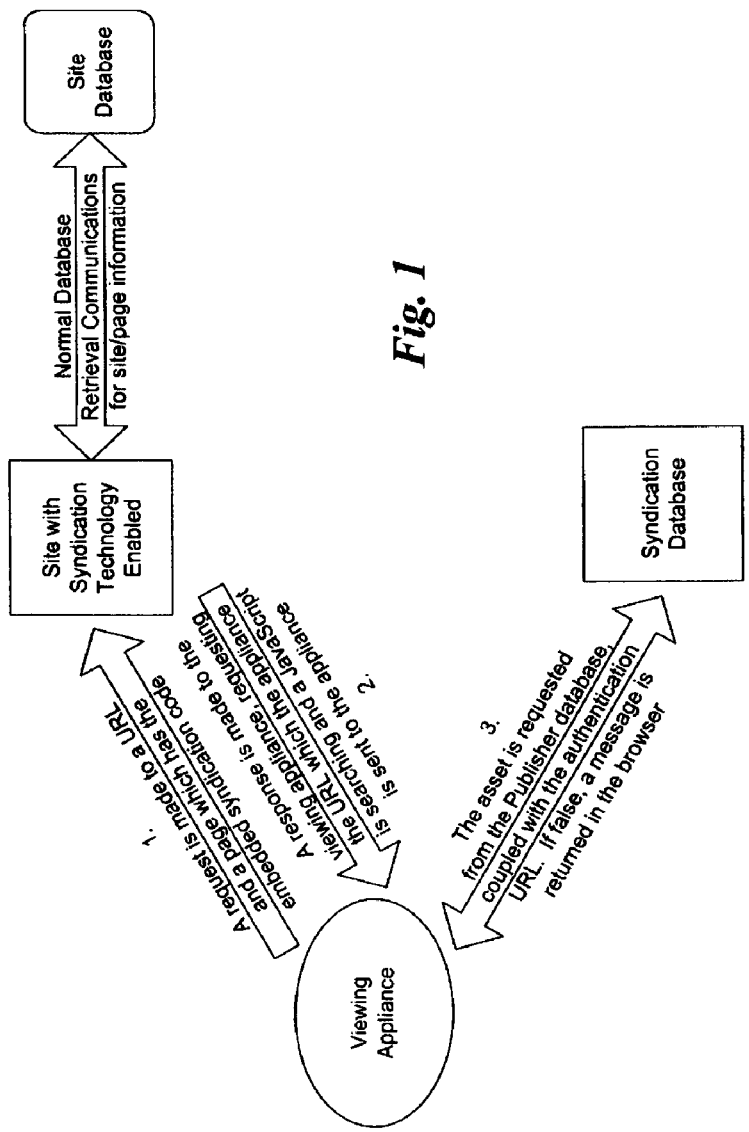

Fig. 8

*Fig. 10A*

| | |
|---|---|
| Organization | Attorney at law |
| Publishnow Database | contentpub |
| Publishnow Section | latest news |
| Authorized URL | http://www.your-law-site.com |
| Active ? | Y |
| Start Date | 2/22/00 |
| End Date | 2/22/10 |
| Javascript Code for Latest Article | <SCRIPT LANGUAGE="javascript">document.write ('<SCRIPT LANGUAGE="javascript" SRC="http://jsyndicate.mci.com/servlet/com.mci.products.PublishNow.jsyndicate?SectionID=latest news&server="stdout'+cdb"contentpub&articleID=0&PartID= 2&mode=1&documentURL=' + location.href + '"></SCRIPT>');</SCRIPT> |
| Javascript Code for | <SCRIPT LANGUAGE="javascript">if |

Subscribers and subscriber groups

Subscriber ADP Example from Syndicator 3.0

```
<SCRIPT LANGUAGE="javascript">
if (location.search.indexOf ("j3serial") != -1) {
document.write('<SCRIPT LANGUAGE="javascript"
SRC="http://localhost:8080/servlet/com.activedatax.products.syndicator.export.ADPExport' +
location.search + '&j3durl=' + escape(location.href) + '"><\/SCRIPT>');
} else { document.write('<SCRIPT LANGUAGE="javascript"
SRC="http://localhost:8080/servlet/com.activedatax.products.syndicator.export.ADPExport?j3serial=
19000025&j3sub=19000003&j3ocset=19000023%3A19000020%3A19000017&j3itemid=0&j3fullnum=0%3A0%3A0&j3a
rcnum=10%3A10&j3newwindow=false&j3showdates=false&j3durl=' + escape(location.href) +
'&j3rand=' + escape(Math.random()) + '"><\/SCRIPT>'); }
</SCRIPT>
```

*Fig. 17*

Admin ADP For Randomizer/Blurb Machine

```
<SCRIPT LANGUAGE="javascript">
if (location.search.indexOf ("jbact") != -1) {
document.write('<SCRIPT LANGUAGE="javascript"
SRC="http://publisher3.activedatax.com/servlet/com.activedatax.products.Blurb.JBlurbAdmin' +
location.search + '&jbdurl=' + escape(location.href) + '&jbrand=' + escape(Math.random()) +
'"><\/SCRIPT>');
} else {
document.write('<SCRIPT LANGUAGE="javascript"
SRC="http://publisher3.activedatax.com/servlet/com.activedatax.products.Blurb.JBlurbAdmin?jbsid=9
31717&jbdurl=' + escape(location.href) + '&jbrand=' + escape(Math.random()) + '"><\/SCRIPT>');
} </SCRIPT>
```

*Fig. 18*

Fig. 19

```
Random Blurb Output ADP

<SCRIPT LANGUAGE="javascript">
document.write('<SCRIPT LANGUAGE="javascript"
SRC="http://publisher3.activedatax.com/servlet/com.activedatax.products.Blurb.JBlurb?jbsid=931717
&jbgid=136593&jbdurl=' + escape(location.href) + '&jbrand=' + escape(Math.random()) +
'"><\/SCRIPT>');
</SCRIPT>
```

Fig. 20 blurb_site
- blurb_site_id: int
- blurb_site_name: varchar(50)
- description: varchar(255)
- status: char(1)
- url: varchar(255)
- created_on: datetime
- last_modified_on: datetime blurb
- blurb_id: int
- blurb_site_id: int
- blurb_group_id: int
- html: text
- status: char(1)
- created_on: datetime
- last_modified_on: datetime blurb_group
- blurb_group_id: int
- blurb_site_id: int
- blurb_group_name: varchar(50)
- status: char(1)
- created_on: datetime
- last_modified_on: datetime

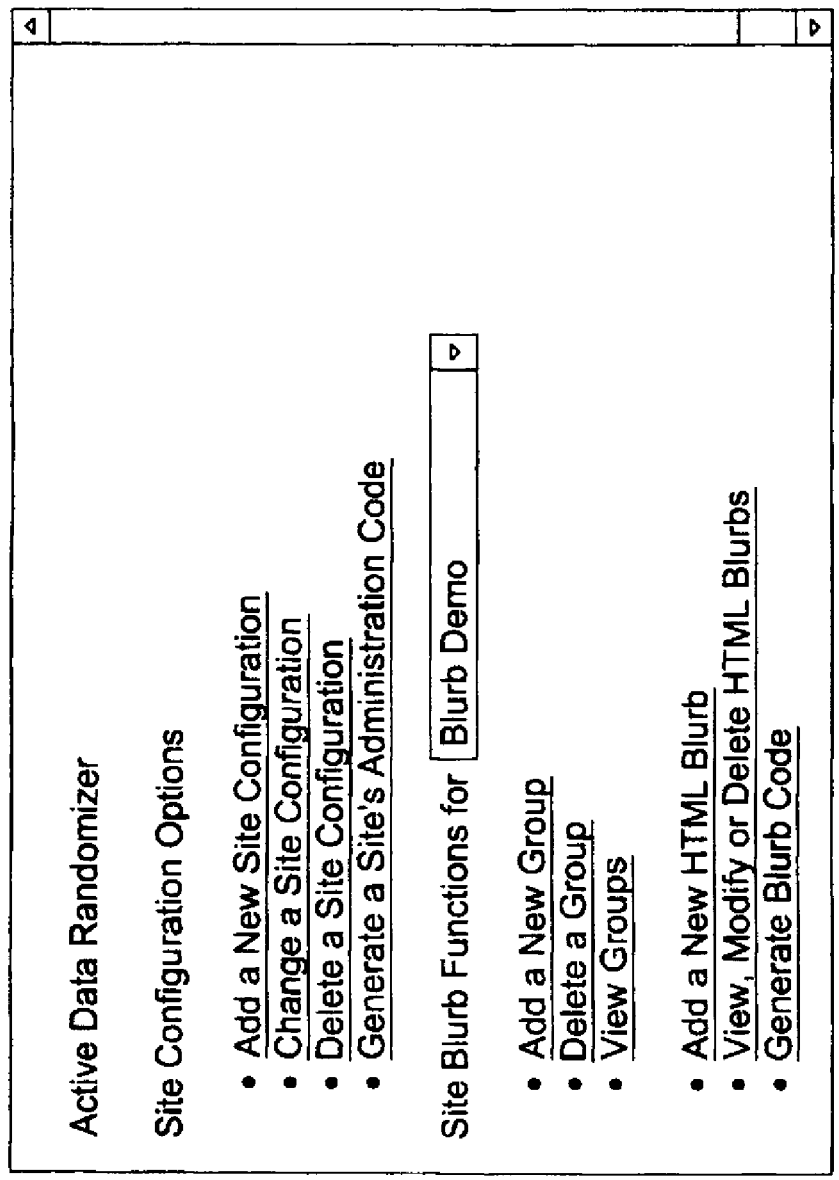
Fig. 21A Site Configuration Screen

Active Data Randomizer

Add a New Site Configuration

| Site Name | Blurbdemo |
| Description | Demonstration of Active Data Randomizer |
| Site URL | http://asppreview.activedatax.com/blurbdemo |

Go Back to Menu     Submit Configuration

Add a New Site Configuration

*Fig. 21B*

*Fig. 21E*

New Active Data Randomizer Blurb HTML Confirmation

Sample HTML Editor

*Fig. 21H*

Confirmation and View Message Window

Fig. 21I

APPENDIX D

ACTIVE DATA RANDOMIZER User Guide

Active Data Randomizer gives Users the power to keep a Website fresh and inviting to visitors. This convenient, easy-to-use tool facilitates the collecting, grouping, modifying and removal of messages, either graphic or text, that are displayed within a page each a time it is loaded, reloaded or refreshed by the viewer.

This User Guide is an overview of how Active Data Randomizer works and what it does. For a complete demonstration, contact your Active Data Exchange representative.

Table of Contents
- Overview
- Step-by-step guide for Active Data Randomizer
- Getting Started
- Step 1 Site Set Up
- To Set up a new site
- Step 2 Randomizer Groups
- Step 3 HTML Blurbs
- *To add another HTML blurb:*
- Step 4 Java Script Code
- Step 5 Verify or Modify Blurb Groupings
- Step 6 Rotating Blurbs for Preview
- Step 7 Exit

ACTIVE DATA RANDOMIZER

Overview

A practical too, Active Data Randomizer gives Users the power to keep their Website viewers attentive to the screen by changing a specific part of a page message each time a viewer refreshes or returns to a previously viewed screen. An easy to use tool that requires no additional hardware or installation, Active Data Randomizer is platform independent and facilitates the grouping and presenting of graphic or text messages on a Website page.

The Active Data Randomizer allows for direct, targeted message updates, without the complexities of publishing completely new pages or documents, from any location with Internet access, at any time. Short, catchy visuals and text can be displayed on a page with little effort on the part of the client after setup is complete. The random display of messages keeps your page continually altering and fresh to viewers as they browse through a site. Using Active Data Randomizer to rotate images or messages will decrease the static look and feel of a Web page.

Step-by-step guide for Active Data Randomizer

Getting started

The Active Data Randomizer is accessible through a Universal Resource Locator, URL. Open your Internet browser and enter this URL into the proper area:

http://publisher3.activedatax.com/servlet/com.activedatax.products.Blurb.AdminM enu

You will be taken to the main screen for Active Data Randomizer (Figure 21A).

The main screen for the Active Data Randomizer has links to each and every functionality offered by this time-saving tool. Once you have accessed the Active Data Randomizer tool, you will see all the site configuration options and functions that are usable for screen refresh messages. Click on any of the bulleted items to access that functionality.

Step 1 Site Set Up

You will arrive at this window when Add a New Site Configuration is chosen from the Site Configuration Screen (Figure 21B). From here you are able to set up a new location to display Active Data Randomizer messages or return to the Menu.

To Set up a new site

1. Site Name—enter your site name.
2. Descriptions—enter a brief description.
3. Enter the URL to locate the site and the page where you want your dynamic blurbs to be displayed.
4. Select the Submit Configuration button.

The new site is automatically configured, and you will be returned to the Administration screen.

NOTE—the success of your new site set-up is confirmed and expressed by the red text in the upper portion of the screen.

Step 2 Randomizer Groups

Figure 21C:
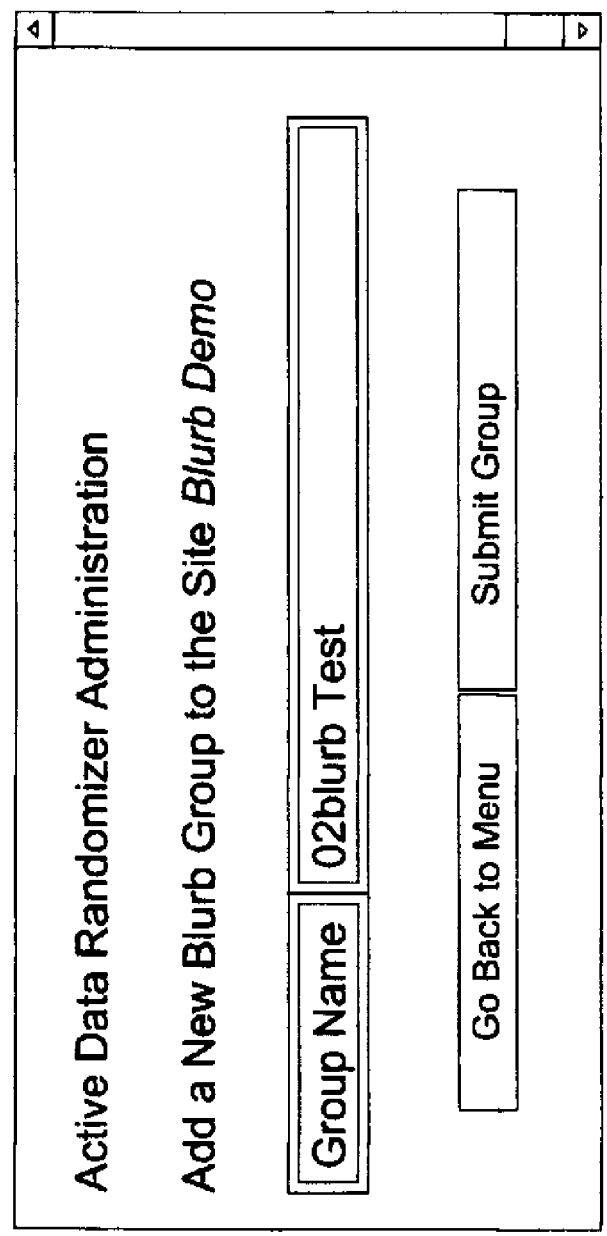

You will arrive at this window when Add a New Group is chosen from the Site Configuration screen (Figure 21C). From here you are able to set up a new group of Active Data Randomizer blurbs or return to the Menu.

1. Enter a Group Name for your first collection of different blurbs that will be used for a specific location. These are the dynamic blurbs that will be rotated sequentially every time a viewer returns to that page and it is reloaded, or when the viewer selects the refresh icon. The blurbs you want to set up are virtually limitless and can be graphic or textual based. The sample group name in this case is 02blurb test.
2. Click Submit Group.

Figure 21D:
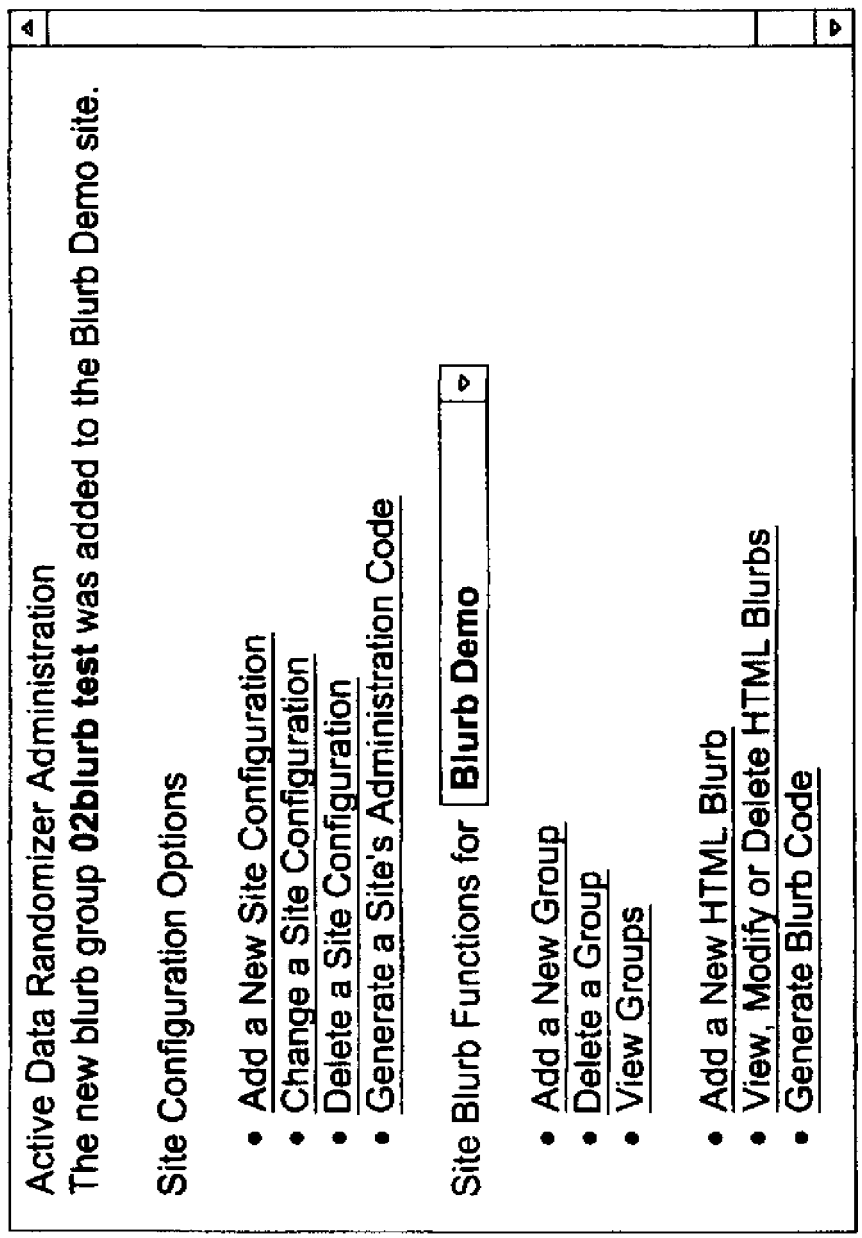

3. You will be returned to the main menu. A confirmation that your group has been created is shown in red text. It repeats the Group Name and the Site Name that it has been added to (Figure 21D).

4. To continue click on Add a New HTML Blurb, located in the lower group of bulleted items.

Step 3 HTML Blurbs

You will arrive at this window when Add a New HTML Blurb is chosen from the New Group Confirmation screen. From here you are able to set up a new location to display Active Data Randomizer messages or return to the Menu (Figure 21E).

1. From the Add a New randomizer screen, select the Group Name from the pull down menu you want this new HTML blurb added to.

2. Enter or Copy and Paste the HTML code for the picture or text or both that you want to show in the refreshed window. This information is retrieved from your original document's source code from whatever HTML editor program you are using.

Figure 21F:
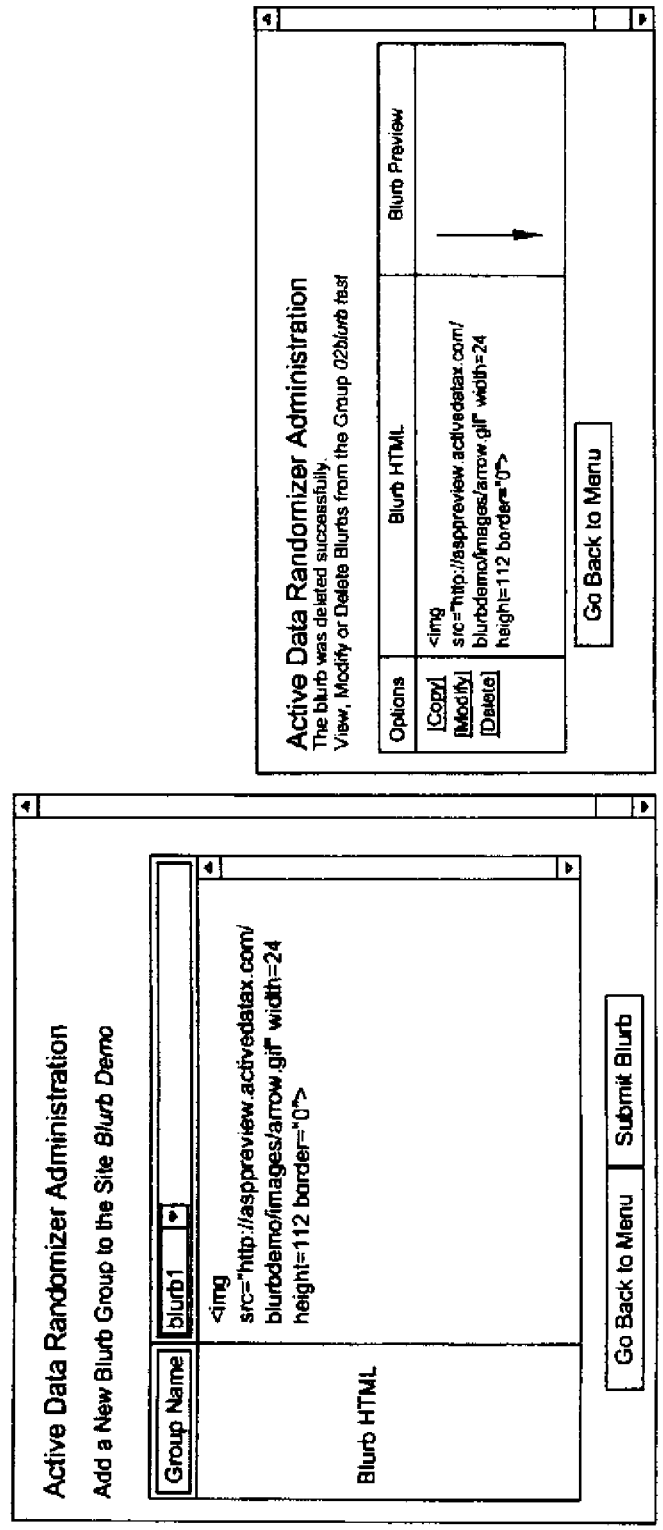
Figure 21G:
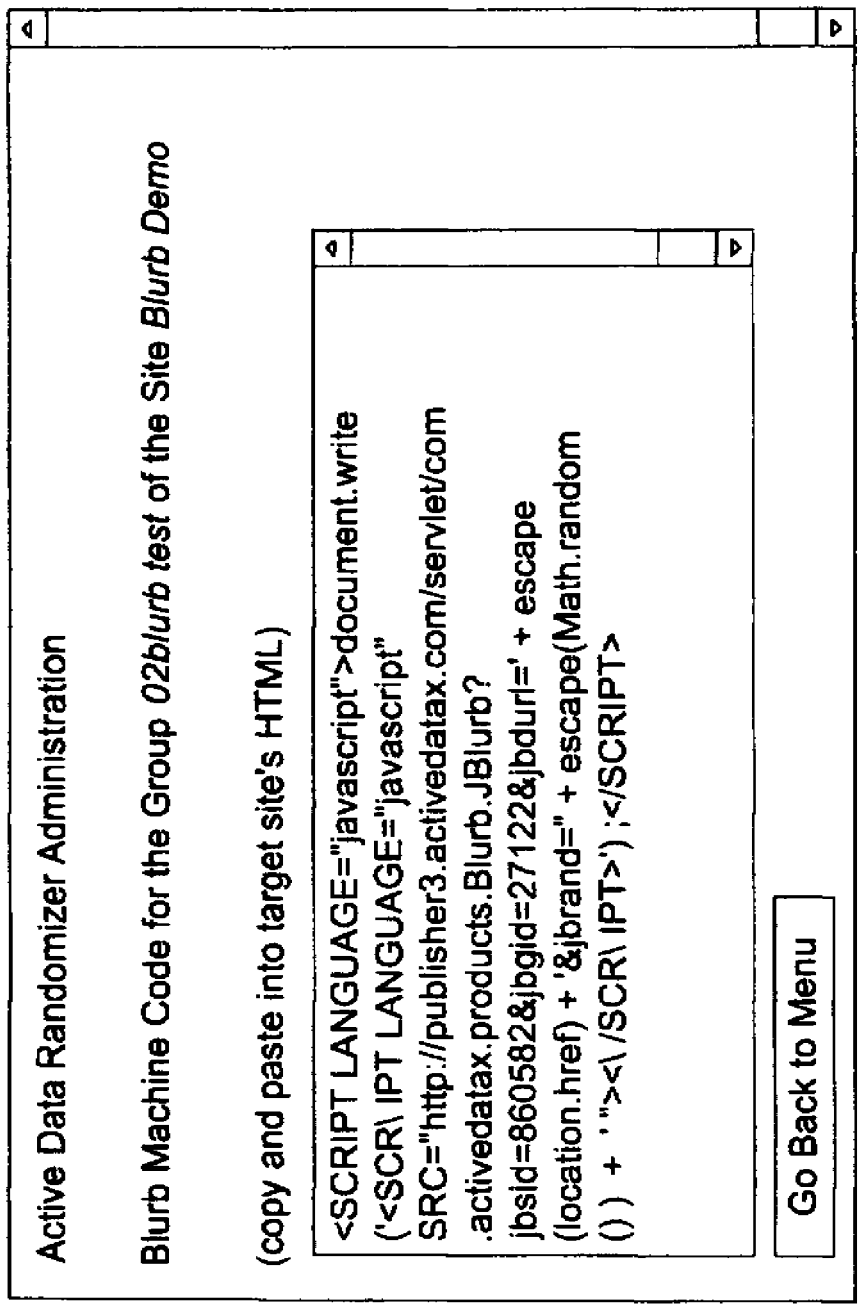

3. Click on Submit Blurb. A confirmation screen will show that the blurb has been added. You are still able to modify or delete your blurb in the future if necessary. Any action you take at this step will be confirmed within the next window in red text (Figure 21F).

To add another HTML blurb:

1. Click on [Copy] and Randomizer will automatically duplicate your last HTML blurb.
2. Either insert new HTML text or alter your HTML text, as in the case of changing the image only, you can just update the name of the source image, without having to re-enter all new HTML.
3. Select the Submit Blurb button after each entry to save the changes. Each entry will be confirmed and added to your list of HTML blurbs.
4. Repeat this process until you have added all your HTML blurbs.
5. Select Go Back to Menu.

Step 4 Java Script Code

Once you have returned to the Site Configuration main screen,

1. Select <u>Generate Blurb Code</u> from the lower level bulleted options.
2. Active Data Blurb Admin will automatically write the Java Script needed to instruct your site to sequentially rotate the HTML sources. This Java will include all the necessary instructions to refresh the image in the window each time it is reloaded or manually refreshed (Figure 21G).
3. Highlight and copy this Java Script.
4. Return to your primary source document using your HTML Editing program and select the HTML source view (Figure 21H).
5. Paste the Active Data Randomizer Java Script you have copied into your original source document for the Web page.

NOTE—Make sure you are within the proper location on your Web page. Paste the script in the exact position where you want the message to be displayed on the page.

6. Exit (or close) your HTML editing program and return to the Active Data Randomizer Administration screen.
7. Click the Return to Menu button.

Step 5 Verify or Modify Blurb Groupings

From the main Active Data Randomizer Administration window, you may view your group of messages. Active Data Randomizer presents both the HTML and a visual of the output (Figure 21I).

1. Choose the <u>View, Modify, Delete HTML Blurb</u> to view and confirm your message or messages.
2. A preview image of the actual image that will be shown on a viewer's screen. Select Go Back to Menu to pretest the messages.

Step 6 Rotating Blurbs for Preview

- 5 -

It is best to always pretest the site to make sure your messages are being presented properly.

1. Open any separate browser window and point to the page you want to check.
2. Choose *refresh* to view the new message in the Group you have been assigned to that page. Continue to choose refresh or move to another page and return to the original page to verify that your messages have been changed. At times it is normal for Active Data Randomizer to repeat a message or image.
3. Exit

Step 7 Exit

Users may exit Active Data Randomizer Administration by simply leaving or closing your browser window.

About Active Data Exchange

Active Data Exchange is a leader in syndication software solutions that empower companies to get the right content to the right place at the right time. Active Data Exchange helps create highly effective information delivery chains with partners, customers, vendors, distributors, investors, and other target groups and affects commerce with communications tools better than existing email technologies. The company is active in several industry standards committees including the Information and Content Exchange Authoring Group and the W3C XML Protocol Standards Committee. Clients include Crown, Cork and Seal, MainStreet Networks, Turner Construction, Penn Mutual Life Insurance, DeSales and Lehigh University.

END OF "ACTIVE DATA RANDOMIZER" USER GUIDE (APPENDIX D)